United States Patent
Raffaelli

(10) Patent No.: US 11,713,090 B2
(45) Date of Patent: Aug. 1, 2023

(54) TILTING MOTOR VEHICLE WITH TILTING LOCKING DEVICE

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 92 days.

(21) Appl. No.: 17/602,149

(22) PCT Filed: Apr. 1, 2020

(86) PCT No.: PCT/IB2020/053073
§ 371 (c)(1),
(2) Date: Oct. 7, 2021

(87) PCT Pub. No.: WO2020/208476
PCT Pub. Date: Oct. 15, 2020

(65) Prior Publication Data
US 2022/0135169 A1  May 5, 2022

(30) Foreign Application Priority Data

Apr. 10, 2019  (IT) .......................... 102019000005556

(51) Int. Cl.
*B62K 5/10* (2013.01)
*B62K 5/027* (2013.01)
(Continued)

(52) U.S. Cl.
CPC ................ *B62K 5/10* (2013.01); *B62K 5/027* (2013.01); *B62K 5/05* (2013.01); *B62K 25/04* (2013.01);
(Continued)

(58) Field of Classification Search
CPC .... B62K 5/10; B62K 5/027; B62K 2005/001; B62K 2025/047
See application file for complete search history.

(56) References Cited

U.S. PATENT DOCUMENTS 7,264,251 B2  9/2007  Marcacci
2005/0167174 A1  8/2005  Marcacci
(Continued)

FOREIGN PATENT DOCUMENTS

BR  102017020652 A2 *  6/2018  ......... B60G 17/0162
CN  1654262 A  8/2005
(Continued)

OTHER PUBLICATIONS

Goto, WO-2018180396-A1, Oct. 2018, Machine Translation of Specification.*
(Continued)

*Primary Examiner* — Paul N Dickson
*Assistant Examiner* — Matthew Joseph Ganci
(74) *Attorney, Agent, or Firm* — McGlew and Tuttle, P.C.

(57) ABSTRACT

The motor vehicle (1) comprises at least one rear driving wheel (5) and two front steered wheels (7', 7"). A tilting four bar linkage (11) allows the motor vehicle to perform a tilting movement, for example, when cornering. Support arms (21', 21") for front steered wheels (7', 7"), which rotate around steering axes (21A', 21A") and are joined to each other by a steering bar (23), are associated with the tilting four bar linkage. Each wheel is constrained to the respective support arm with the interposition of a suspension (33; 33"). A tilting locking device comprises a brake (53', 53") which locks the springing movement of the respective suspension and the tilting movement of the four bar linkage.

21 Claims, 42 Drawing Sheets

(51) Int. Cl.
*B62K 5/05* (2013.01)
*B62K 25/04* (2006.01)
*B62K 5/00* (2013.01)

(52) U.S. Cl.
CPC .. *B62K 2005/001* (2013.01); *B62K 2025/047* (2013.01)

(56) References Cited

U.S. PATENT DOCUMENTS

| | | | | |
|---|---|---|---|---|
| 2013/0168934 | A1* | 7/2013 | Krajekian | B62K 5/05 280/62 |
| 2013/0207363 | A1* | 8/2013 | Mighell | B62K 5/08 280/124.103 |
| 2017/0088219 | A1* | 3/2017 | Yoshikuni | B62K 21/18 |
| 2017/0101150 | A1* | 4/2017 | Shibuya | B62J 50/21 |
| 2018/0319242 | A1* | 11/2018 | Goel | B62D 61/065 |
| 2018/0346057 | A1* | 12/2018 | Mukai | B62K 25/04 |
| 2019/0009633 | A1 | 1/2019 | Raffaelli | |

FOREIGN PATENT DOCUMENTS

| | | | | |
|---|---|---|---|---|
| CN | 108698661 A | | 10/2018 | |
| EP | 2829423 A1 | | 1/2015 | |
| EP | E P-2889210 A1 | * | 7/2015 | ............. B62K 5/027 |
| EP | 3069979 A2 | * | 9/2016 | ........... B60G 13/003 |
| EP | 3144165 A1 | | 3/2017 | |
| EP | 3321158 A1 | | 5/2018 | |
| EP | 3434570 A1 | * | 1/2019 | ............... B62K 5/08 |
| FR | 2995868 A1 | * | 3/2014 | ........... B60G 17/005 |
| JP | 2017065531 A | * | 4/2017 | ............... B62D 7/16 |
| TW | 201736178 A | * | 10/2017 | ........... B60G 21/007 |
| WO | 2017115293 A1 | | 7/2017 | |
| WO | 2017115294 A1 | | 7/2017 | |
| WO | 2017115295 A1 | | 7/2017 | |
| WO | 2017115296 A1 | | 7/2017 | |
| WO | 2017115297 A1 | | 7/2017 | |
| WO | 2018116210 A1 | | 6/2018 | |
| WO | 2018116211 A1 | | 6/2018 | |
| WO | WO-2018116214 A2 | * | 6/2018 | ............... B62K 5/08 |
| WO | WO-2018180396 A1 | * | 10/2018 | ............... B60G 1/02 |

OTHER PUBLICATIONS

Iguch, BR-102017020652-A2, Jun. 2018, Machine Translation of Specification.*
Raffaelli, TW-201736178-A, Oct. 2017, Machine Translation of Specification.*
Hirakawa, JP-2017065531-A, Apr. 2017, Machine Translation of Specification.*
Marrec, FR-2995868-A1, Mar. 2014, Machine Translation of Specification.*

* cited by examiner

TILTING MOTOR VEHICLE WITH TILTING LOCKING DEVICE

TECHNICAL FILED

The present invention relates to the field of so-called tilting motor vehicles, i.e. provided with a tilting movement around a median plane extending longitudinally along the vehicle. Embodiments disclosed herein relate to saddle vehicles with three or more wheels.

BACKGROUND ART

In the field of motor vehicles, there is an increasing offer of vehicles that combine the features of two-wheeled saddle vehicles (motorcycles and scooters, for example) in terms of handling, with the stability of four-wheeled vehicles. These vehicles include three-wheeled motor vehicles provided with two front steered wheels and one rear driving wheel, and four-wheeled motor vehicles, typically called quad-bikes.

More in detail, the above-mentioned three-wheeled motor vehicles are provided with two front steered wheels, i.e. which are suitable for performing the steering of the vehicle controlled by the driver by means of the handlebar, and which are tilting, i.e. may be tilted or inclined laterally with a tilting movement. The tilting movement is an oscillating movement around an axis substantially oriented in the direction of travel. Three-wheeled vehicles further comprise a rear driving wheel, drivingly connected to the engine and intended to provide the driving torque and thus allow traction, while the front wheels, paired, are intended to provide the directionality of the vehicle.

The paired front wheels are provided with a tilting movement, in addition to the steering movement, and are connected to the vehicle frame by means of shock-absorbing suspensions, which allow a springing movement. Thanks to the use of two paired front wheels, as compared to a regular two-wheeled motor vehicle a tilting vehicle has greater stability ensured by the double support of the front wheels on the ground, similar to that provided by a car.

The front wheels are connected to each other by means of kinematic mechanisms that ensure the wheels themselves are capable of tilting and steering substantially in a synchronous manner, for example with the interposition of one or two four bar linkages that connect the front wheels to a front-end frame. Furthermore, such motor vehicles are frequently provided with two independent shock-absorbing suspensions, one for each front driving wheel. Each suspension is provided with an elastic member (spring) and a viscous member (shock absorber).

Although three- or four-wheeled tilting motor vehicles show great stability, potentially under certain conditions, they may fall over due to an uncontrolled tilting movement. This may occur in particular at low forward speeds, or with a stationary or parked vehicle. In order to avoid this inconvenience, three- or four-wheeled tilting motor vehicles are commonly provided with a tilting locking or tilting control device, which prevents the motor vehicle from accidentally falling over when it is stationary or driving at low speed. Three-wheeled motor vehicles with tilting locking or tilting control devices are disclosed for example in WO2017115293, WO2017115294; WO2017115295; WO2017115296; WO2017115297; WO2018116210; WO2018116211 and in the prior art documents mentioned therein.

U.S. Pat. No. 7,264,251 discloses a three-wheeled motor vehicle with a tilting locking mechanism. The motor vehicle comprises a four bar linkage having: a first crosspiece, or upper crosspiece, extending in a transverse direction with respect to a median plane of the motor vehicle, that is, in a right-left direction; a second crosspiece, or lower crosspiece, extending in a transverse direction with respect to a median plane of the motor vehicle, that is, in a right-left direction; a first upright, which joins a first end of the upper crosspiece and a first end of the lower crosspiece and which is located on one side, for example the left side with respect to the median plane of the vehicle; a second upright, which joins a second end of the upper crosspiece and a second end of the lower crosspiece. Steering arms supporting the front wheels are associated with the uprights. A shock-absorbing suspension, which allows a springing movement between the corresponding driving wheel and the support arm, is associated with each arm. The support arms are joined by a steering bar which transmits the steering movement imparted by a handlebar to the two support arms of the wheels. In order to lock the tilting movement of the motor vehicle, a brake is provided which prevents the rotation of the crosspieces of the tilting four bar linkage with respect to the front-end frame. Since each wheel is constrained to the support arm by means of a suspension, in order to avoid tilting movements due to an unequal compression of the two, right and left suspensions, the tilting locking device also comprises two locking members which, when activated, prevent extension and compression movements of the two suspensions, that is, lock the two springing movements of the two suspensions. When the tilting locking device is activated, the front wheels can only perform a steering movement with respect to the front-end frame.

This tilting locking device is very effective, but requires three different actuators in order to perform the locking: the actuator locking the tilting movement of the tilting four bar linkage; and the two different actuators locking the stretching and shortening movements, that is, contraction and extension, of the two suspensions.

It would be useful to have a tilting locking device having the same effectiveness, but overcoming the drawbacks of the prior art devices. In particular, a tilting locking device which requires fewer actuators and which is therefore simpler, more cost-effective and less cumbersome would be useful.

SUMMARY OF THE INVENTION

In order to overcome or mitigate one or more of the drawbacks of the prior art devices, a motor vehicle with a tilting locking device according to claim 1 is provided. Particularly advantageous embodiments and features of a motor vehicle according to the present invention are defined in the dependent claims.

In particular, a tilting motor vehicle is provided, comprising a frame, at least one rear driving wheel, and two front steered wheels, respectively left and right steered wheels. The motor vehicle further comprises a tilting four bar linkage. The tilting four bar linkage in turn comprises: an upper crosspiece extending transversely to a median plane of the motor vehicle; a lower crosspiece extending transversely to the median plane of the motor vehicle; and two uprights, respectively left and right uprights, which connect the upper crosspiece and the lower crosspiece. A left support arm is further provided, which is coupled to the left upright, so as to rotate with respect thereto around a respective steering axis. The left front steered wheel is connected to the left support arm with the interposition of a left suspension.

Similarly, on the right side of the motor vehicle there is provided a right support arm coupled to the right upright of the four bar linkage, so as to rotate with respect thereto around a respective steering axis. The right front steered wheel is connected to the right support arm with the interposition of a right suspension. A transverse component, for example a steering bar, is pivoted at a first end to the left support arm and at a second end to the right support arm, so as to follow the rotational movement of the left support arm and of the right support arm around the respective steering axes of the left and right front steered wheels. Moreover, the transverse component is adapted to rotate, with respect to the left support arm and to the right support arm, around respective tilting axes when the motor vehicle performs a tilting movement. The tilting axes are parallel to one another and parallel to the axes of the tilting four bar linkage.

The device is typically provided with a tilting locking device, which comprises, for at least one of said left front steered wheel and right front steered wheel, a first brake adapted to lock, with a single actuation, a springing movement of the respective suspension and the rotation movement of said transverse component around the tilting axes. Locking of the rotation movement of the transverse component around the tilting axes is achieved by constraining with respect to each other a first member of the respective suspension, which performs a springing movement with respect to the support arm, and a second member associated with the respective steered wheel and mechanically connected with the transverse component, so as to perform rotational movements proportional to the rotation of the transverse component around the tilting axes. The first member and the second member are constrained to one another directly or through intermediate components, arranged therebetween, as will be explained in greater detail with reference to embodiments disclosed herein. The tilting locking device further comprises, for the other of said left front steered wheel and right front steered wheel, a second brake adapted to lock, with said single actuation, at least the springing movement of the respective suspension.

In this way, on at least one side of the vehicle a single brake locks the suspension, preventing springing movements of the respective wheel, and further locks the tilting movement of the tilting four bar linkage. On the other side of the vehicle the brake may just lock the springing movement of the relevant suspension.

As will become apparent from the detailed description, in some embodiments the first member, the second member or both can be integral with or form part of the respective brake, i.e. one or both can be members of the respective brake.

In practical embodiments, the second brake is also adapted to lock the rotational movement of the transverse component around the tilting axes. In this way, a substantially symmetrical arrangement is obtained for the left side and the right side of the motor vehicle.

In some embodiments, the tilting locking device comprises, for each front steered wheel, a first member (directly or indirectly) supported on the support arm and mechanically connected to the suspension, so as to move, with respect to the support arm, with a movement proportional to the springing movement of the respective suspension. Furthermore, said tilting locking device comprises, for at least one and preferably each front steered wheel, a second member (directly or indirectly) supported on the support arm and mechanically connected to the transverse component so as to move, with respect to the support arm, with a movement proportional to the rotational movement of the transverse component around the tilting axes. The brake is adapted to lock with respect to each other said first member and said second member.

For example, the first member is rotatably coupled to the support arm and is adapted to rotate with respect to the support arm proportionally to the springing movement of the respective suspension.

In possible embodiments, the second member is rotatably coupled to the support arm and is adapted to rotate with respect to the support arm proportionally to the rotational movement of the transverse component around the tilting axes.

In embodiments disclosed herein the tilting locking device comprises, for each of said left front steered wheel and right front steered wheel a further member supported on the support arm and mechanically connected to the first member of the respective suspension, so as to move, with respect to the support arm, with a movement proportional to the suspension springing movement. The brake is adapted to lock with respect each other said further member and said second member. In embodiments disclosed herein, the further member can be integral with or form itself one of the members of the respective brake. Similarly, the second member can be integral with or form itself one of the members of the respective brake.

BRIEF DESCRIPTION OF THE DRAWINGS

The invention will be better understood by following the description and the accompanying drawings, which illustrate exemplary and non-limiting embodiments of the invention. More particularly, in the drawing.

DESCRIPTION OF EMBODIMENTS

Figure 1:
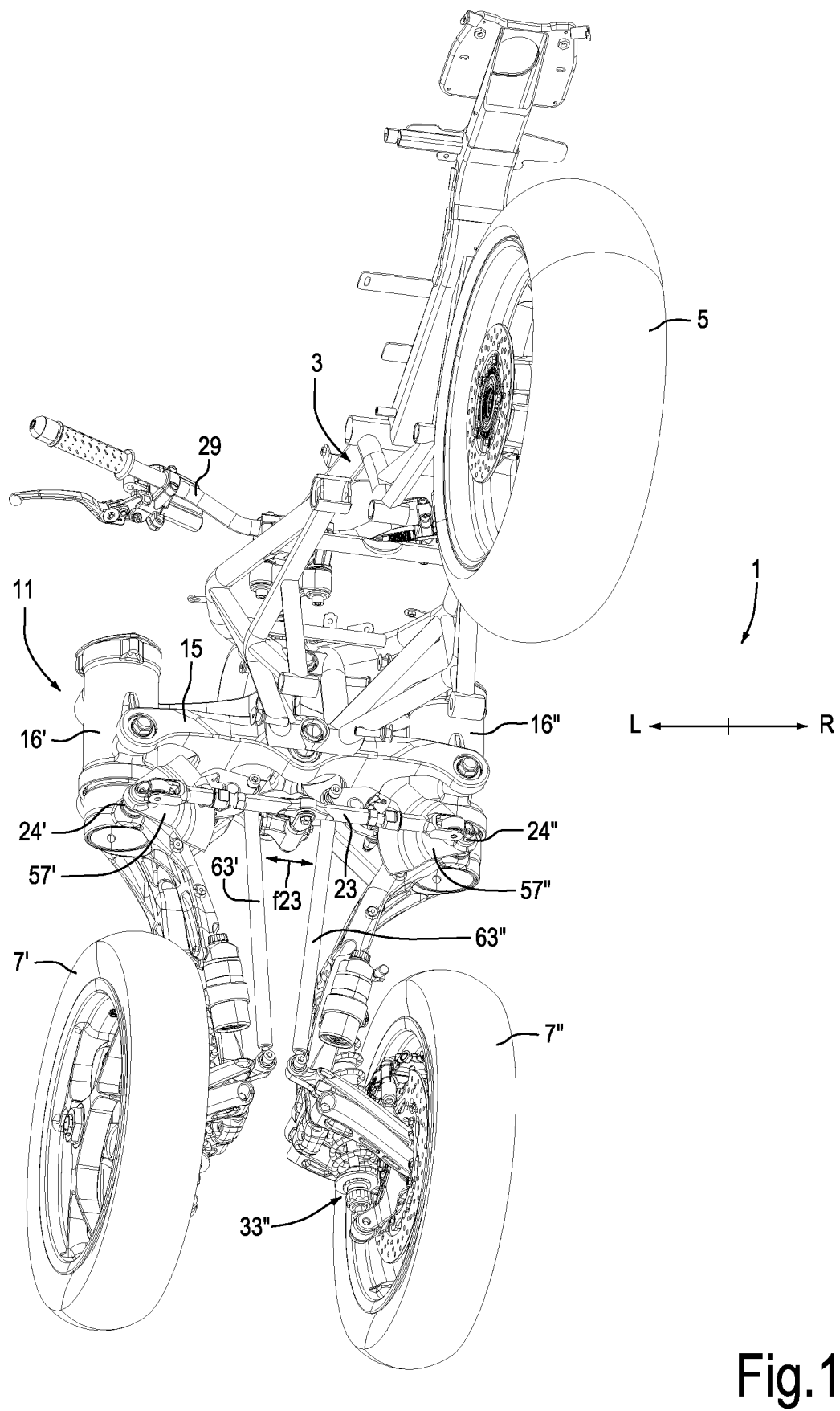
FIG. 1 shows a bottom isometric view, with parts removed, of a three-wheeled motor vehicle according to an embodiment.

With reference to the attached figures, the arrow F indicates the forward direction of the vehicle, the double arrow L-R indicates a left-right direction of the vehicle, and the arrow U-D indicates the up-down direction of the vehicle. The terms "left", "right", "up", "down" are referred to a driver sitting on the stationary, and therefore not tilted, vehicle. "Transverse" means a right-left direction, i.e., a direction extending transversely with respect to a median plane of the motor vehicle.

Embodiment of FIGS. 1 to 7

A first embodiment of a motor vehicle is illustrated in FIGS. 1 to 7.

In summary, in the first embodiment a tilting saddle motor vehicle with at least two front steered wheels, which has a tilting four bar linkage extending in a transverse, i.e. right-left, direction, is provided. The tilting four bar linkage has two crosspieces, respectively upper and lower crosspieces, joined by two uprights, respectively right and left uprights. Right and left support arms, which respectively support the right front steered wheel and the left front steered wheel, with the interposition of a respective suspension, are associated with the uprights. The two support arms are joined by a transverse component, which may consist of the steering bar and which is constrained at the two ends thereof to the two support arms with respective joints that allow rotation around two axes: a tilting axis and an axis orthogonal to the tilting axis. A first brake member, typically a disc brake, is associated with at least one end, and preferably with both ends of the transverse component, which first brake member is rotatably supported on the respective wheel support arm around a rotation axis. The first brake member rotates with respect to the support arm integrally with the rotational movement of the transverse component around the tilting axis. Associated with the first brake member is a second brake member, which is rotatably supported on the respective wheel support arm around a rotation axis parallel but spaced with respect to the rotation axis of the first brake member. Such second brake member is constrained to at least one element of the suspension of the respective wheel, for example by means of a rod, so as to rotate with respect to the support arm with a rotational movement proportional to the springing movement, that is, to the movement of the suspension. By activating the brake, the two members of the brake are locked with respect to each other. Since these are supported on the support arm around parallel but non-coincident rotation axes, by activating the brake, the movement of both members of the brake with respect to the support arm is locked and, thus, the springing movement of the suspension and the tilting movement of the vehicle are consequently locked.

The first embodiment will now be described in greater detail with reference to the attached drawings. In FIGS. 1 to 7, the motor vehicle 1 comprises a frame 3, a rear driving wheel 5, drivingly connected to an engine (not shown) which supplies the driving torque, and a pair of front steered wheels. More specifically, the motor vehicle 1 comprises a first front steered wheel 7', or left front steered wheel 7', and a second front steered wheel 7", or right front steered wheel 7". Hereinafter, components, groups or elements symmetrical with respect to a center line plane M of the motor vehicle 1 are referred to with the same reference numeral followed by a single apostrophe (') for elements on the left side of the center line plane M, and with double apostrophe (') for elements on the right side of the center line plane M.

In the embodiment illustrated in FIGS. 1 to 7, in the front part of the motor vehicle 1, hereinafter also referred to as the forecarriage, a steering kinematic mechanism is provided, indicated as a whole with 9, which allows the front steered wheels 7' and 7" to perform synchronous steering and tilting movements. Herein, steering movement means the movement of the front wheels 7', 7" around respective steering axes, by means of which movement a variation of trajectory is imparted to the vehicle with respect to a rectilinear trajectory in the forward direction F. Herein, tilting movement means the movement that allows the motor vehicle 1 to tilt with respect to a vertical plane, for example when the vehicle takes a curve.

In the illustrated embodiment, the steering kinematic mechanism 9 comprises a four bar linkage 11, more precisely a parallelogram bar linkage, hereinafter referred to as a tilting four bar linkage 11.

The tilting four bar linkage 11 has a first upper crosspiece 13 and a second lower crosspiece 15, substantially parallel to each other. The upper crosspiece 13 and the lower crosspiece 15 extend in the left-right direction, transversely to the median plane M.

The two crosspieces 13, 15 are pivoted to the frame 3 at two intermediate points by hinges 13A and 15A, respectively. In this way, the two crosspieces 13 and 15 can rotate around respective rotation axes parallel to each other and lying on the center line plane M of the frame 3 of the vehicle 1, to perform a tilting movement, for example when the motor vehicle 1 takes a curve at high speed.

The tilting four bar linkage 11 further comprises two uprights, respectively a left upright 16' and a right upright 16". The two uprights 16', 16" are hinged to the upper crosspiece 13 and the lower crosspiece 15 to form therewith the tilting four bar linkage. Reference numbers 17', 19' and 17", 19" indicate hinges on either side of the vehicle 1, through which the uprights 16' and 16" are hinged to the crosspieces 13, 15. More specifically, the upper crosspiece 13 is hinged at a first end 13.1 by the hinge 17' to the left upright 16' and at a second end 13.2 by the hinge 17" to the right upright 16". Similarly, the lower crosspiece 15 is hinged at a first end 15.1 by the hinge 19' to the left upright 16' and at a second end 15.2 by the hinge 19" to the right upright 16". The hinges 17', 17" and 19', 19" define mutual rotation axes of the crosspieces 13, 15 and of the uprights 16', 16". The rotation axes defined by the hinges 17', 17" and 19', 19" are parallel to the rotation axes of the crosspieces 13, 15 with respect to the frame 3.

In addition to the tilting four bar linkage 11, the steering kinematic mechanism 9 comprises a pair of support arms to which the front steered wheels 7', 7" are connected. More precisely, a left support arm 21' supports the left front steered wheel 7' and a right support arm 21" supports the right front steered wheel 7".

In the illustrated embodiment, the two support arms 21', 21" are shaped as half forks, but it should be understood that other arrangements are possible. Each support arm 21', 21" is connected to the tilting four bar linkage 11 so as to rotate around a respective steering axis, indicated with 21A' and 21A", for the left wheel 7' and for the right wheel 7", respectively. The steering axes 21A' and 21A" are oriented approximately in the direction of the arrow U, and more precisely they are tilted slightly backwards with respect to the vertical.

In the illustrated embodiment, the upper part of each support arm 21', 21" is housed within the respective upright 16', 16" of the tilting four bar linkage 11. To this end, the two uprights 16', 16" can be made with an internally hollow cylindrical body, wherein bearings (not shown) of the support arms 21', 21" of the wheels 7', 7" are mounted.

Figure 3:
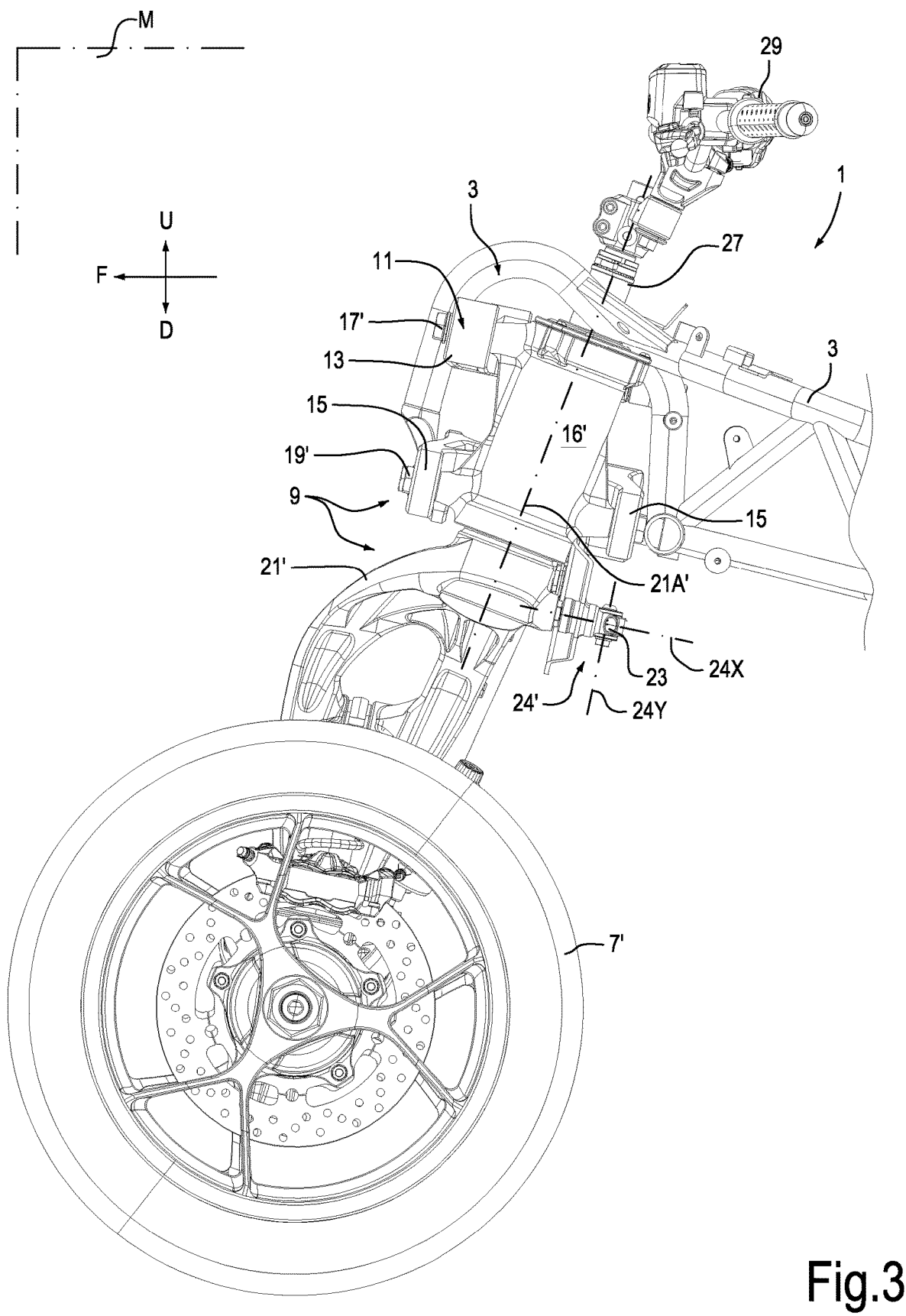
FIG. 3 shows a side view along line of FIG. 2 of the front-end of the motor vehicle of FIGS. 1 and 2.
Figure 4:
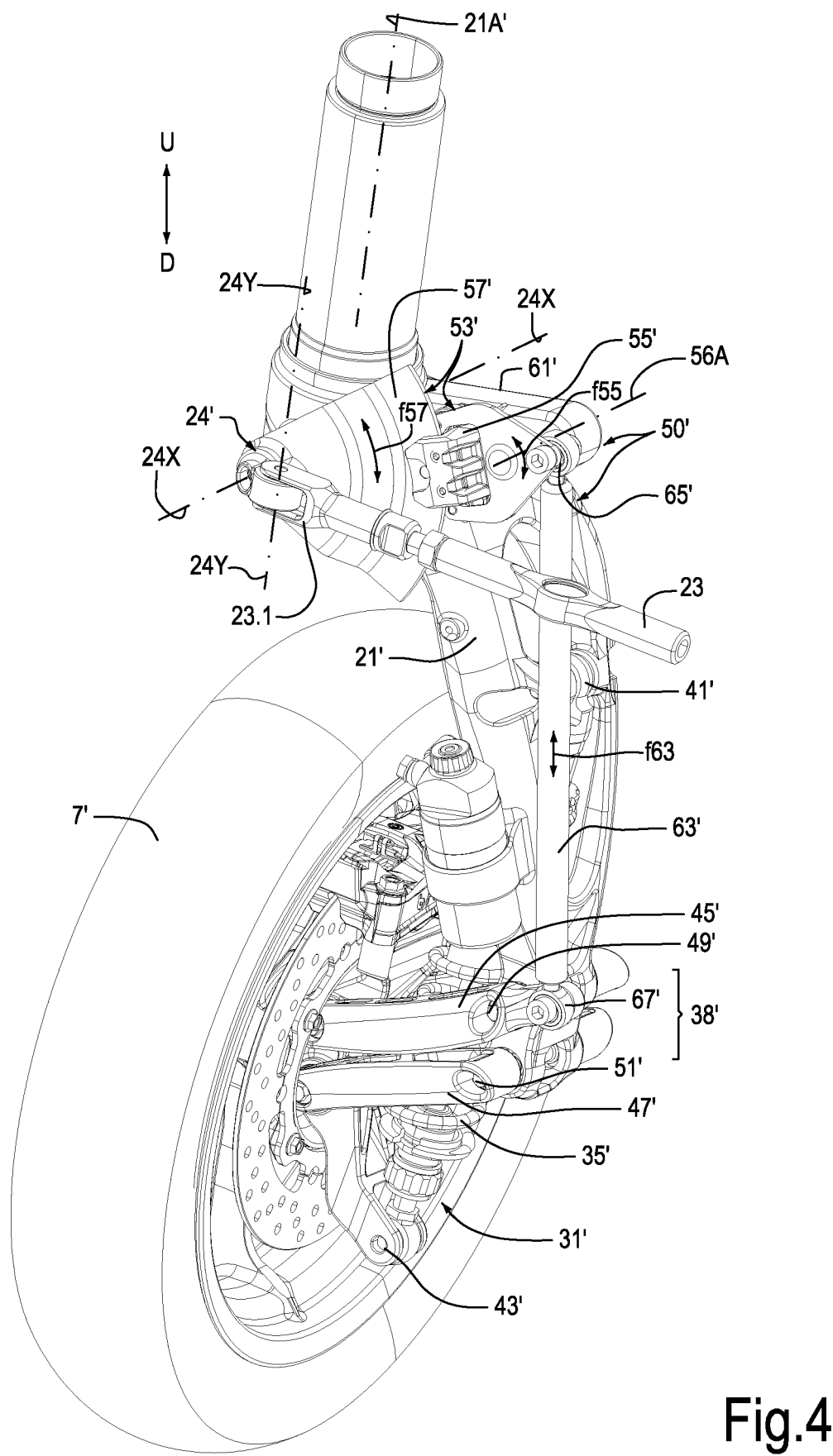
FIGS. 4 and 5 show isometric views, according to different angles, of a support of the right wheel of the motor vehicle of FIGS. 1 to 3.
Figure 5:
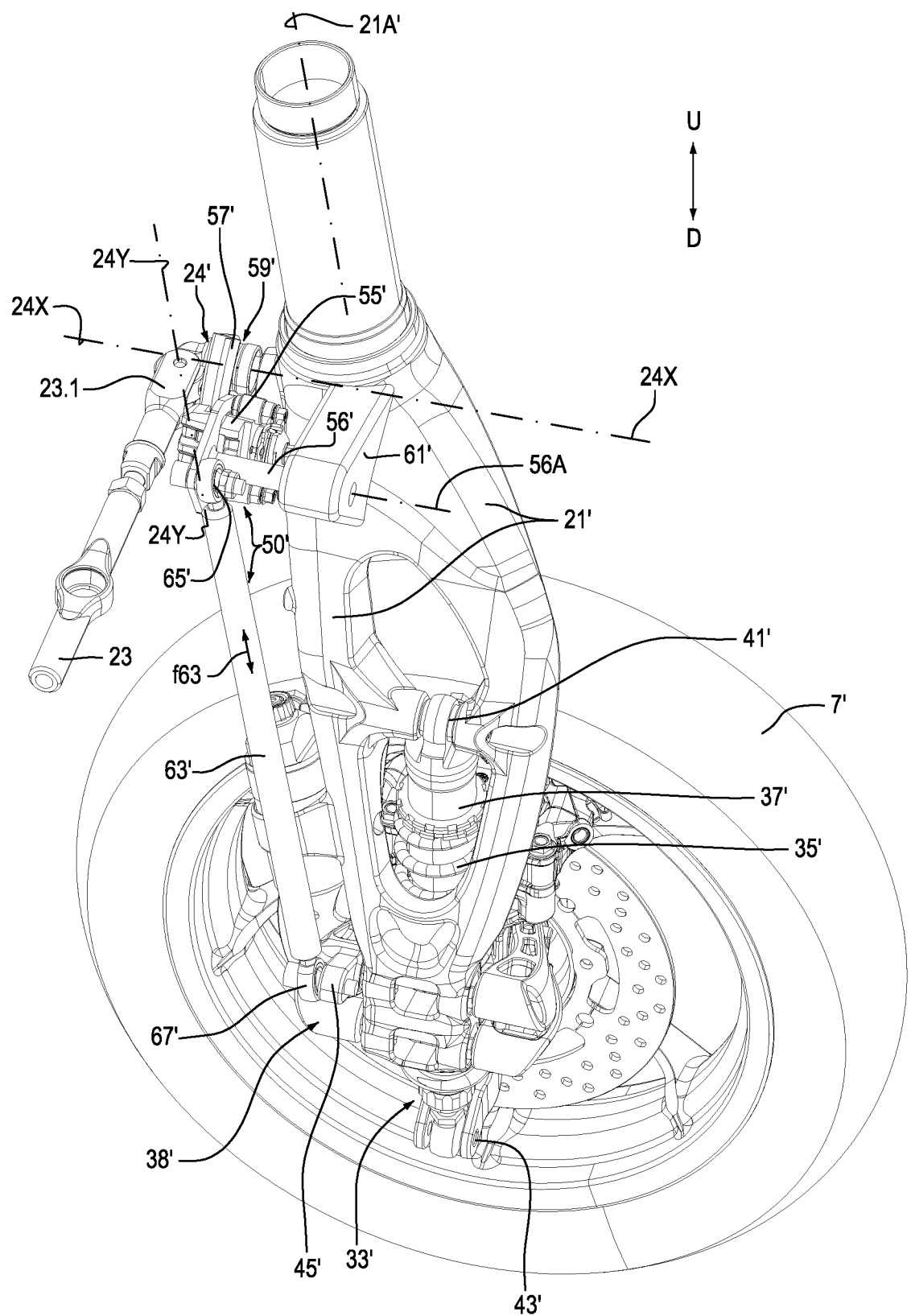

In order to control the steering movement of the two support arms 21', 21" around the steering axes 21A', 21A", a transverse component 23 extending in a right-left direction is provided. In the embodiments illustrated here, the transverse component 23 makes up a steering bar, that is, a bar that transmits the steering movement from the steering column to the two support arms 21', 21" and thus to the two front steered wheels 7', 7". Hereinafter, the transverse component 23 will therefore be referred to as the steering bar 23. The steering bar 23 has a left end 23.1 hinged by a joint 24' to the left upright 16', and a right end 23.2 hinged by a joint 24" to the right upright 16". Each joint 24', 24" defines two mutual rotation axes between the steering bar 23 and the respective upright 16', 16". The two rotation axes defined by the joint 24' are indicated in FIGS. 3, 4 and 5 with 24X and 24Y. The axes 24X of the two joints 24', 24" have an orientation predominantly in the forward direction F of the motor vehicle 1 and allow the steering bar 23 to rotate with respect to the support arms 21', 21", and thus with respect to the uprights 16', 16", when the motor vehicle 1 performs a tilting movement. Therefore, the axes 24X are herein also referred to as tilting axes. The axes 24Y have a predominantly upward orientation (arrow U-D) and allow the steering bar 23 to rotate with respect to the uprights 16', 16" to perform the steering movement.

Figure 2:
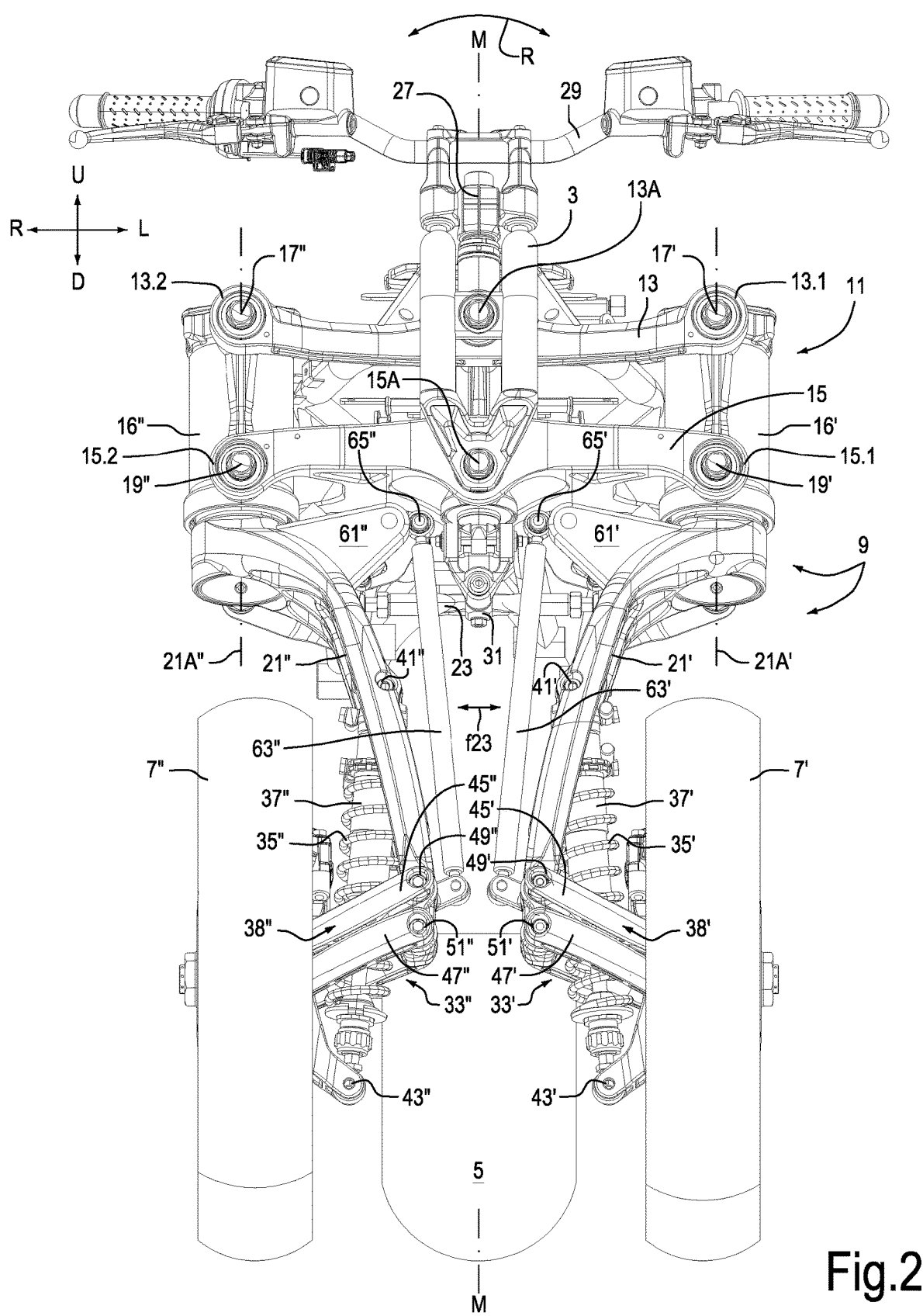
FIG. 2 shows a front view of the motor vehicle of FIG. 1.
Figure 6:
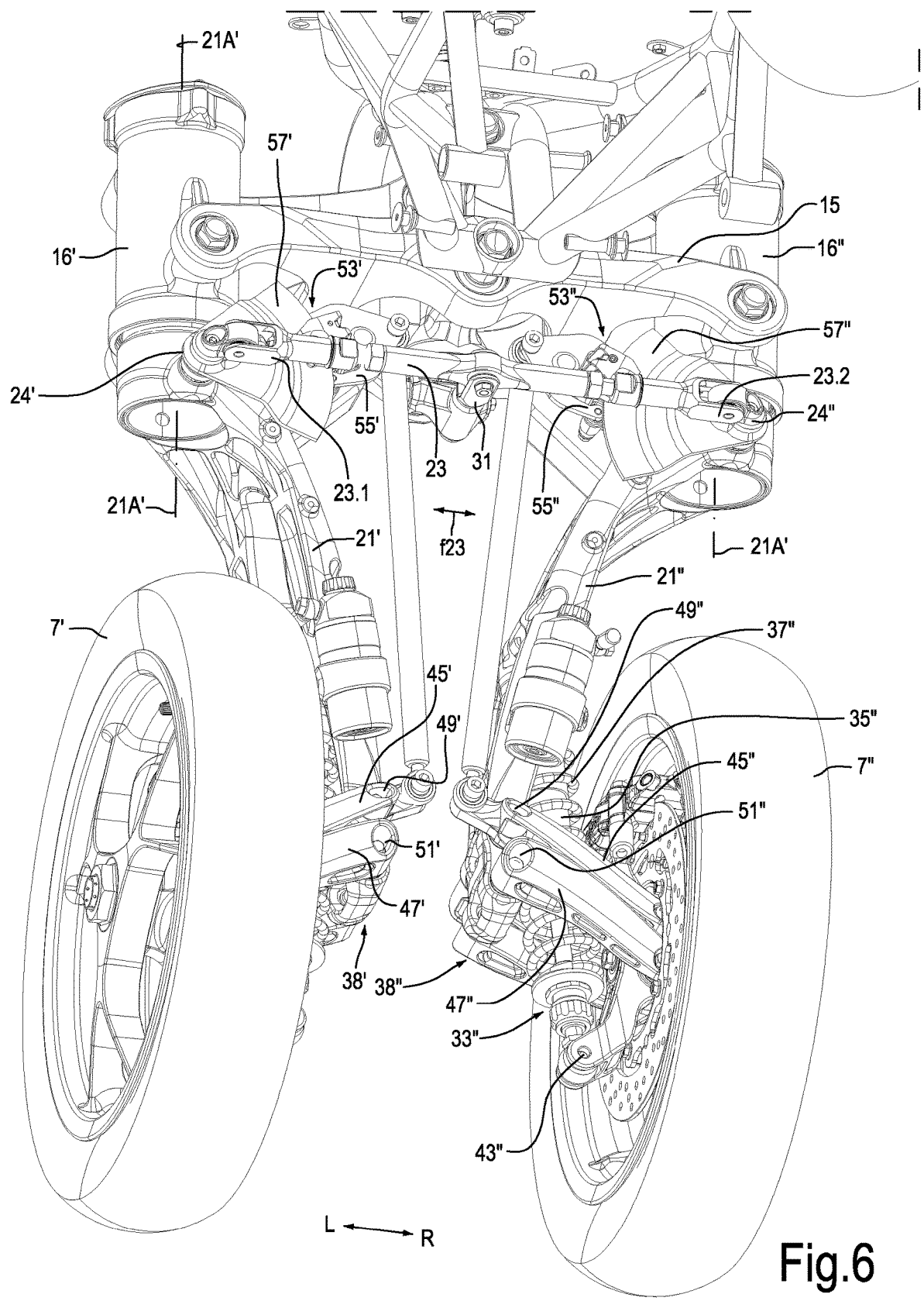
FIG. 6 shows an enlarged view of FIG. 1.

The steering bar 23 is movable along to the double arrow f23 (FIGS. 1, 2, 6) upon control by a steering column 27 operated by means of a handlebar 29 of the motor vehicle 1. The steering column 27 is connected at a central point to the steering bar 23, by means of a transmission 31 (FIGS. 2, 6). The rotation of the handlebar 29 around the axis of the steering column 23 causes the translation of the steering bar 23 according to arrow f23 and this movement is transmitted by the joints 24', 24" to the support arms 21', 21" of the front steered wheels 7', 7", which simultaneously rotate around the steering axes 21A', 21A". An rolling movement, i.e., a tilting movement of the motor vehicle 1, schematically indicated by the double arrow R in FIG. 2, causes, on the other hand, a rotation of the steering bar 23 with respect to the support arms 21', 21" around the respective tilting axes 24X of each end 23.1, 23.2.

Generally, tilting and steering movements occur simultaneously during travel. When the motor vehicle 1 is stationary, as will be clarified hereafter, it is appropriate to lock the tilting movement, leaving the steering movement free and, the tilting locking device, described hereinafter in detail, is provided for this purpose.

Each front steered wheel 7', 7" is connected to the respective support arm 21', 21" by a suspension 33', 33". Suspensions can have different shapes, as is well-known to those skilled in the art. The suspension described below, and illustrated in the attached drawings, must therefore be construed as an example and not a limitation.

In the illustrated embodiment, each suspension 33', 33" comprises an elastic member 35', 35", in the example a coil spring, and a viscous member, i.e. a shock absorber 37', 37". In the illustrated non-limiting example, the elastic member 35', 35" and the shock absorber 37', 37" are coaxial with each other. The assembly consisting of the elastic member 35', 35" and the shock absorber forms, together with an attachment 38', 38" (hereinafter referred to as the "suspension mechanism 38', 38"), the suspension 33', 33". The assembly consisting of the elastic member 35', 35" and the shock absorber 37', 37" is connected to a point on the respective support arm 21', 21" and to a point on the suspension mechanism 38' 38". Each suspension mechanism 38', 38" supports the respective front steered wheel 7', 7". The suspension mechanism 38', 38" is rigidly constrained to a shaft (not shown) to which the respective front steered wheel 7', 7" is rotatably mounted.

In the illustrated embodiment, the suspension mechanism 38', 38" is comprised or consists of a suspension four bar linkage which moves on a plane containing the rotation axis of the respective front wheel 7', 7".

Reference numbers 41', 41" and 43', 43" indicate the points of constraint of the assembly formed by the elastic member 35', 35" and the shock absorber 37', 37" to the respective support arm 21', 21" of the steered wheel and to the suspension mechanism 38', 38" (see in particular FIGS. 2, 4, 5).

Generally, the suspension mechanism 38', 38" is arranged to allow a springing movement between the respective front steered wheel 7', 7" and the respective support arm 21', 21". This springing movement corresponds to a contraction and extension movement of the shock-absorbing suspension 33', 33", and more specifically of the elastic member 35', 35" and shock absorber 37', 37.

More specifically, in the illustrated embodiment, the suspension mechanism 38', 38" comprises, or consists of a suspension four bar linkage with two cranks (o rockers) 45', 47' and 45", 47", respectively. While in the illustrated embodiment each suspension four bar linkage is arranged so as to oscillate on a plane containing the rotation axis of the respective wheel, in other embodiments the oscillation plane of the suspension four bar linkage can be orthogonal with respect to what is illustrated in the attached drawing, that is, the oscillation plane of the suspension four bar linkage can be orthogonal to the rotation axis of the respective wheel.

In the illustrated exemplary embodiment, each crank 45', 47' and 45", 47" is pivoted at 49', 51' and 49", 51" to the respective support arm 21', 21" of the front steered wheel 7', 7". During travel, uneven ground causes a springing movement of the sprung mass of the motor vehicle 1 with respect to the unsprung mass of the motor vehicle. Sprung mass means the part of the mass of the motor vehicle 1 which acts on the wheels through the suspensions. Such mass comprises, in particular, the frame, load, engine, etc., while unsprung mass means the part of the mass of the motor vehicle 1 which is not supported by the suspension, in particular wheels, brakes, etc.

The springing movement of the sprung mass with respect to the front steered wheels 7', 7" involves an extension and contraction movement of the springs 35', 35" and the shock absorbers 37', 37" of the suspensions 33', 33", to which an oscillating movement of the suspension four bar linkages 38', 38" corresponds. This movement of the suspensions 33', 33" can cause, when the vehicle is stationary or almost stationary, a pitching movement of the vehicle, when the suspensions move identically and synchronously, or it can induce a tilting movement of the motor vehicle 1, when the two suspensions contract and stretch differently from each other.

In order to avoid the risk of the motor vehicle 1 falling over when it moves at low speed or is stationary, the tilting movements, both due to the deformation of the tilting four bar linkage 11 and to unequal contractions or extensions of the two suspensions 33', 33", must be locked. To this end, a locking device is provided which is described in detail below.

In summary, the tilting locking device is arranged to lock, with a single actuator: the springing movement on at least one side of the motor vehicle 1, and preferably on both sides of the motor vehicle 1; and furthermore the rotational movement, determined by tilting, of at least one member of the steering kinematic mechanism 9.

More particularly, in the illustrated embodiment, a tilting locking device is provided which locks the contraction and extension movements of both suspensions 33', 33" and further locks the rotational movement of the steering bar 23 around the tilting axes 24X, leaving the steering movement, i.e. the rotational movement of the steering bar 23 around the axes 24Y, free.

More particularly, in the illustrated embodiment, a tilting locking device is provided which rigidly connects the suspension mechanisms 38', 38" and the steering bar 23 to one another. The components of the tilting locking device associated with the left front steered wheel 7' are visible in particular in FIGS. 4 and 5. The components of the tilting locking device associated with the right front steered wheel 7" are substantially symmetrical to the components associated with the left front steered wheel 7' and are not described in detail. The right and left components of the tilting locking device are indicated in the drawings with the same reference numerals followed by an apostrophe (') for the components on the left side of the motor vehicle 1 and by double apostrophes (") for the components on the right side of the motor vehicle 1, according to the formalism also adopted for the remaining elements of the motor vehicle described above.

Figure 7:
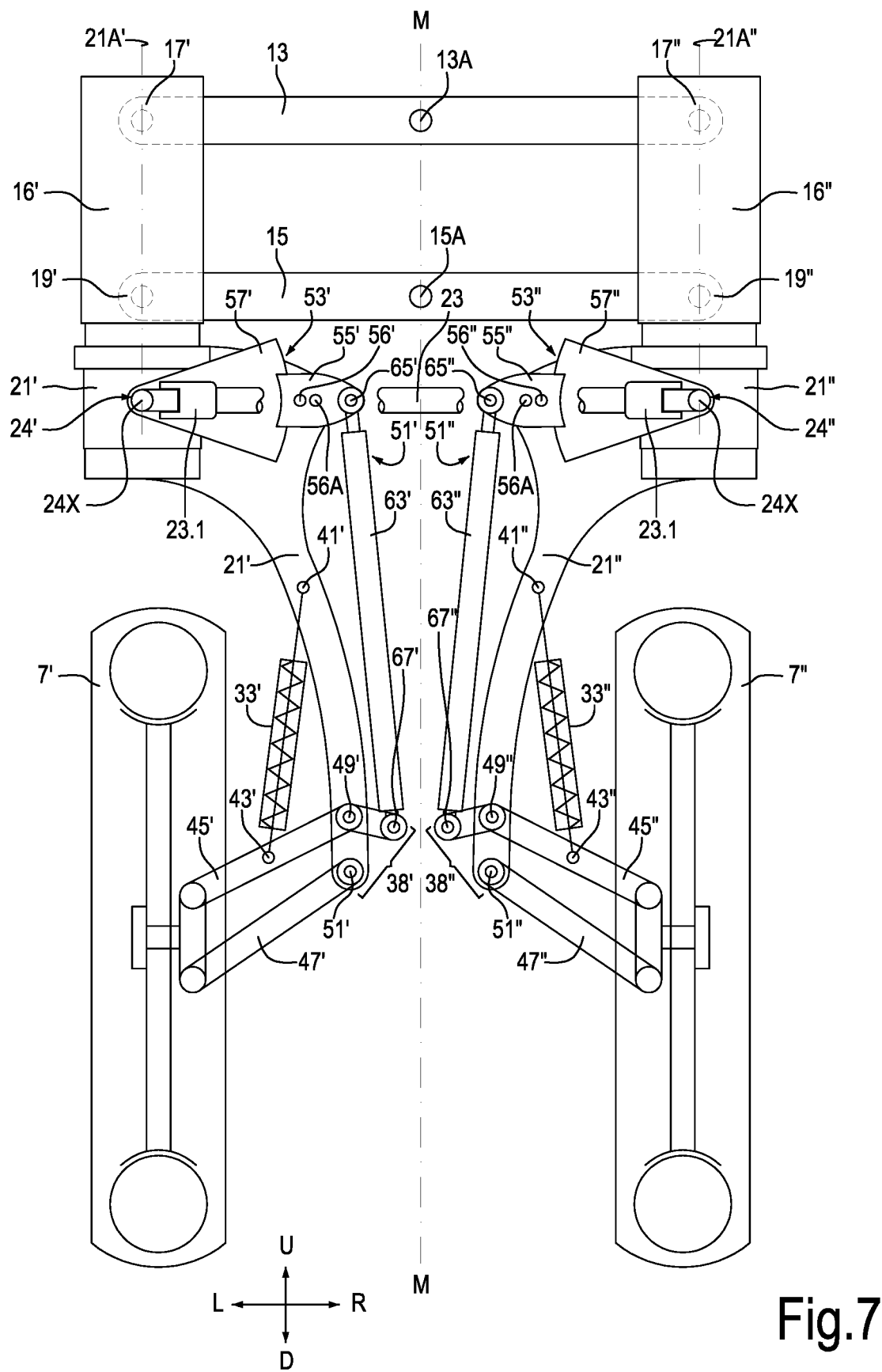
FIG. 7 shows a simplified diagram of the front-end of the vehicle of FIGS. 1 to 6.

With specific reference in particular to FIGS. 4 and 5, the assembly of components of the tilting locking device associated with the left front steered wheel 7' is generally indicated with 50'. It comprises a brake 53', in particular a disc brake, which in turn comprises a caliper 55' and a disc sector 57'. The caliper 55' is supported by the support arm 21' so that it can rotate around its own rotation axis with respect to the support arm 21' and, similarly the disc sector 57' is supported on the support arm 21' so as to be capable of rotating around its own rotation axis with respect to the support arm 21', which rotation arm is parallel to and spaced from the rotation axis of the caliper 55'. In the diagram of FIG. 7, 56' indicates the actuator of the caliper 55' of the brake 53', for example a hydraulic actuator. In practice, a single hydraulic pump can be provided to actuate the two disc brakes 53', 53". The same actuation system can be used in all embodiments disclosed hereafter. As will become clear from the following description, the brake is adapted to constrain, i.e. to lock to one another a first member of the respective suspension 33', 33", which performs a springing movement with respect to the support arm, and a second member, which is connected mechanically with the transverse component 23. In the exemplary embodiment of FIGS. 1 to 7 the first member is one of the cranks 45', 47' or 45", 47" of the suspension 33' 33". The second member is the disc sector 57', 57". The caliper 55', 55" represents a further member which is rotationally supported on the respective support arm 21', 21", and mechanically connected to the first member (crank 45', 45") so as to move with a movement proportional to the suspension springing movement.

It shall be noted that in the exemplary embodiment illustrated, as well as in the embodiments disclosed here after, a symmetric brake arrangement 53', 53" is provided. As a matter of fact, however, locking of the transverse component 23 can be performed by means of only one of said two brakes.

The caliper 55', 55" is a further member of the tilting locking device, supported on the support arm 21', 21". Said further member or caliper 55', 55" (as will become clear from the description below) is provided with a movement, with respect to the support arm, proportional to the springing movement of the respective suspension 33', 33". Typically, the movement may be a reciprocating rotational movement.

As mentioned, the disc sector 57', 57" is the second member of the tilting locking device, which second member is supported on the support arm 21', 21" and is mechanically connected to the steering bar 23, so as to move, with respect to the support arm 21', 21", with a movement proportional to the rotational movement of the steering bar 23 around the tilting axes 24X.

The caliper 55' and the disc sector 57' are arranged in such a way that, during the rotational movement of the caliper 55' and of the disc sector 57' with respect to the support arm 21', the peripheral edge of the disc sector 57' always remains inside the caliper 55', regardless of the attitude of the motor vehicle 1.

More particularly, in the illustrated embodiment, the disc sector 57' is integral with the joint 24', so as to swing, i.e. reciprocatingly rotate integrally therewith around the tilting axis 24X, which represents the rotation axis of the disc sector 57'. In FIG. 4 the oscillating movement of the disc sector 57' around the tilting axis 24X is indicated with the double arrow f57. The disc sector 57' therefore follows the tilting movement of the steering bar 23 around the tilting axis 24X.

The caliper 55' is, on the contrary, mounted to a shaft 56' (see in particular FIG. 5) having an axis 56A parallel to the tilting axis 24X, and which represents the rotation axis of the caliper 55' with respect to the support arm 211. The shaft 56' is constrained to an appendage 61' of the support arm 21' of the front steered wheel 7'. The caliper 55' is therefore rotatable around the axis 56A, with respect to the support arm 21' of the front steered wheel 7'. The oscillating movement of the caliper 55' is caused by the springing movement of the corresponding shock-absorbing suspension 33', which is transmitted to the caliper 55' in the manner described below. In practice, the caliper 55' of the brake 53' swings around the axis 56A proportionally with respect to the contraction and extension movements of the shock-absorbing suspension 33'.

The arrangement of the caliper 55' and of the disc sector 57' can be reversed with respect to that shown: the caliper 55' can be made integral with the joint 24' so as to rotate around the axis 24A, and the disc sector 57' can be mounted to the shaft 56A and connected to the shock-absorbing suspension 33' so as to swing around the axis 56A according to the movement of the shock-absorbing suspension 33'.

In order to connect the caliper 55' of the brake 53' to the shock-absorbing suspension 33', a rigid attachment member is provided which, in the illustrated example, consists of a rod 63', which transmits the movement from the shock-absorbing suspension 33', and therefore from the suspension mechanism 38' to the caliper 55'. The rod 63' is substantially rigid, meaning that its length remains constant during operation. A first end of the rod 63' is connected to the caliper 55' by means of a first joint, preferably a ball joint 65'. A second end of the rod 63' is connected, by a second joint, preferably a ball joint 67', to the suspension mechanism 38' and more particularly to a member that moves following the movements of contraction and extension (i.e. the springing movements) of the shock-absorbing suspension 33'.

In the illustrated embodiment, the rod 63' is connected by the ball joint 67' to an extension of one of the cranks 45', 47' of the suspension mechanism 38' and in particular to an extension of the crank 45'. In this way, a springing movement is transmitted by the rod 63' to the caliper 55' of the brake 53', so that the caliper swings around the axis 56A of the shaft 56' with an angle proportional to the springing movement, and therefore to the contraction and extension movement of the shock-absorbing suspension 33'. In FIG. 4 the movement of the rod 63' is indicated with the double arrow f63 and the corresponding movement of the caliper 55' is indicated with the double arrow f55.

For a more immediate understanding of the operation of the tilting locking device, FIG. 7 shows a schematic representation of the components thereof and of the elements of the motor vehicle 1 interacting therewith, and more precisely of the steering and tilting system. As noted above, the tilting locking device is of the double type and substantially symmetrical for the two right and left sides of the motor vehicle 1. In FIG. 7 the two aggregates forming the tilting locking device, that is the double (left) 50' and (right) 50" tilting locking device, are indicated with the same reference numerals followed by an apostrophe (') for the left assembly and double apostrophes (") for the right assembly.

The operation of the tilting locking device 50', 50" is as follows. When the motor vehicle 1 is running and must be free to perform a tilting movement, for example to take a curve along its trajectory, the tilting locking device 50', 50" is deactivated. In other words, in this condition the motor vehicle 1 can perform tilting movements, i.e. left and right tilting with respect to a median plane M, which are allowed by the deformation of the tilting four bar linkage 11. Springing movements, i.e. compression and extension of the two shock-absorbing suspensions 33', 33", are also freely allowed. The steering movement, i.e. rotation of the steering column 27, of the steering bar 23 and of the support arms 21', 21" of the front steered wheels 7', 7", is also freely allowed.

When the motor vehicle 1 is stationary or is moving at a very low speed, such that it is not necessary or appropriate for it to be free of tilting, in order to prevent deformation of the tilting four bar linkage 11 and/or a different contraction or extension of the two shock-absorbing suspensions 33', 33" causing the motor vehicle 1 to tilt or even fall over, the double tilting locking device 50', 50" is activated. This requires the activation of the two disc brakes 53', 53". The calipers 55', 55" of the two brakes 53', 53" are closed and thus each caliper 55', 55" and the respective disc sector 57', 57" are locked with respect to each other. Consequently, since the rotation axes of the caliper 55', 55" and of the disc sector 57', 57" are spaced apart from each other, the movement of the rod 63' with respect to the support arm 21', 21" is prevented, so that the respective shock-absorbing suspension 33', 33" also remains locked. The springing movement is prevented. The rotational movement of the joint 24', 24" around the respective tilting axis 24X is also locked and therefore the steering bar 23 can no longer rotate around these axes. The deformation of the tilting four bar linkage 11 is prevented and consequently the tilting movement is inhibited.

Therefore, with the activation of the two brakes 53', 53" all the movements of the forecarriage of the motor vehicle 1 are locked, except for the steering movement. By means of two actuators 56', 56" only, locking of the tilting movement is thus obtained, due to the inhibition of rotation of the steering bar 23 around the tilting axes 24X; at the same time, the springing movement of both front steered wheels 7', 7" is also locked, due to the contraction and extension movement of the two suspensions 33', 33" being prevented. On the two sides of the motor vehicle 1 a respective single brake 53', 53" therefore locks the tilting movement and the springing movement, effectively making the steering bar 23 and an unsprung element of the suspension mechanism 38', 38", in this specific case the crank 45', 45", integral with each other. Since the two components (steering bar 23 and crank 45', 45") are not adjoining, that is, they are not hinged to each other, a transmission member is provided, consisting of the rod 63', 63", which transmits the movement of the crank 45', 45" to the caliper 55'.

In the embodiment of FIGS. 1 to 7, locking of the tilting movement and of the springing movement is obtained by rigidly constraining the disc sector 57', 57" to the caliper 55', 55" of each brake 53', 53", so as to constrain the steering bar 23 to one of the components (crank 45', 45") of the suspension mechanism 38', 38". The two members of the brake 53', 53" are in this case hinged on the respective support arm 21', 21" of the front steered wheel 7', 7". This, however, is not the only possible solution.

Figure 8:
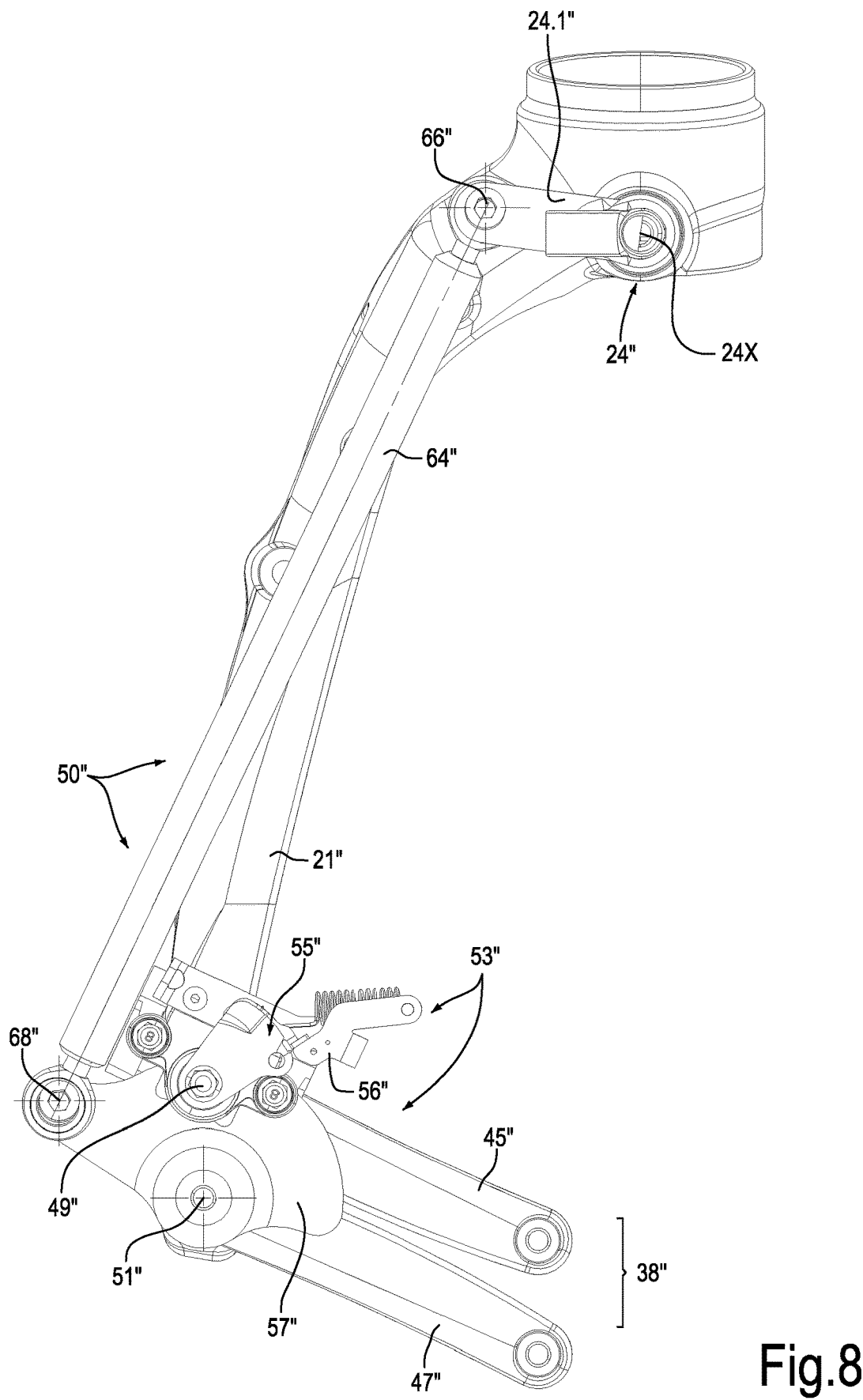
FIG. 8 shows a tilting locking device in a further embodiment.
Figure 9:
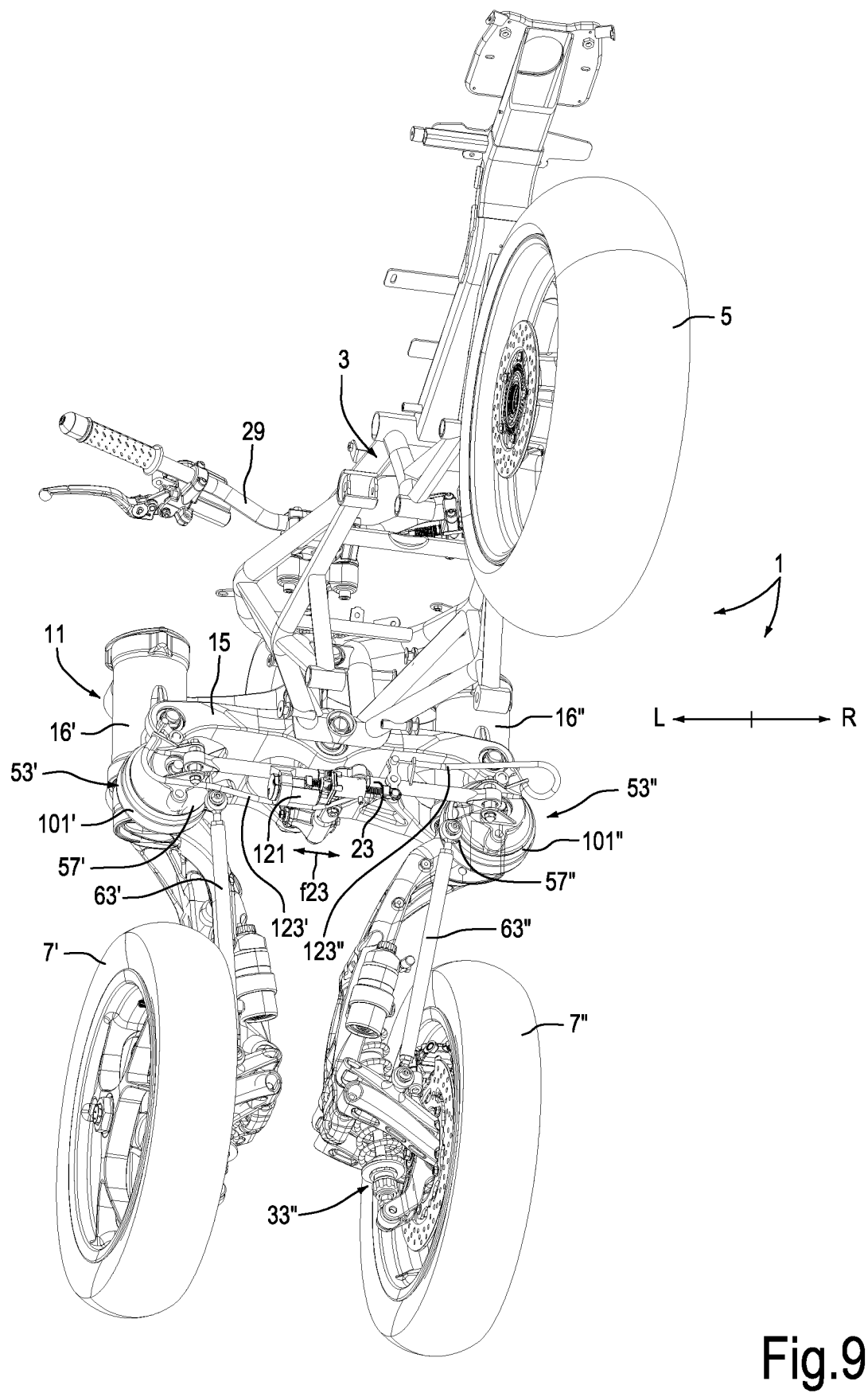
FIG. 9 shows a bottom isometric view, with parts removed, of a three-wheeled motor vehicle according to a further embodiment.
Figure 10:
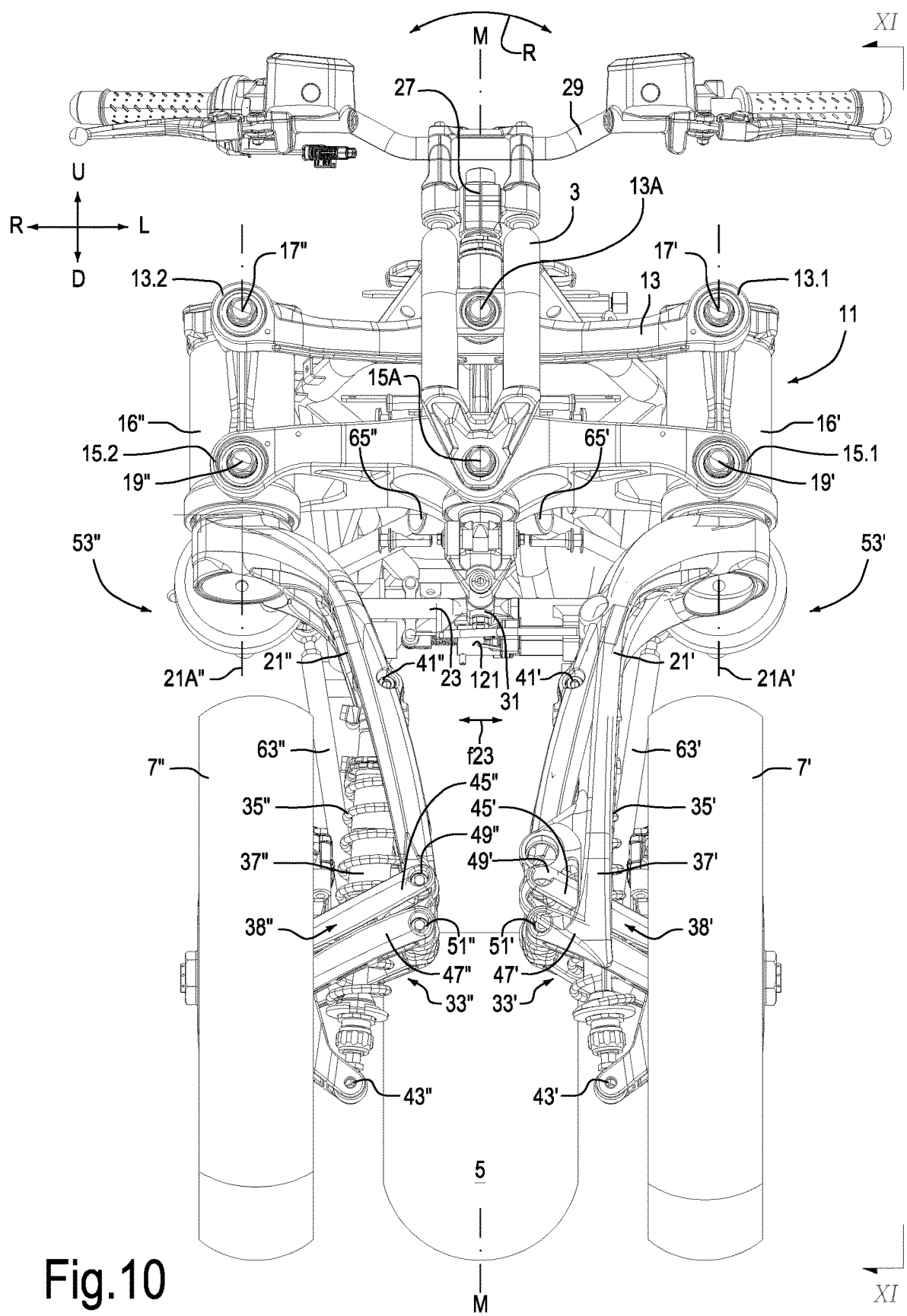
FIG. 10 shows a front view of the motor vehicle of FIG. 9.
Figure 11:
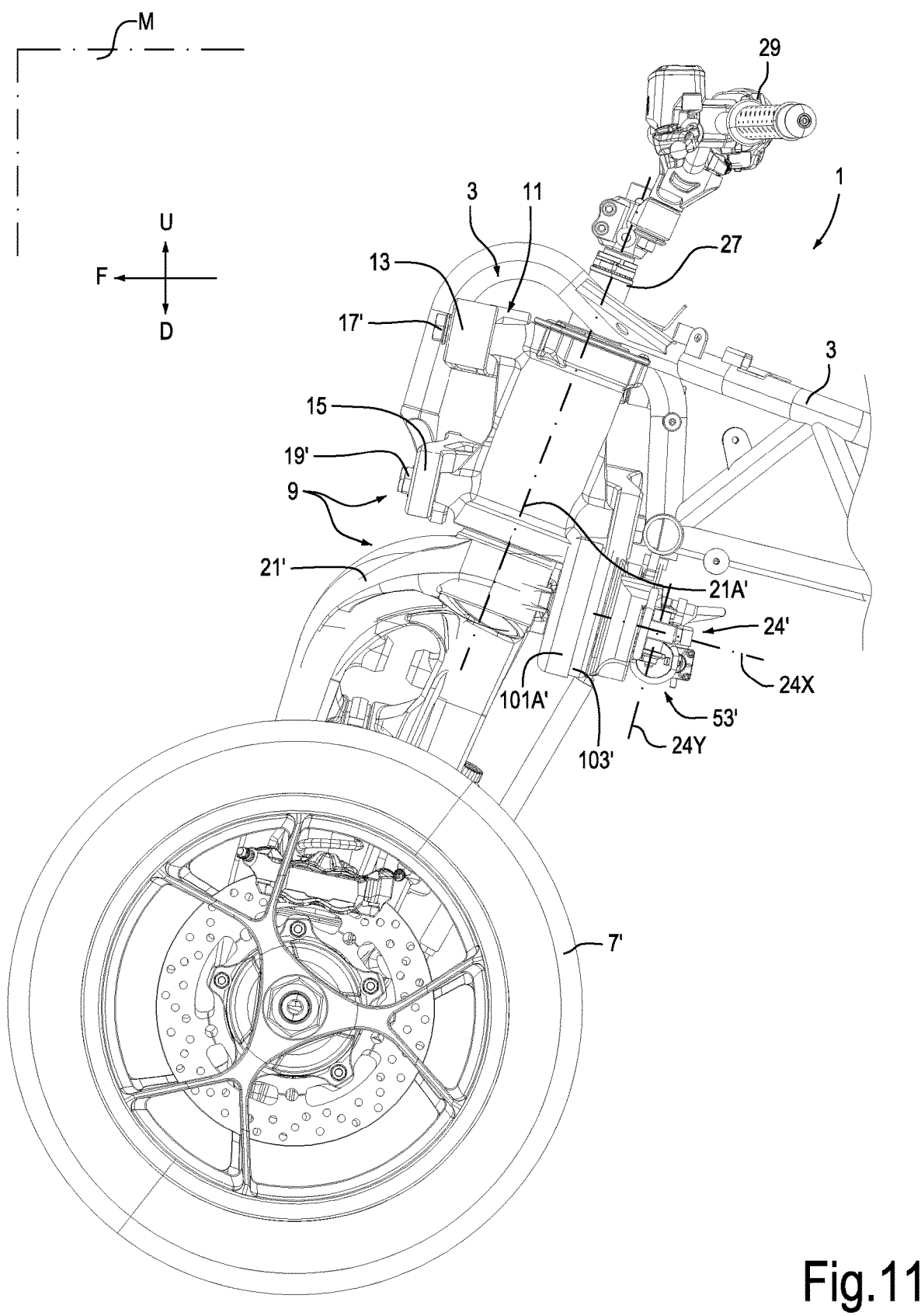
FIG. 11 shows a side view along line XI-XI of FIG. 10 of the front-end of the motor vehicle of FIGS. 1 and 2.
Figure 12:
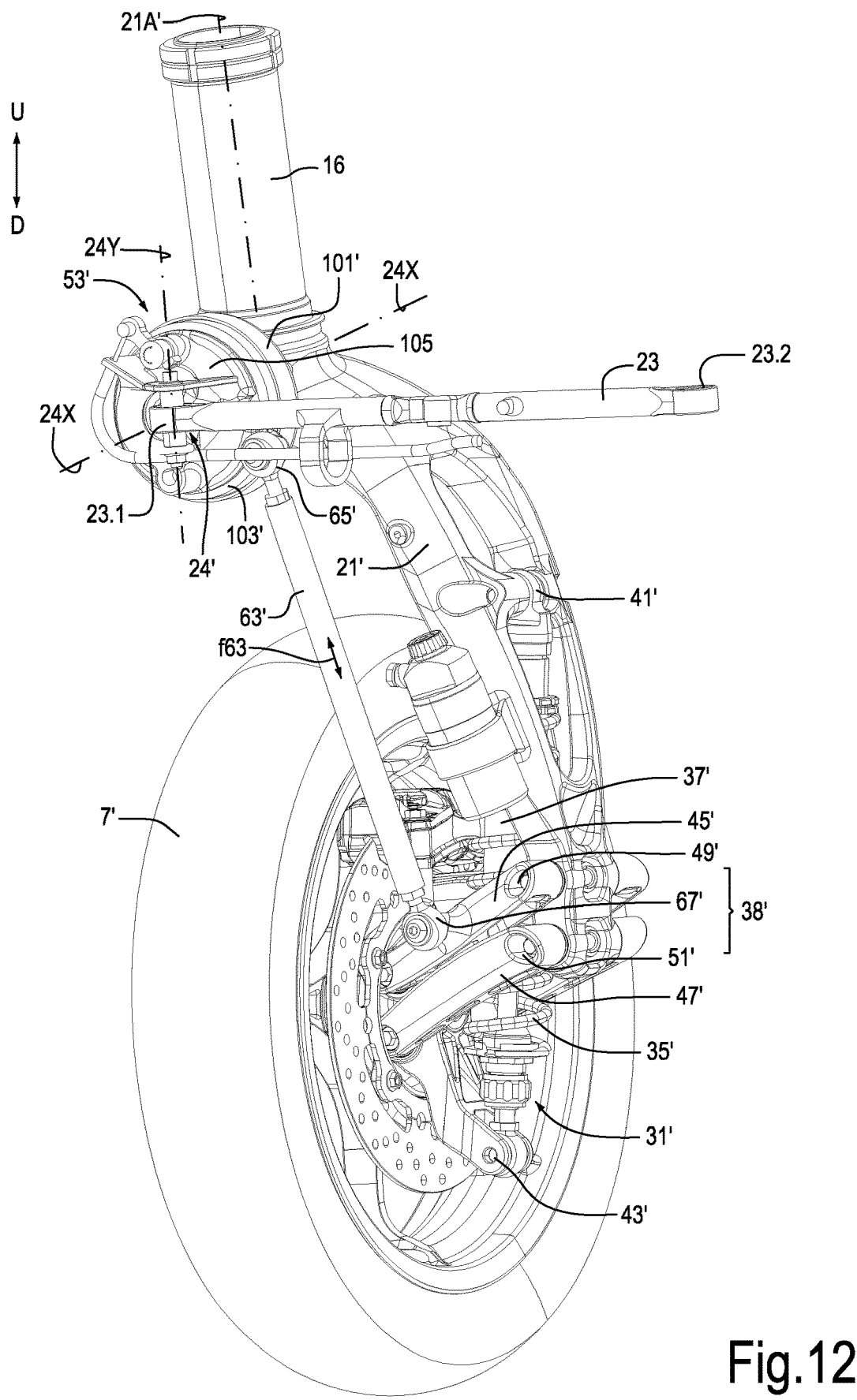
FIGS. 12 and 13 show isometric views, according to different angles, of a support of the right wheel of the motor vehicle of FIGS. 9 to 11.
Figure 13:
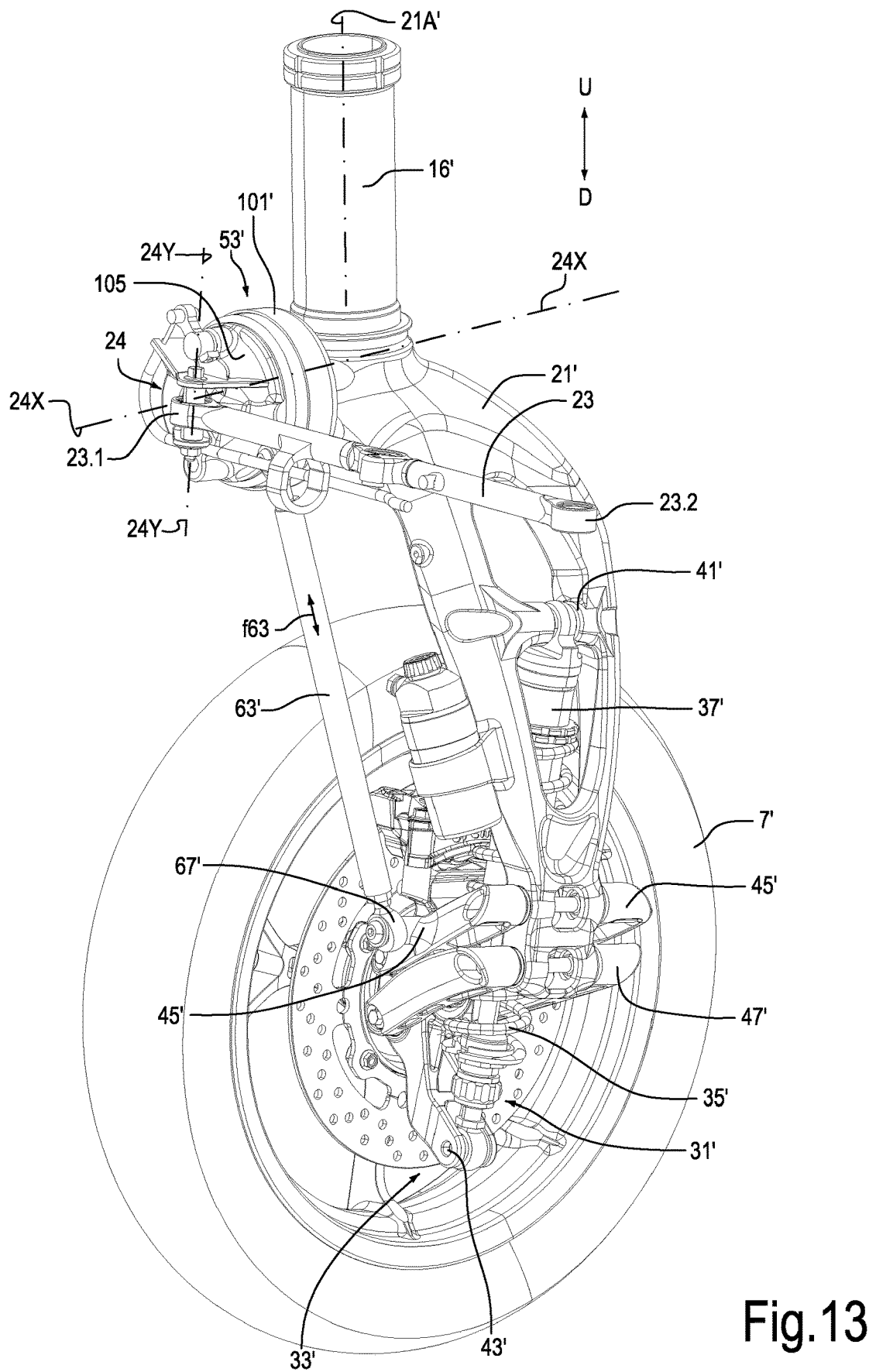
Figure 14:
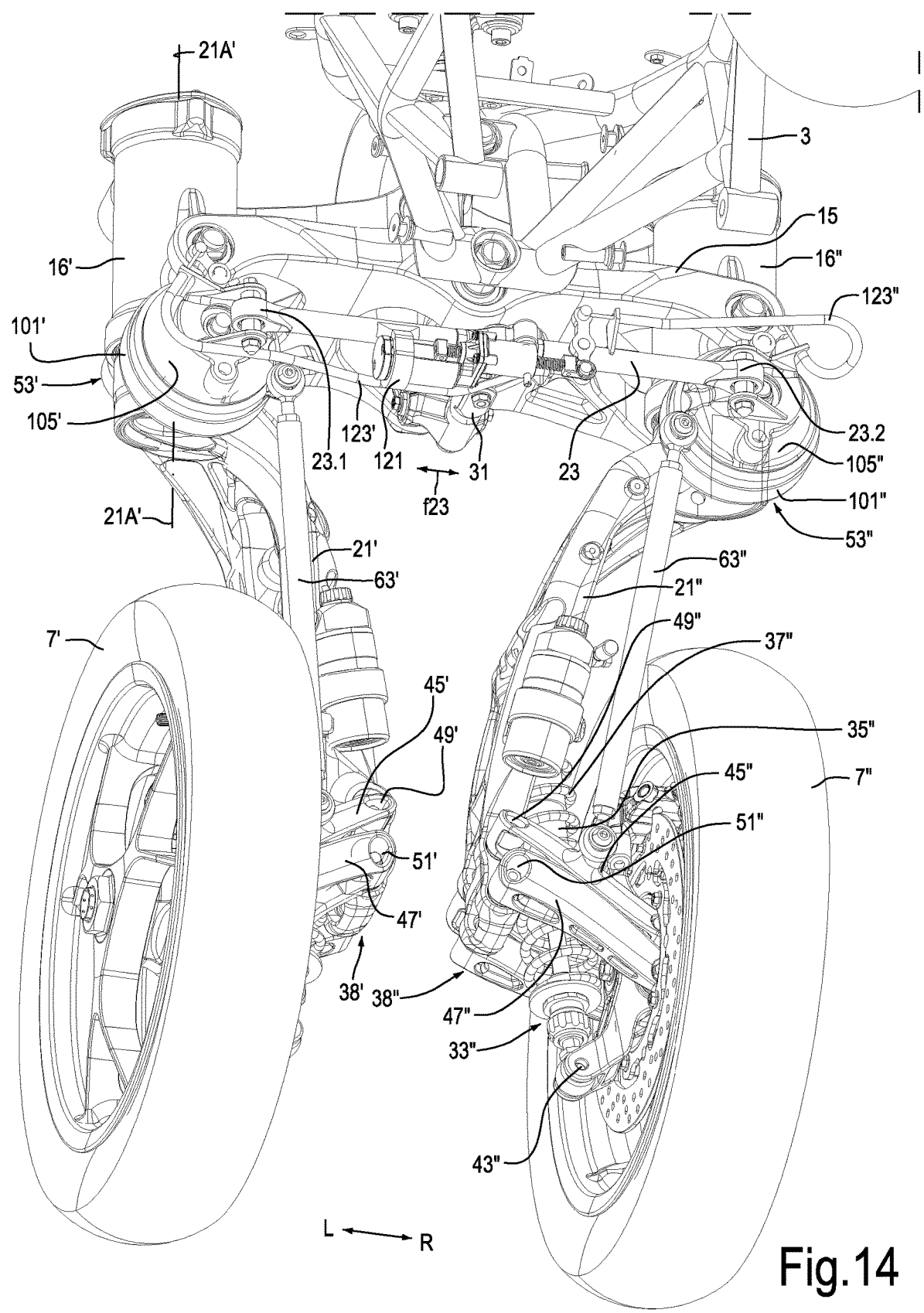
FIG. 14 shows an enlarged view of FIG. 9.

Embodiment of FIG. 8

The embodiment of FIG. 8 differs from the embodiment of FIGS. 1 to 7 substantially due to the different arrangement of the members of the brake 53', 53" of the tilting locking device.

In summary, in the embodiment of FIG. 8 a tilting saddle motor vehicle is provided with at least two front steered wheels, which has a tilting four bar linkage extending in a transverse, i.e. right-left, direction. The tilting four bar linkage has two crosspieces, respectively upper and lower crosspieces, joined by two uprights, respectively right and left uprights. Right and left support arms, which respectively support the right front steered wheel and the left front steered wheel with the interposition of a respective suspension, are associated with the uprights. The two support arms are joined by a transverse component, which may consist of the steering bar and which is constrained by its two ends to the two support arms with respective joints that allow rotation around two axes: a tilting axis and an axis orthogonal to the tilting axis. A member for transmitting the rotational movement of the transverse component around the tilting axis is associated with at least one end, and preferably with both ends of the transverse component. The transmission member, for example a rod, transmits a rotational movement to a first brake member, typically a disc brake, which first member is supported by the respective support arm of the wheel and is adapted to rotate with respect thereto around a rotation axis, with a movement proportional to the tilting movement of the transverse component. The first brake member is associated with a second brake member, which is rigidly connected to a member of the suspension, to rotate, with respect to the support arm, around its own axis, with a rotational movement proportional to the tilting movement of the suspension. The rotation axes of the first member and of the second brake member with respect to the support arm are parallel but spaced apart. By activating the brake, the two members of the brake are locked with respect to each other; thus, being said members rotatable around non-coincident axes, locking of the movement of both members of the brake with respect to the support arm to which they are mounted is thus obtained, and consequently: the springing movement of the suspension and the tilting movement of the vehicle are locked.

In this embodiment, the structure of the motor vehicle 1 is substantially as described with reference to FIGS. 1 to 7. In FIG. 8, this different embodiment of the tilting locking device is shown schematically, and limited to the right assembly of components 50", wherein the members of the brakes, again labeled 53", are hinged to the bottom part of the support arm 21", that is at the suspension mechanism 38" forming part of the suspension 33". The spring 35" and the shock absorber 37" of the latter are omitted.

More specifically, with reference to FIG. 8, the suspension mechanism 38" comprises again a four bar linkage with a first crank 45" hinged at 49" to the support arm 21", and a second crank 47" hinged at 51" to the support arm 21". The brake 53" comprises a caliper 55", integral with the crank 45" and swinging integrally therewith around the fulcrum 49". The caliper 55" co-acts with a disc sector 57" of the brake 53". The disc sector 57" is hinged on the support arm 21" at the fulcrum 51", where the crank 47" is also hinged.

As will become apparent from the detailed description below, each brake arrangement 53', 53" locks, i.e. constrains, to one another a first member of the respective suspension, which performs a springing movement, and a second member mechanically connected to the transverse component 23 to perform rotational movement proportional to the rotation of said transverse component around the tilting axes. In this embodiment, the first member is the crank 45', 45" of the suspension four bar linkage 38', 38". The second member is the disc sector 57', 57".

As in the previously described embodiment of FIGS. 1 to 7, the tilting locking device 50'. 50" comprises, in addition to first member 45', 45" and second member 57', 57", a further member supported by support arm 21', 21" and mechanically connected to the first member 45', 45". In the embodiment of FIG. 8 the further member is the caliper 55', 55" of the brake.

The disc sector 57" does not rotate integrally with the crank 47", rather, it is connected, by means of a rod 64", to the joint 24". The joint 24" can have an appendage 24.1" rotating around the tilting axis 24X of the joint 24". The rod 64" is connected at a first end, by a first ball joint 66", to the joint 24", and more precisely to the appendage 24.1" of said joint 24. The rod is further connected at a second end by a second ball joint 68" to the disc sector 57". The rod 64" rotates around the tilting axis 24X integrally with the steering bar 23. In this way, the rotational movement of the steering bar 23 around the tilting axis 24X is transmitted to the disc sector 57" of the brake 53". Substantially, thanks to the transmission represented by the rod 64", the disc sector 57" rotates around the axis of the fulcrum 51" by an angle proportional to the angle of relative rotation between the steering bar 23 and the support arm 21" around to the tilting axis 24X. The caliper 44" of the brake 53" oscillates around the fulcrum 49" with respect to the support arm 21" by an angle equal to the angle of oscillation of the crank 45", that is, the angle that determines the springing movement.

The arrangement described above is symmetrically mirrored on the right side of the motor vehicle 1. The remaining parts and components of the motor vehicle 1, not shown in FIG. 8, can be configured as already described with reference to FIGS. 1 to 7.

As noted above for the embodiment of FIGS. 1 to 7, the arrangement can be reversed, with the caliper 55" hinged around the fulcrum 51" of the second crank 47" of the suspension mechanism 38" and the disc sector 57" integral with the first crank 45" and swinging around the fulcrum 49".

The operation of the motor vehicle 1 provided with a tilting locking device 50" of the type illustrated in FIG. 8 is as follows. When the motor vehicle 1 is in normal travel and must be free to perform a tilting movement, i.e. to tilt around a median plane M orthogonal to the surface on which the motor vehicle 1 is moving, the tilting locking device is deactivated. The brake 53" is inactive. Also inactive is the brake 53', made and arranged in a mirror-like manner with respect to the brake 53", on the left side of the motor vehicle 1.

When the tilting locking needs to be activated, for example when the motor vehicle 1 moves at very low speed and is about to stop, or is stationary or parked, it is sufficient to activate the two actuators 56", 56' of the disc brakes 53" (FIG. 8) and 53' (not shown in FIG. 8). In this way, the disc sector 57', 57" and the respective caliper 55', 55" are made integral with each other. As a consequence, on the right side the steering bar 23, the rod 64", the disc sector 57", the caliper 55" and the crank 45" are locked and cannot rotate with respect to the support arm 21". Similarly, the second crank 47" is locked, which is part of the same suspension four bar linkage to which the crank 45" belongs.

Consequently, the springing movement of the right front steered wheel 7" is prevented, as the cranks 45", 47" cannot rotate with respect to the support arm 21" of the left front steered wheel 7". With the mirrored arrangement on the left side of the motor vehicle 1, the springing movement of the right front steered wheel 7' is also locked. The impossibility for the steering bar 23 to rotate around the tilting axis 24X locks the tilting movement, i.e. the deformation of the tilting four bar linkage 11.

In the embodiment of FIG. 8, there is also provided a particularly advantageous feature from the point of view of dimensions. The caliper 55" is mounted in such a way that the brake pad (not visible) is arranged at the rotation axis defined by the fulcrum 49". In this way, the relative movement between the disc sector 57" and the caliper 55" is minimized.

In all the illustrated embodiments, the activation of the tilting movement locking can be manual or automated. In the second case, for example, a speed sensor can be provided which activates the tilting locking when the forward speed of the motor vehicle 1 is lower than a predetermined value.

In all the embodiments described hereinbefore, the two brakes 53', 53" can be actuated with a mechanical, hydraulic, electric actuator or in any other way. For example, each caliper 55', 55" can be provided with its own hydraulic actuator, which can be actuated by a single hydraulic pump supplying pressurized fluid to the two calipers. In other embodiments, a mechanical control can be provided, with traction cables acting on the two calipers 55', 55", for example with a mechanical, electrical or pneumatic control. In all cases, a single actuation mechanism may be sufficient to activate both brakes 53', 53".

In the embodiments described hereinbefore, the tilting locking device is arranged with a disc brake on each side of the motor vehicle 1. The locking of the tilting movement and of the springing movement obtained by the brake makes two members (disc sector 57', 57" and caliper 55', 55") integral with each other, which in normal travel conditions are free to rotate with respect to the support arm 21' and 21", respectively, around parallel but spaced apart axes thereof. Furthermore, the rotational movement of the two members is proportional to the rotational movement of the steering bar 23 around the tilting axes 24A and to the rotational movement of a member (45'; 45") of the suspension 33'; 33".

In other embodiments, on the other hand, it is possible to act with a brake on each side of the motor vehicle 1 to directly lock the rotational movement of two coaxial members, which in normal travel conditions are free to rotate independently around a common axis, performing rotations around said axis which are a function of the tilting movement and of the springing movement.

Embodiment of FIGS. 9 to 17

The brake of the tilting locking device described in the previous embodiments is, in essence, a disc brake, the two members whereof rotate around parallel but non-coincident axes, so that the mutual locking of the two members of the brake generates an interlocking constraint. In other embodiments, the brake can be a brake with two coaxial members rotating around a common axis with respect to the support arm of the respective wheel. In this case, the brake can be a drum brake.

Below, such an embodiment will be described in detail with reference to FIGS. 9 to 17.

In summary, in this embodiment, a tilting saddle motor vehicle is provided with at least two front steered wheels, which has a tilting four bar linkage extending in a transverse, i.e. right-left, direction. The tilting four bar linkage has two crosspieces, respectively upper and lower crosspieces, joined by two uprights, respectively right and left uprights. Right and left support arms, which respectively support the right front steered wheel and the left front steered wheel with the interposition of a respective suspension, are associated with the uprights. The two support arms are joined by a transverse component, which may consist of the steering bar and which is constrained by its two ends to the two support arms with respective joints that allow rotation around two axes: a tilting axis and an axis orthogonal to the tilting axis. A first brake member, typically a drum brake, is associated with at least one end, and preferably with both ends of the transverse component, which first member is supported by the respective support arm of the wheel and is adapted to rotate with a movement proportional to the movement of the transverse component around the tilting axis. A second brake member is associated with the first brake member. The second brake member is rotatably supported on the respective wheel support arm and is coaxial with the first brake member. The second brake member is constrained to at least one element of the suspension of the respective wheel, so as to rotate with respect to the support arm with a rotational movement proportional to the springing movement, that is, to the movement of the suspension. By activating the brake, the rotational movement of both members of the brake is locked with respect to the support arm to which they are mounted and thus consequently: the springing movement of the suspension and the tilting movement of the vehicle are locked.

Referring now to the drawings, an embodiment with a brake that locks members coaxial with respect to each other is illustrated in FIGS. 9 to 17. Same numerals indicate parts identical or equivalent to those described with reference to FIGS. 1 to 7, which will not be described again.

The main difference between the embodiment of FIGS. 1 to 7 and the embodiment of FIGS. 9 to 17 consists in the different shape of the brakes locking the tilting movement, still labeled 53', 53", and in the different arrangement of the rotation axes of the members which are locked, i.e. made mutually integral with each other, by the brakes. The following description is therefore focused on these aspects.

In this case, the brakes 53' and 53" consist of special drum brakes, which comprise shoes acting on two distinct coaxial tracks, integral with two members of the forecarriage of the motor vehicle 1, which, in conditions of non-locked tilting, rotate with respect to each other around the axis of the brake. More precisely, a first member is constrained to the respective support arm 21', 21"; a second member is constrained to the suspension 33', 33", and a third member, which in the illustrated embodiment carries the brake shoes, is constrained to the steering bar 23, so as to rotate around its own rotation axis by an angle which is a function of the angle of mutual rotation, around the tilting axes 24X, between the steering bar 23 and the support arm 21', 21" caused by the tilting movement.

With specific reference to FIGS. 9 to 17, each drum brake 53', 53" has a first member 101', 101" which is rigidly connected to the respective support arm 21', 21". Each brake further comprises a second member 103', 103", connected to the suspension 33', 33". More specifically, a rod or tension-compression rod 63', 63" connects the second member 103', 103" to the crank 45', 45" of the suspension mechanism 38', 38". As in the embodiment previously described with reference to FIGS. 1 to 7, the rod 63', 63" has the aim of transferring the swinging movement of the crank 45', 45" around the pivot axis between the crank and support arm 21', 21", to a member of the brake, in this case the member 103', 103". The second member 103', 103" of the drum brake is rotatably mounted around the tilting axis 24X. Therefore, the second member 103', 103" of the drum brake 53', 53" rotates around the axis 24X with a rotational movement proportional to the springing movement of the crank 45', 45". The rod 63', 63" can be connected to the respective crank 45', 45" by a ball joint 67', 67" and to the member 103', 103" by a ball joint 65', 65", which can be secured to an appendage 103A, see in particular FIGS. 15-17.

Each drum brake 53', 53" further comprises a third member 105', 105", which is integral with the joint 24', 24" connecting the respective end 23.1, 23.2 of the steering bar 23 to the corresponding support arm 21', 21". More particularly, the third member 105', 105" of each drum brake 53', 53" is integral with the portion of the respective joint 24', 24" which rotates around the tilting axis 24X. Therefore, the third member 105', 105" of the drum brake 53', 53" also rotates around the tilting axis 24X, with respect to the support arm 21', 21" when the motor vehicle 1 tilts laterally, for example when driving along a curve, by making a rotation around the axis 24X corresponding to the rotation performed by the steering bar 23 with respect to the support arm 21', 21".

As in the previously described embodiments, the brakes 53', 53" are adapted to constrain, i.e., to lock with respect to each other a first member 45', 45" of the respective suspension 33', 33", which performs a springing movement with respect to the support arm 21', 21", and a second member mechanically connected with the transverse component 23, to perform a rotational movement proportional to the rotational movement of the transverse component around the tilting axes. In the embodiment of FIGS. 9 to 17 the second member is the member 105' 105" of the respective brakes 53', 53". The tilting locking device 50', 50" comprises, also in this embodiment, a further member that is supported by the support arm 21', 21" and is kinematical connected to the first member, namely to crank 45', 45". The further member is in this embodiment the second member 103', 103" of the drum brake.

Figure 15:
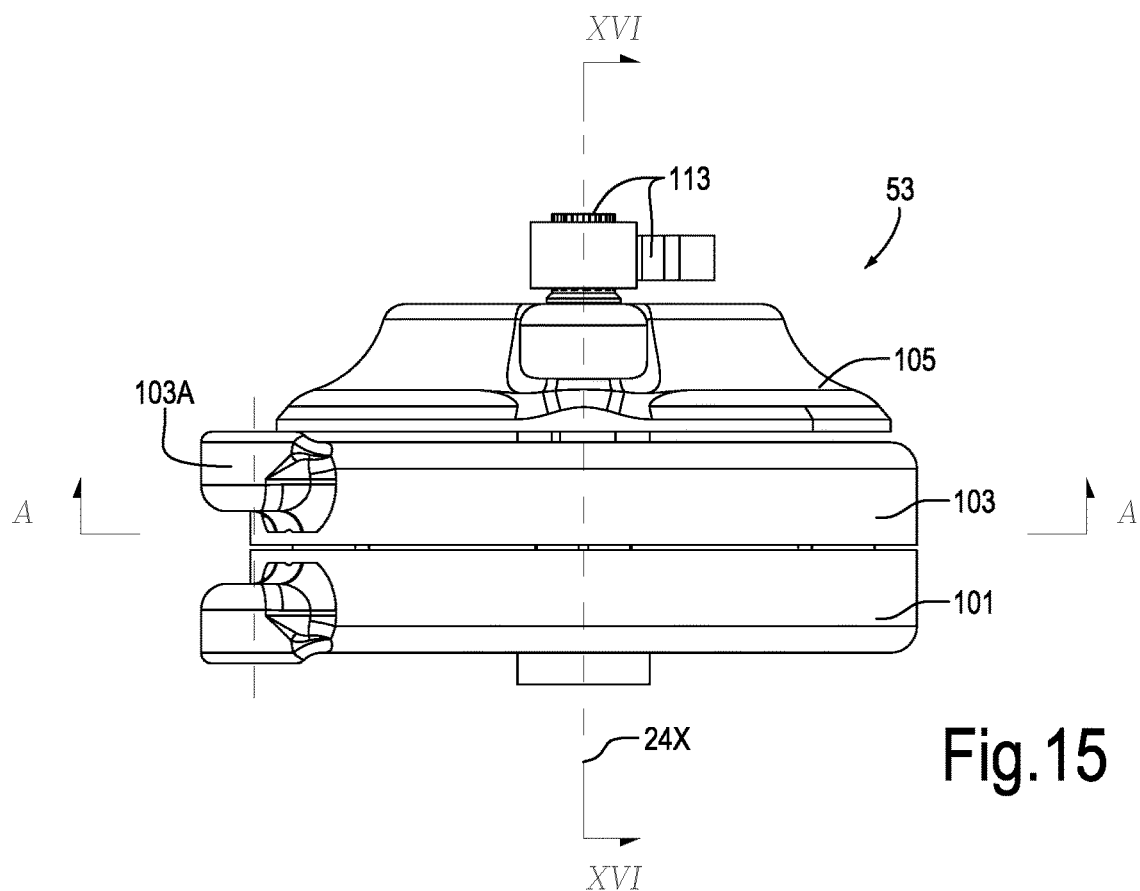
FIG. 15 shows a side view of a brake of the embodiment of FIGS. 9 to 14.
Figure 16A:
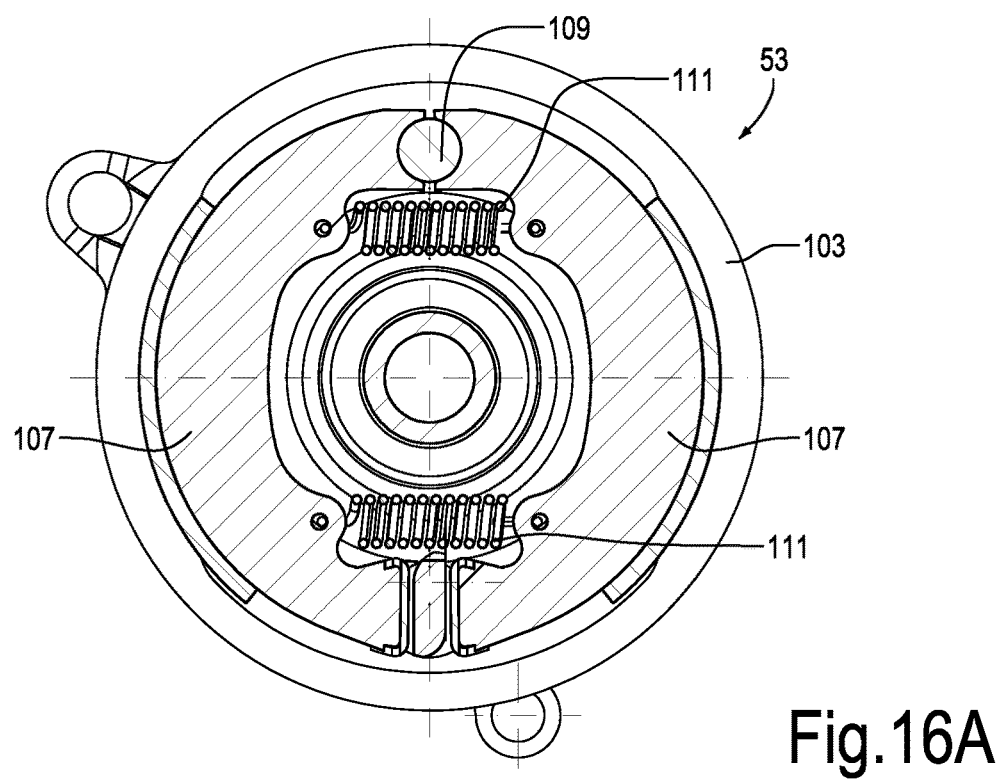
FIG. 16A shows a section along line A-A of FIG. 16.
Figure 16B:
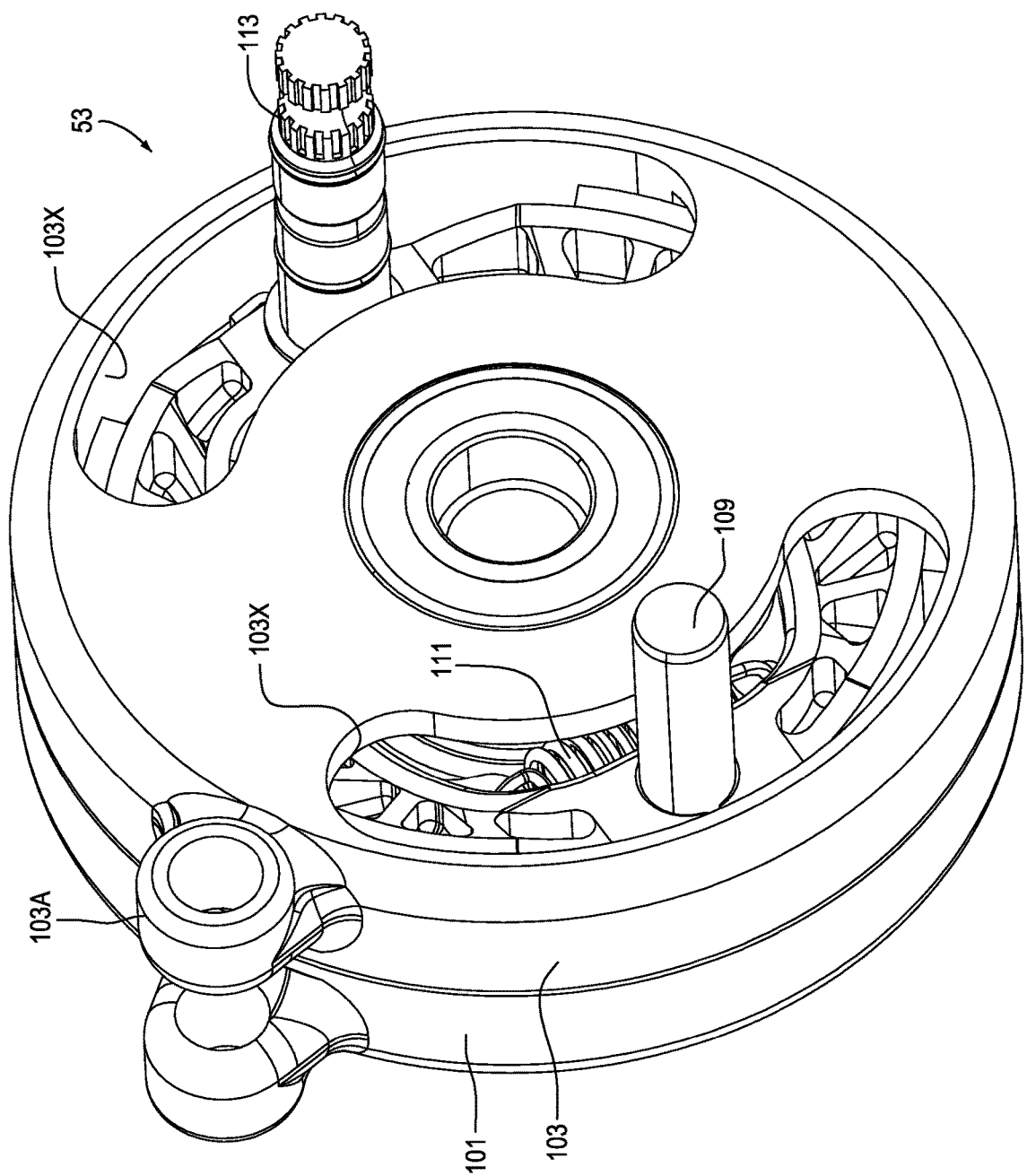
FIG. 16B shows an isometric view with parts removed of the brake of FIG. 15.
Figure 16:
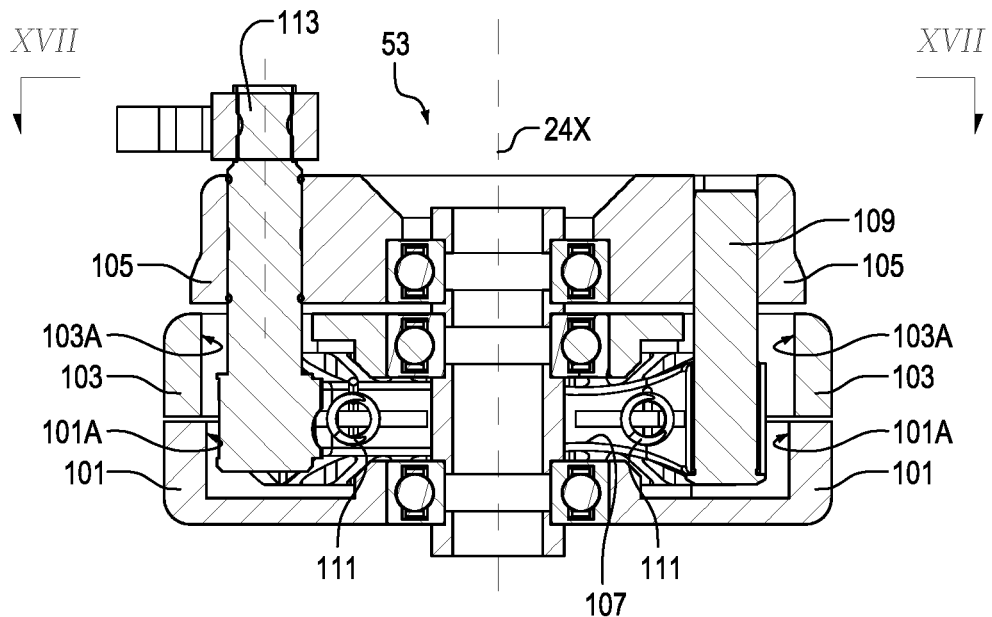
FIG. 16 shows a section along XVI-XVI of FIG. 15.
Figure 17:
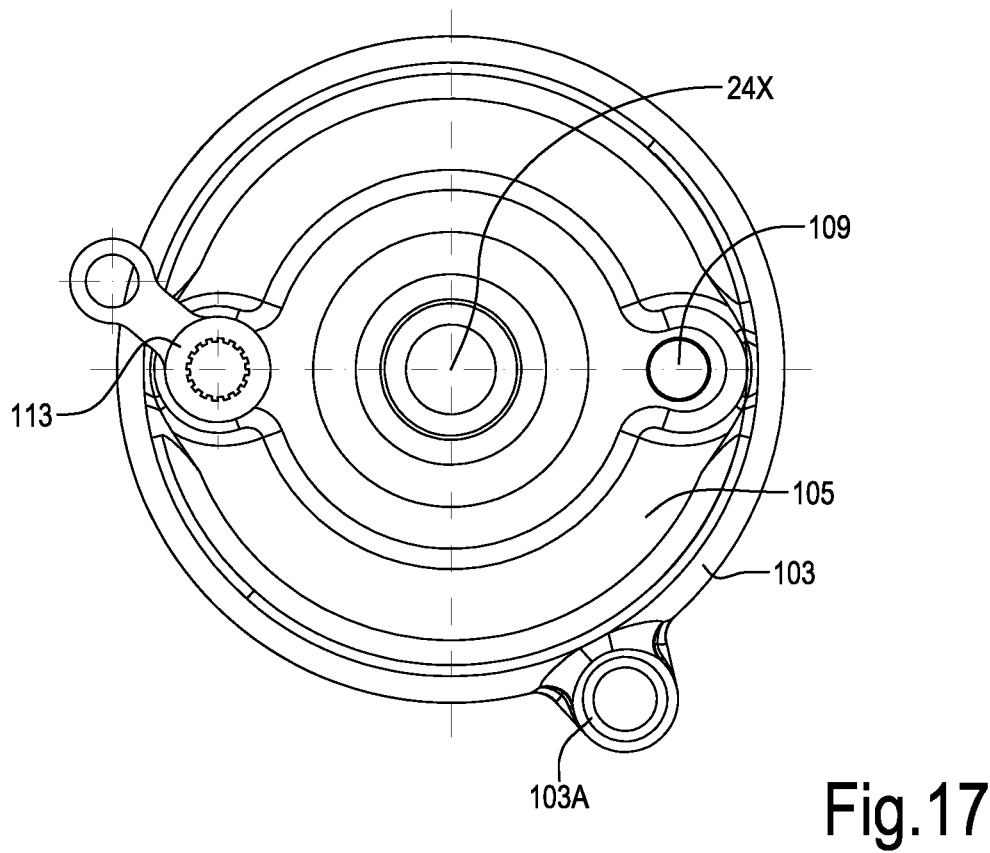
FIG. 17 shows a view along XVII-XVII of FIG. 16.

Further details of each drum brake 53', 53" are illustrated in FIGS. 15 to 17. The drum brake illustrated therein is simply indicated with 53 and similarly the individual components and elements that are part thereof are indicated with reference numerals without apostrophe (') or double apostrophe ("), to indicate that the same structure is found both on the left and on the right side of the motor vehicle 1.

Hinged to the third member 105 are shoes 107 pivoting around a pin 109, which in the illustrated embodiment is integral with the third member 105 of the drum brake 53. The shoes 107 are held in a deactivated position by springs 111 and can be expanded, by pivoting around the axis of the pin 109, under control of an actuation mechanism 113. The shoes 107 act on two circular tracks 101A and 103A, which are coaxial with each other. The track 101A is formed on the member 101 and the track 103A is formed on the member 103. Therefore, by acting with a single actuation mechanism 113 on the shoes 107, the members 101, 103, 105 can be mutually locked so that they cannot rotate with respect to each other around the tilting axis 24X. This arrangement is possible in the case of the drum brake described herein, in that the members 101, 103, 105 perform, relative to each other, rotational movements around the common axis (axis 24X), which are limited to a relatively small angle, typically a few tens of degrees.

In the isometric view of FIG. 16B the member 105 has been removed to show that the member 103 is provided with slots 103X through which the pivot pin 109 and the actuation mechanism 113 protrude. The slots 103X, allow relative rotation between the members of the drum brake 53 when the brake is unlocked.

The two drum brakes 53', 53" can be actuated in any suitable way. In the illustrated embodiment, there is provided a hydraulic cylinder-piston actuator in a central position, indicated with 121 (cf. FIGS. 9, 10 and 14), which controls two traction cables 123', 123", respectively actuating the breaks 53', 53".

The operation of the tilting locking device of FIGS. 9 to 17 is as follows. When the motor vehicle 1 is running, the tilting locking device is deactivated. The drum brakes 53', 53" are deactivated. Consequently, the motor vehicle 1 is free to roll, with deformation movement of the tilting four bar linkage 11 and corresponding rotation of the steering bar 23 around the tilting axes 24X. Furthermore, each suspension 33', 33" is free to perform independent springing movements for the left front steered wheel 7' and for the right front steered wheel 7".

When the tilting locking device is activated, for example in the event of motor vehicle 1 stopping or parking, the two drum brakes 53', 53" are activated and lock the members 101', 101" and 103', 103" of each drum brake 53', 53" with respect to the member 105', 105", so as to make the system consisting of the steering bar 23, the support arms 21', 21" and the suspension mechanisms 38', 38" substantially rigid. In this way, both the tilting movement and the springing movements of the two suspensions 33', 33" are prevented.

It should be understood that the tilting movement, which involves a rotation of the crosspieces 13, 15 around the axes 13A, 15A, can also be locked by acting on the track 101A of a single drum brake 53', 53". In fact, once the mutual rotation around the axis 24X of the steering bar 23 with respect to the corresponding support arm 21', 21" is locked, the entire tilting four bar linkage 11 is locked and non-deformable. Therefore, one of the two drum brakes 53', 53" could be lacking track 101A and the respective shoes 107 thereof could be used only to lock the relative angular movement between the member 103 (and thus rod 63 and crank 45) and the corresponding support arm 21. This angular movement must be locked on both the right and left sides of the motor vehicle 1, to avoid asymmetrical springing movements which result in an undesired tilting of the motor vehicle 1 with respect to the median axis M.

Figure 18:
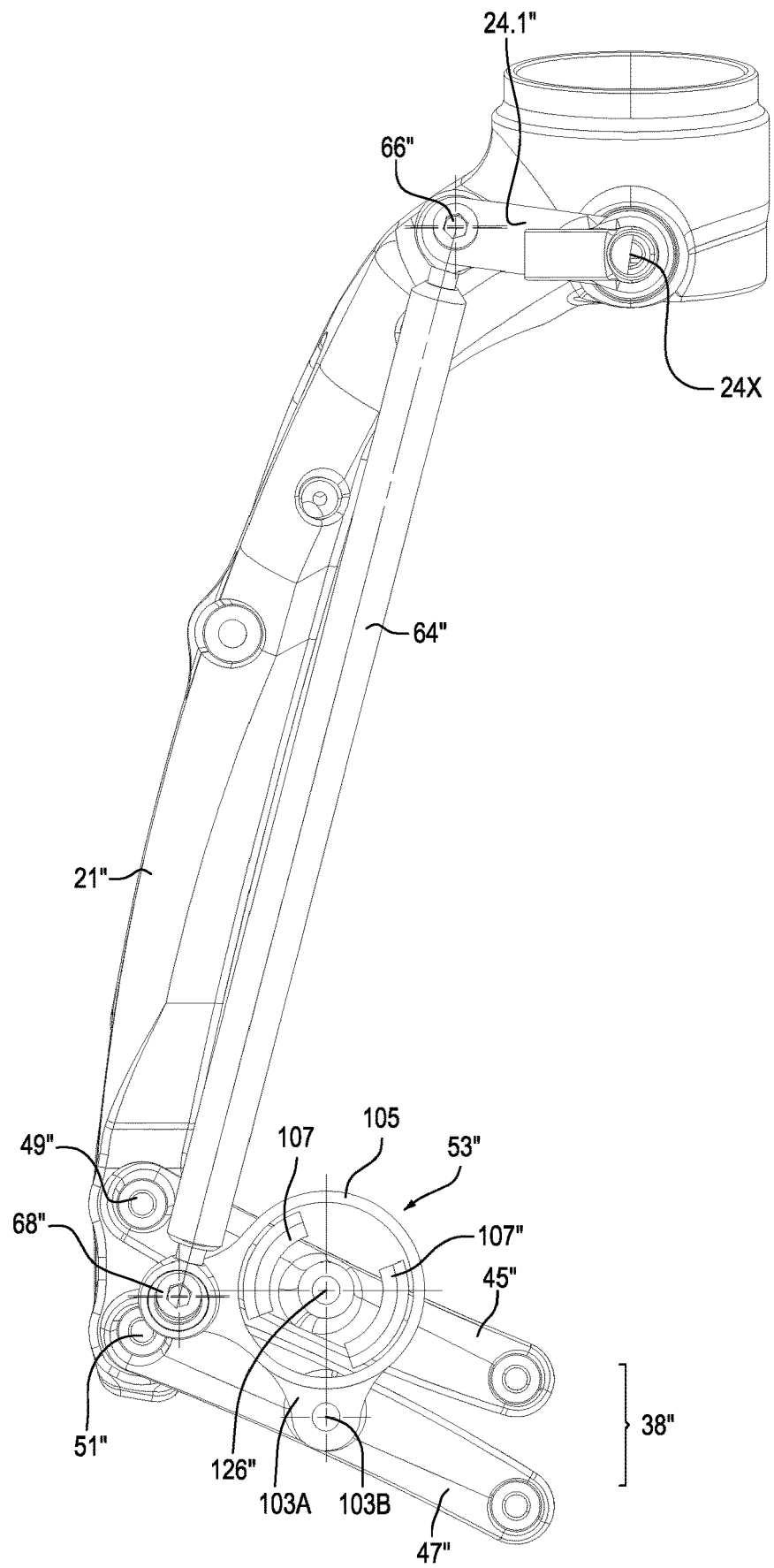
FIGS. 18 and 19 show a further embodiment of a tilting locking device.
Figure 19:
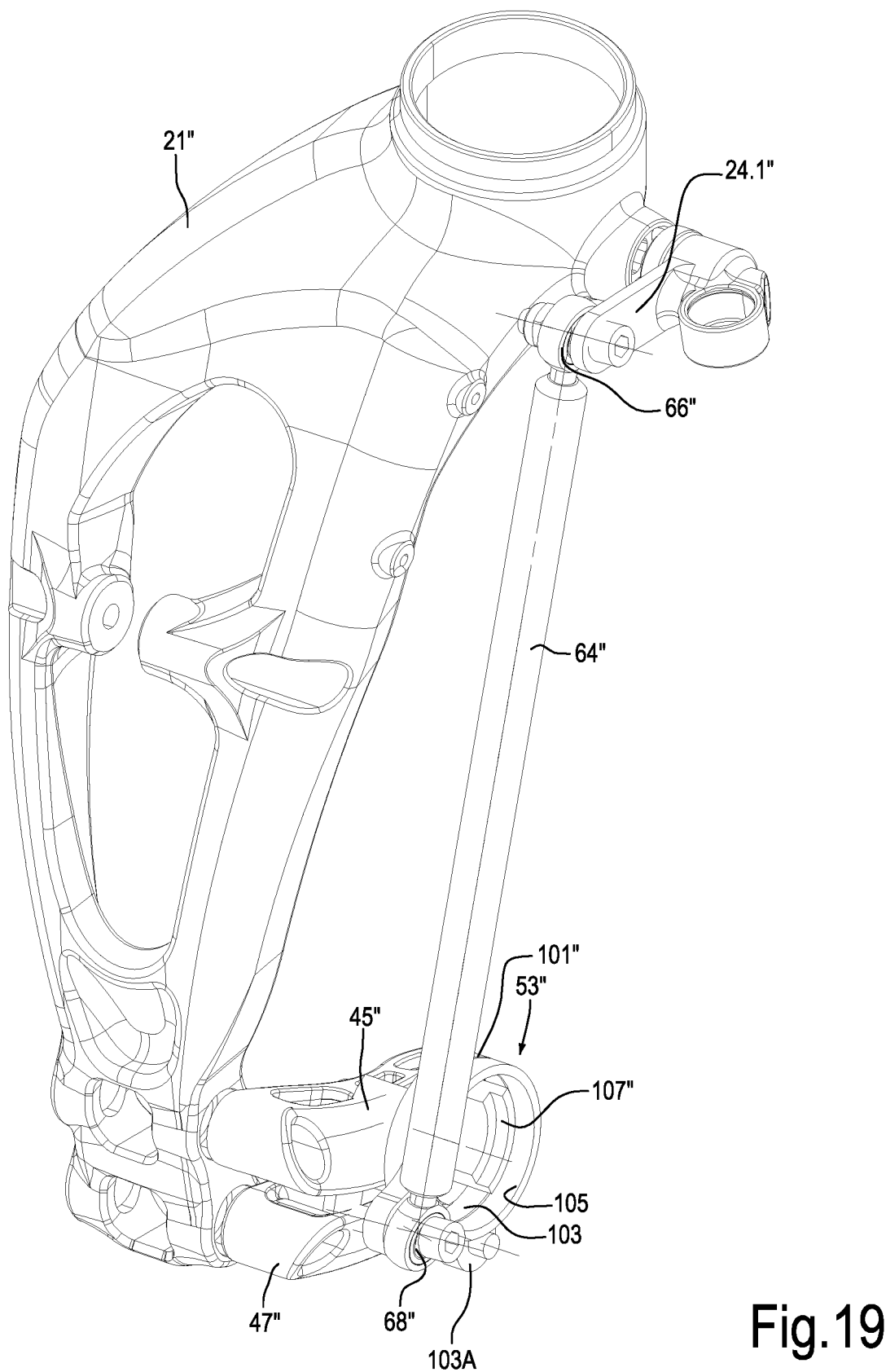
Figure 20:
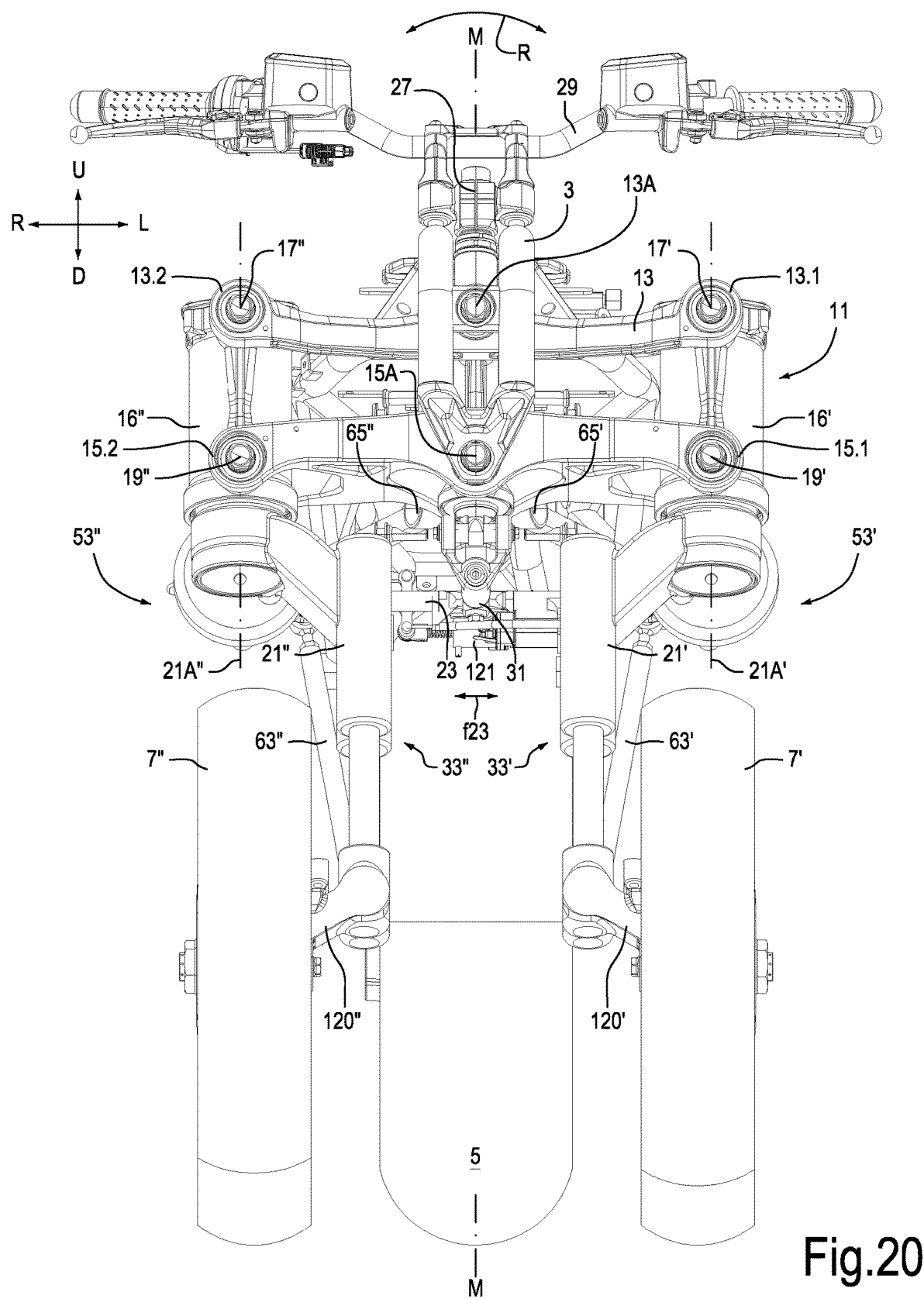
FIG. 20 shows a front view of a motor vehicle with a further embodiment of the tilting locking device.
Figure 21:
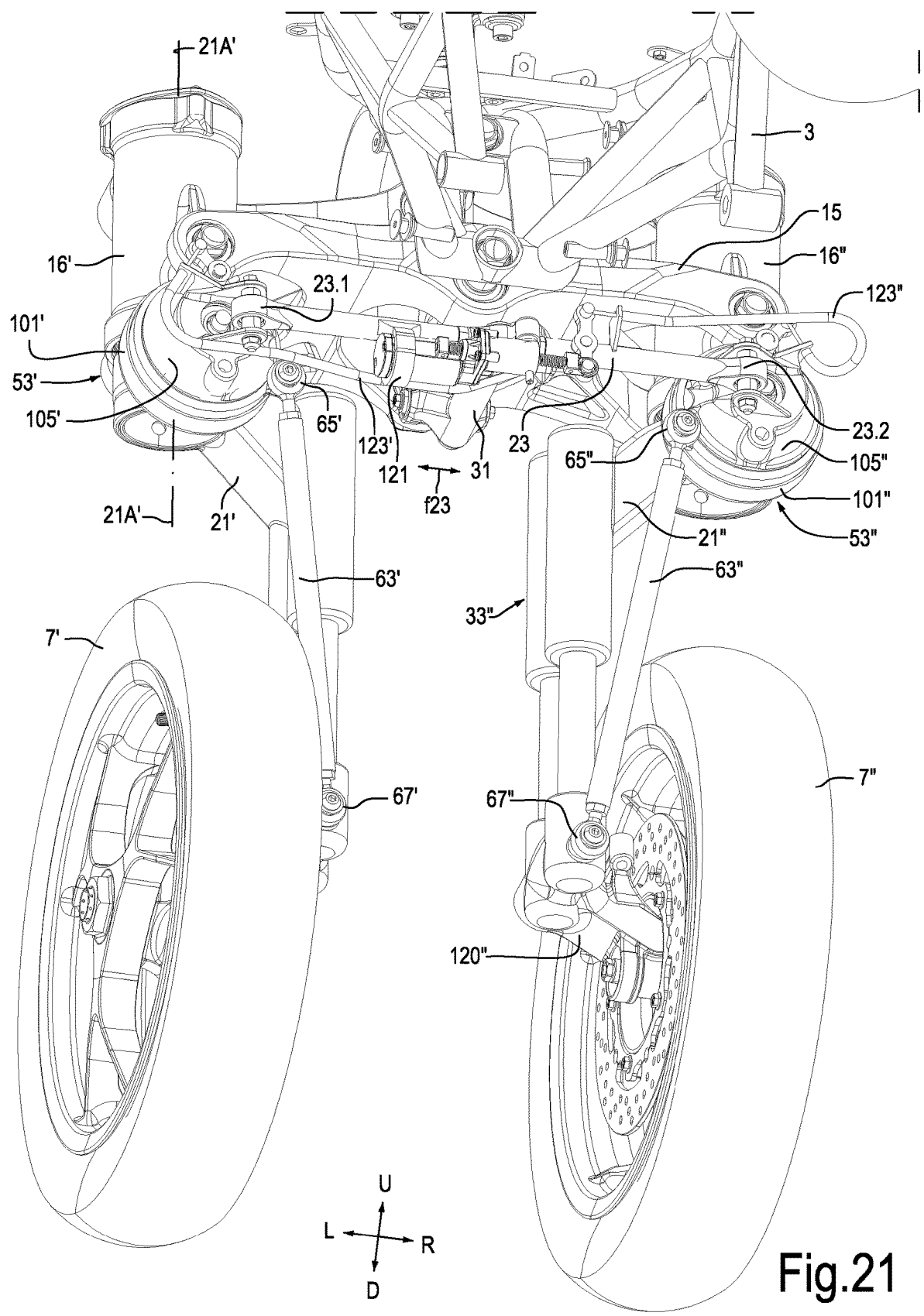
FIG. 21 shows a bottom isometric view of a portion of the vehicle of FIG. 20.
Figure 22:
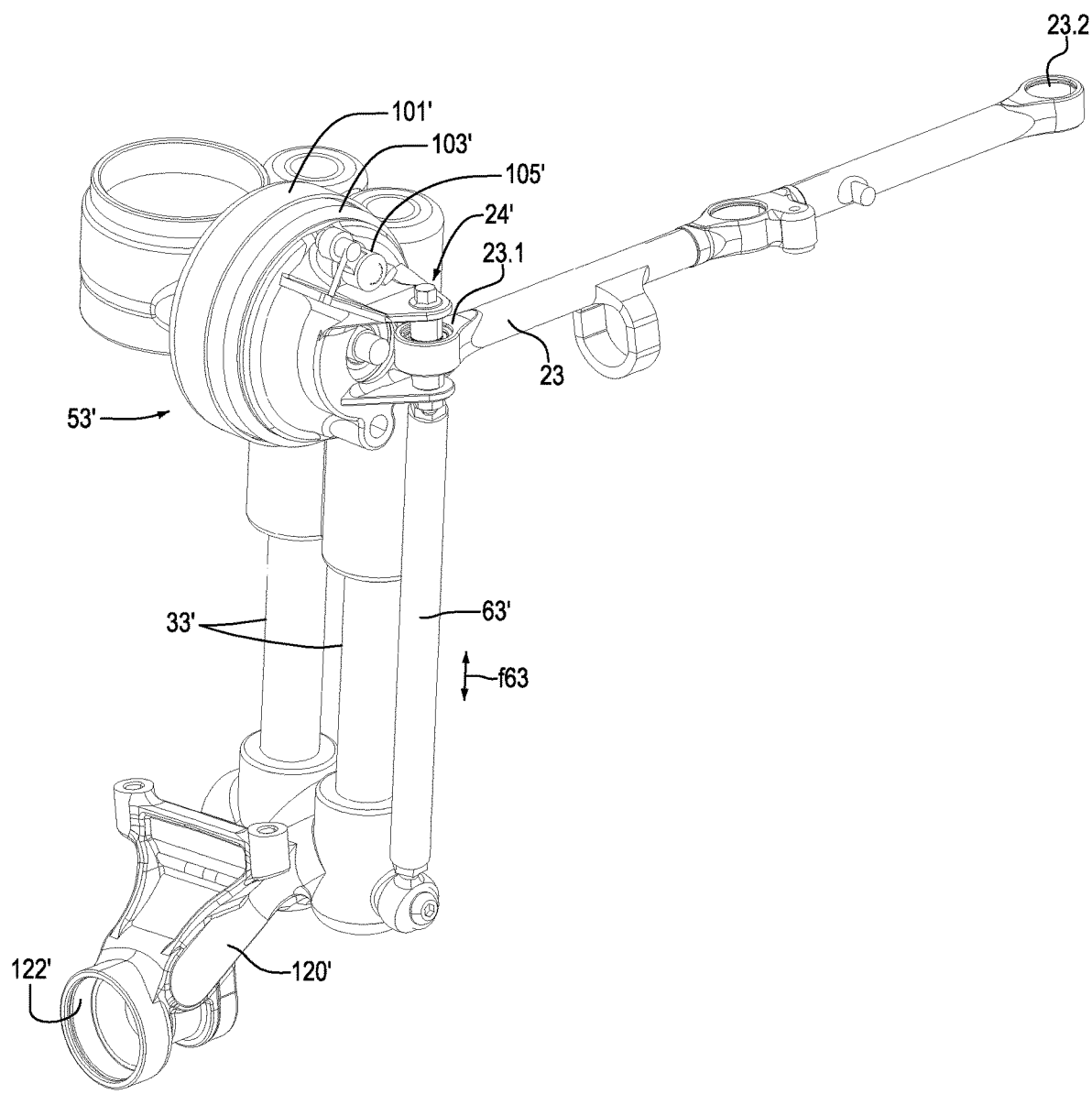
FIGS. 22 and 23 show isometric views according to two different angles of a support of the left wheel of the motor vehicle of FIGS. 20 and 21.
Figure 23:
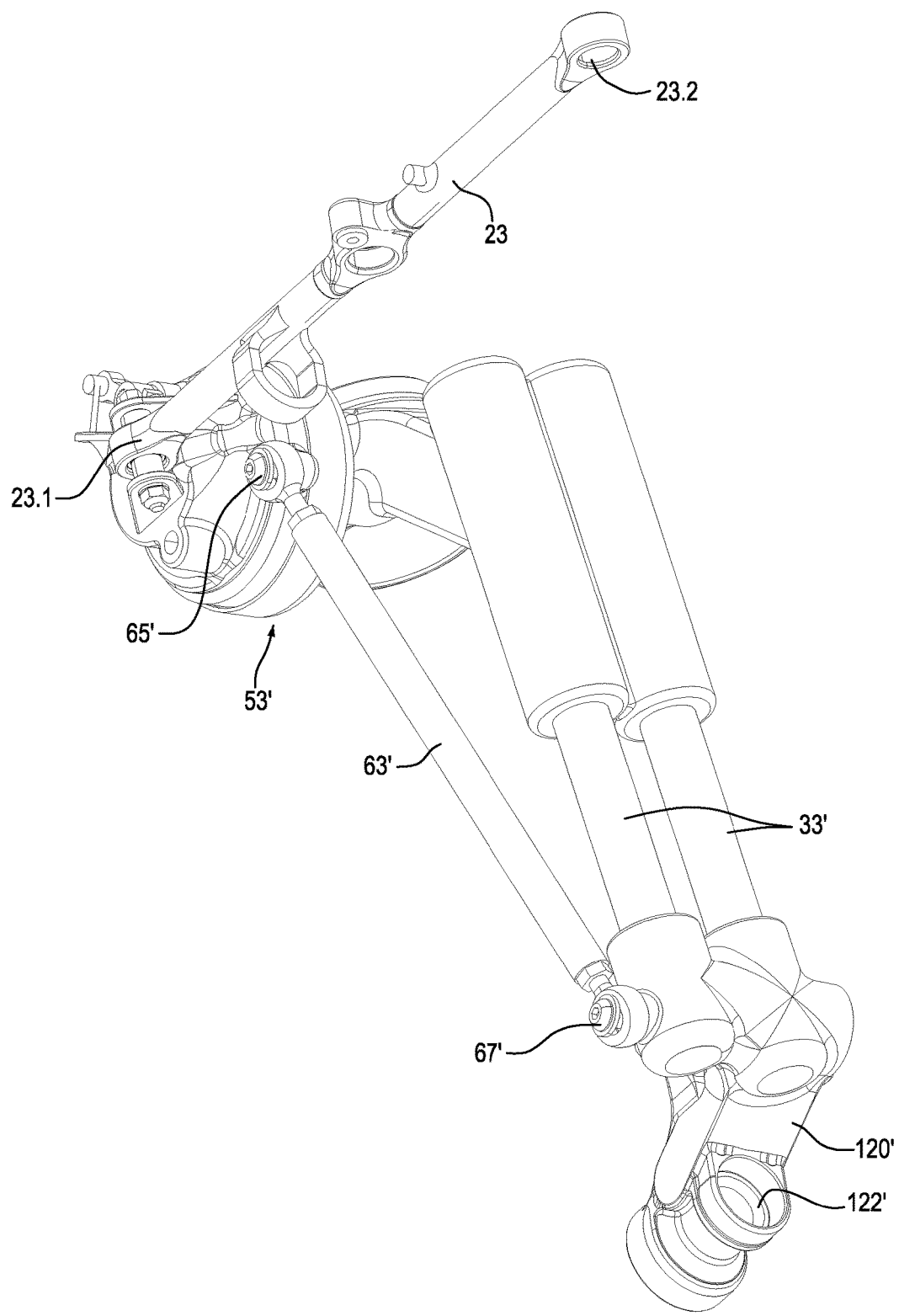

Embodiment of FIGS. 18 and 19

In the embodiment of FIGS. 9 to 17, the movement of the steering bar 23 around the axis 24X is transmitted directly to the third member 105', 105" of the brake 53', 53", while the springing movement is transmitted to the member 103', 103" by the rod 63', 63". However, a different arrangement is also possible, wherein the brake 53', 53" is placed at the bottom, at the suspension 33', 33", and a transmission rod is used to transfer to a member of the brake the pivoting movement of the steering bar 23 with respect to the corresponding support arm 21', 21" around the tilting axis 24X, with an approach similar to that on which the embodiment of FIG. 8 is based.

In summary, in this embodiment, a tilting saddle motor vehicle is provided with at least two front steered wheels, which has a tilting four bar linkage extending in a transverse, i.e. right-left, direction. The tilting four bar linkage has two crosspieces, respectively upper and lower crosspieces, joined by two uprights, respectively right and left uprights. Right and left support arms, which respectively support the right front steered wheel and the left front steered wheel with the interposition of a respective suspension, are associated with the uprights. The two support arms are joined by a transverse component, which may consist of the steering bar and which is constrained by its two ends to the two support arms with respective joints that allow rotation around two axes: a tilting axis and an axis orthogonal to the tilting axis. A member for transmitting the rotational movement around the tilting axes, for example a rod, is associated with at least one end, and preferably with both ends of the transverse component. This transmits the rotational movement around the tilting axis to a first brake member, typically a drum brake, which first member is rotatably supported on a component of the suspension, for example a crank of a suspension four bar linkage. An attachment member, for example a rod, connects the first brake member to the transverse component so as to transmit a rotational movement, proportional to the tilting movement, to the first brake member. The first brake member thus rotates around an axis carried by the suspension component with a motion proportional to the tilting movement. A second brake member is associated with the first brake member, which is supported coaxially with the first brake member and is constrained to the suspension so as to rotate, around the common axis between the first and second members of the brake, with a rotational movement proportional to the springing movement. By activating the brake, the rotational movement of both members of the brake is locked and thus consequently: the springing movement of the suspension and the tilting movement of the vehicle are locked.

Referring now to the drawings, FIGS. 18 and 19 show, in a front view and an isometric view, such an embodiment wherein the common rotation axis of the three members of the drum brake 53', 53" is carried by one of the components of the suspension mechanism 38', 38" and specifically by the crank 45" of the suspension four bar linkage. FIGS. 18 and 19 only show the components of the tilting locking device which are located on the right side of the motor vehicle 1, it being understood that the components of the left side are substantially symmetrical. Same numbers indicate parts identical or corresponding to those already described in the preceding embodiments.

More specifically, with reference to FIGS. 18 and 19, the suspension mechanism 38" comprises, similarly to the description of the preceding embodiments, a first crank 45" hinged at 49" to the support arm 21", and a second crank 47" hinged at 51" to the support arm 21".

The drum brake 53" comprises a first member 101", a second member 103" and a third member 105", with a construction substantially identical to the one illustrated in FIGS. 15 to 17. In FIGS. 18 and 19, the drum brake 53" is shown partially open and with parts removed for greater clarity. The member 105" carries the shoes 107" of the drum brake 53", which act on two coaxial tracks provided on the member 101" and on the member 103", respectively. The member 101" is supported on the crank 45" so that it can freely rotate around an axis 126, indicated in particular in FIG. 18, when the brake 53" is deactivated. The member 103" is mounted coaxially to the member 101" and is connected to the crank 47" through an appendage 103A, so that it can freely rotate around an axis 103B, parallel to the axis 126", with respect to the crank 47". Furthermore, the member 103 is free to rotate with respect to the crank 45" around the axis 126. In practice, the crank 45", the crank 47", the support arm 21" and the member 103" form a four bar linkage which pivots and deforms following the springing movement of the suspension, in the same way in which the suspension four bar linkage 38" is deformed.

The member 105", to which the shoes 107" are hinged, is hinged around the axis 126" and is pivoted by the ball joint 68" to the rod 64". Consequently, the member 105" rotates around the axis 126" performing angular movements which correspond to the angular movements due to the tilting of the steering bar 23 around the axis 24X with respect to the support arm 21".

The arrangement described above is symmetrically mirrored on the left side of the motor vehicle 1, not shown. The remaining parts and components of the motor vehicle 1, not shown in FIGS. 18 and 19, can be configured as already described with reference to FIGS. 1 to 17.

Thus, in this embodiment each brake 53', 53" is adapted to constrain, i.e. to lock with respect to each other a first member of the suspension, namely the crank 45', 45", which performs a springing movement with respect to the support arm 21', 21", and a second member, namely the member 105', 105" of the brake, which is mechanically connected to the transverse component 23". The member 103', 103" of the drum brake 53', 53" represents a further member of the tilting locking device.

The operation of the motor vehicle 1 provided with a tilting locking device of the type illustrated in FIGS. 18 and 19 is as follows. When the motor vehicle 1 is in normal travel and must be free to perform a tilting movement, i.e. to tilt around a median plane M orthogonal to the surface on which the motor vehicle 1 is moving, the tilting locking device is deactivated. The drum brake 53" is inactive. Also inactive is the brake 53', made and arranged in a mirror-like manner with respect to the brake 53", on the left side of the motor vehicle 1. The members 101, 103, 105 of each drum brake can rotate with respect to each other and with respect to the crank 45', 45" of the suspension mechanism 38', 38" around the common axis 126", 126'.

When the tilting locking needs to be activated, for example when the motor vehicle 1 moves at very low speed and is about to stop, or is stationary or parked, it is sufficient to activate the drum brakes 53" (FIGS. 18, 19) and 53' (not shown). Thus, the members 101, 103, 105 of each of the two drum brakes 53', 53" are made integral with each other. As a consequence, on the right side the steering bar 23, the rod 64", the disc sector 57", and the three members 101", 103", 105" are locked and cannot rotate with respect to the support arm 21". Similarly, the second crank 47" is locked, which is part of the same suspension four bar linkage to which the crank 45" belongs.

Consequently, the springing movement of the left front steered wheel 7" is prevented, since the cranks 45", 47" cannot rotate with respect to the support arm 21" of the left front steered wheel 7". With the mirrored arrangement on the left side of the motor vehicle 1, the springing movement of the right front steered wheel 7' is also locked. The impossibility for the steering bar 23 to rotate around the tilting axis 24X locks the tilting movement, i.e. the deformation of the tilting four bar linkage 11.

Embodiment of FIGS. 20 to 23

In the embodiments described hereinbefore, the springing movement is a rotational movement of the suspension mechanism 38', 38". Consequently, the tilting locking device is arranged to lock on one side the rotational movement of the steering bar 23 around the tilting axis 24X defined by the joint 24', 24", and on the other the rotational movement of the suspension mechanism 38', 38". However, the criterion by which the locking of the tilting and springing movement is achieved is also applicable to systems wherein the springing movement is a linear movement, instead of a rotational one.

FIGS. 20 to 23 illustrate an embodiment wherein the suspension mechanism 38', 38" is arranged to allow a linear springing movement instead of a rotational one. Same numerals indicate parts identical or equivalent of the motor vehicle, still referred to as 1, which will not be described again. In the embodiment of FIGS. 20 to 23 a drum brake is provided, but the possibility of using a disc brake as illustrated in FIGS. 1 to 7 is not excluded.

In FIGS. 20 to 23, each suspension 33', 33" comprises a spring-shock absorber assembly to which an arm 120', 120" is rigidly connected. Each arm rotatably supports the pin of the respective front steered wheel 7', 7". 122' (FIGS. 22, 23) indicates the seat for housing the respective support bearings of the pin of the wheel 7'.

In the illustrated embodiment, each suspension 33', 33" comprises two assemblies of spring and shock absorber parallel to each other, so as to avoid a rotational movement around the longitudinal axis of the suspensions. Each suspension 33', 33" is secured at a first end to the respective support arm 21', 21". In this exemplary embodiment, the support arms 21', 21" are shorter than those provided in the embodiments of the preceding figures, since the suspensions 33', 33" are an extension downwards (i.e. towards the front steered wheels 7', 7") of the respective support arms 21', 21". The second, bottom end of each suspension 33', 33" is constrained to the arm 120', 120". The contraction and extension of the suspension 33', 33" corresponds to a linear springing movement of the front steered wheels 7', 7".

Each drum brake 53', 53" is connected to the respective lower end of the corresponding suspension 33', 33" by a rod 63', 63", equivalent to the rod 63', 63" of the preceding embodiments. Thus, the stretching and shortening movement of the suspension, corresponding to which the linear springing movement of the front steered wheels 7', 7", is transmitted as a reciprocating rotational movement to the member 103', 103" of the respective drum brake 53', 53". Therefore, when the drum brakes 53', 53" are locked, they also prevent the springing movement of the two suspensions 33', 33".

Thus, in analogy with the previously described embodiments, each brake 53', 53" of the tilting locking device constraints, i.e. locks, one to the other a first member 120', 120" of the suspension 33', 33", and a second member, namely the brake member 105', 105, which is mechanically connected to the transverse component 23 so as to perform a rotational movement proportional to the rotation of the transverse 23 around the tilting axes 24X. A further member of the tilting locking device is represented by the member 103', 103" of the drum brake.

Embodiment of FIGS. 24 to 33

In summary, in the embodiment of FIGS. 24 to 33 a tilting saddle motor vehicle 1 is provided, whereof only the forecarriage 1A is shown for the sake of simplicity.

Figure 24:
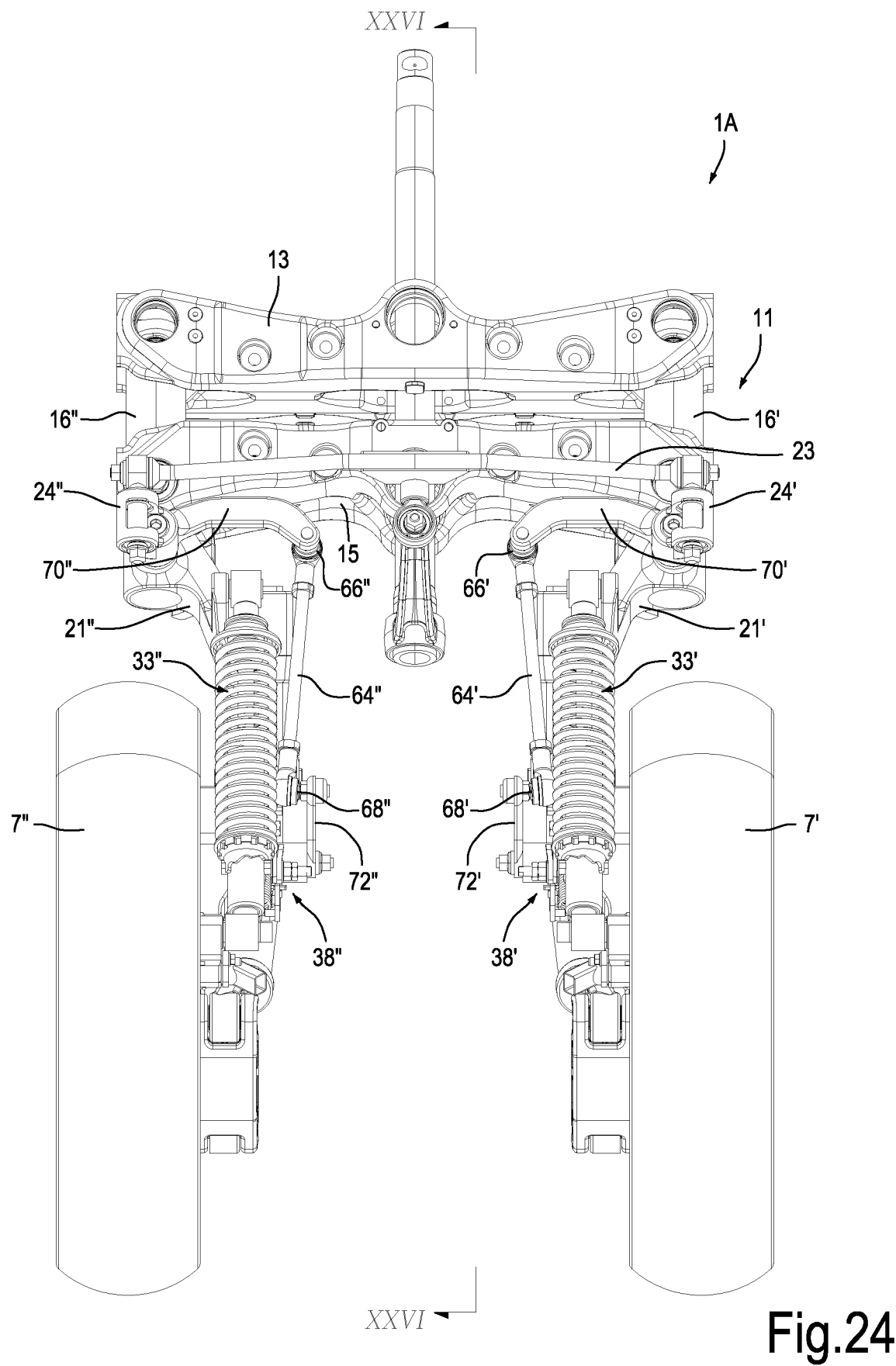
FIG. 24 shows a front view of the front carriage of a three-wheeled vehicle according to a further embodiment, with a wheel suspension using a Watt four bar linkage.
Figure 25:
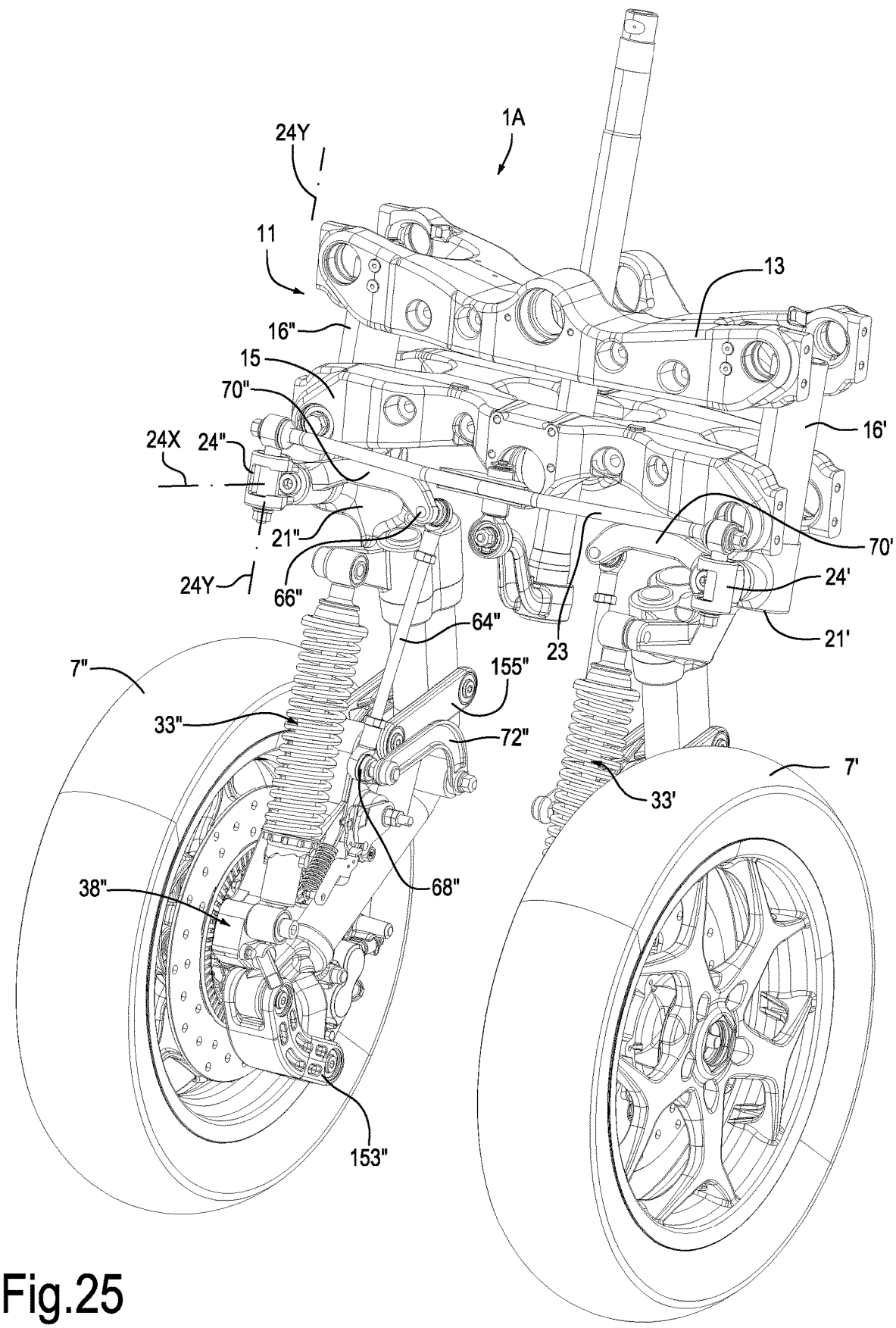
FIG. 25 shows an axonometric view of the forecarriage of FIG. 24.
Figure 26:
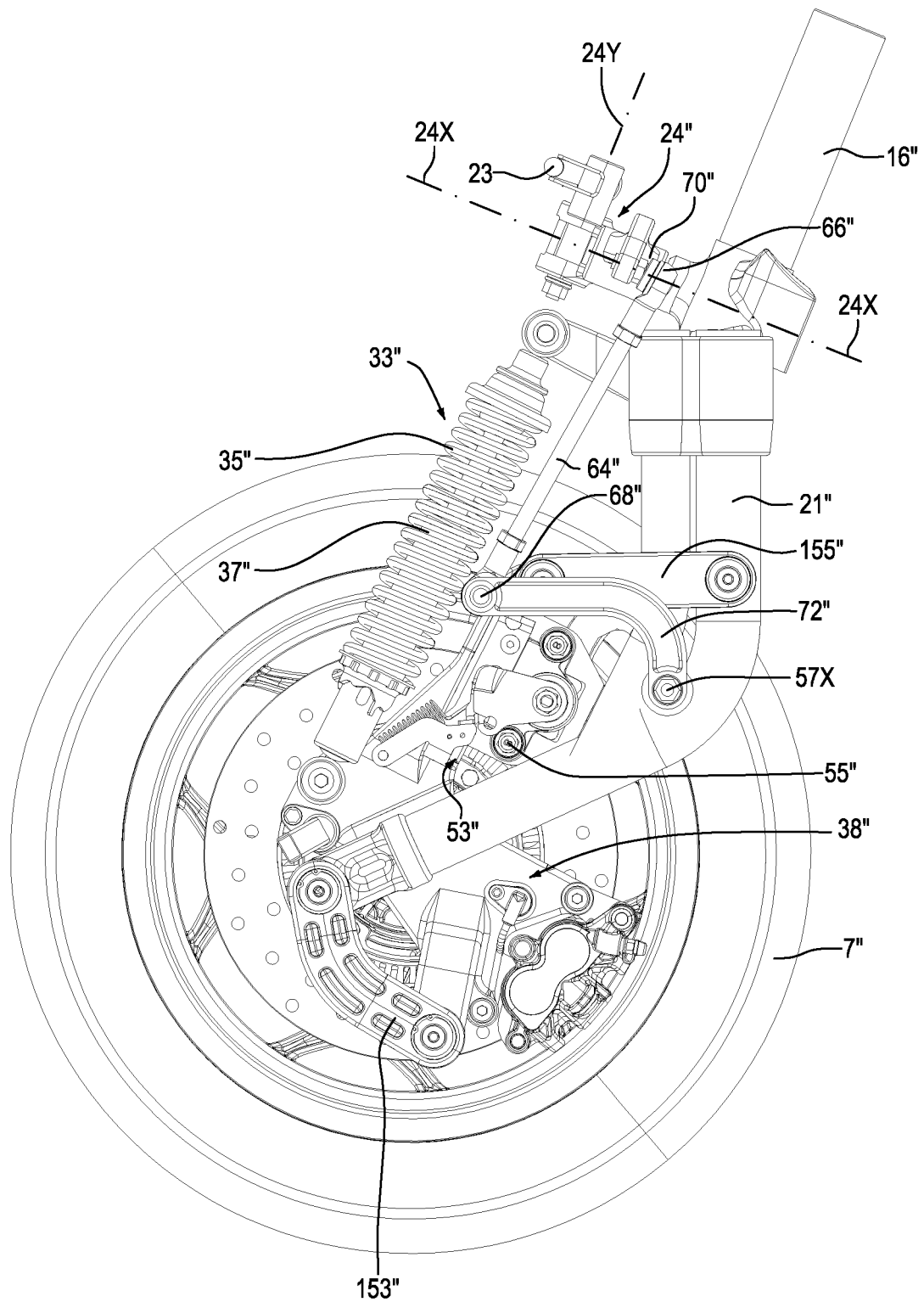
FIGS. 26 and 27 show a side view and an axonometric view of one of the front steered wheels of the forecarriage of FIGS. 24 and 25.
Figure 27:
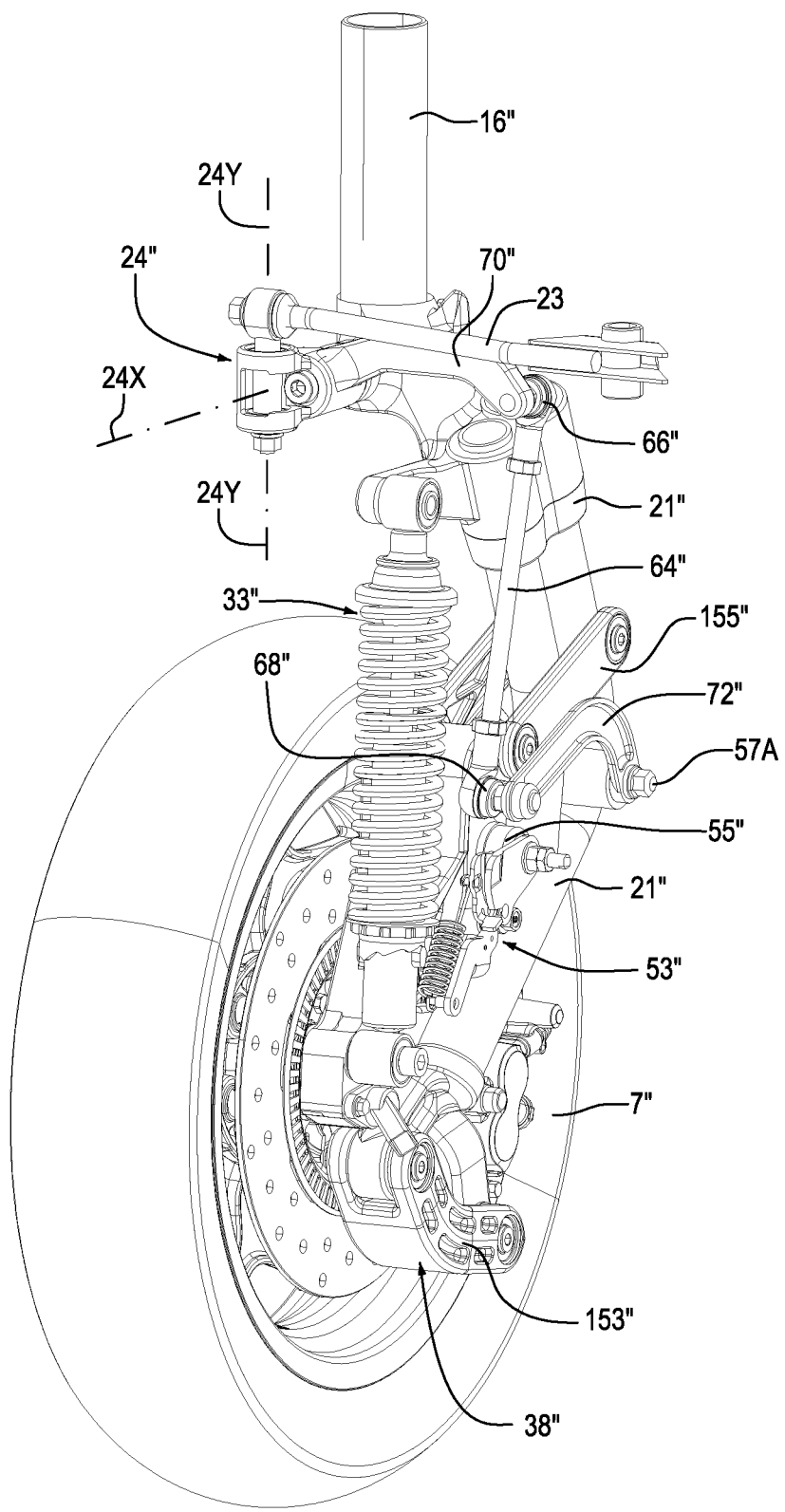
Figure 28:
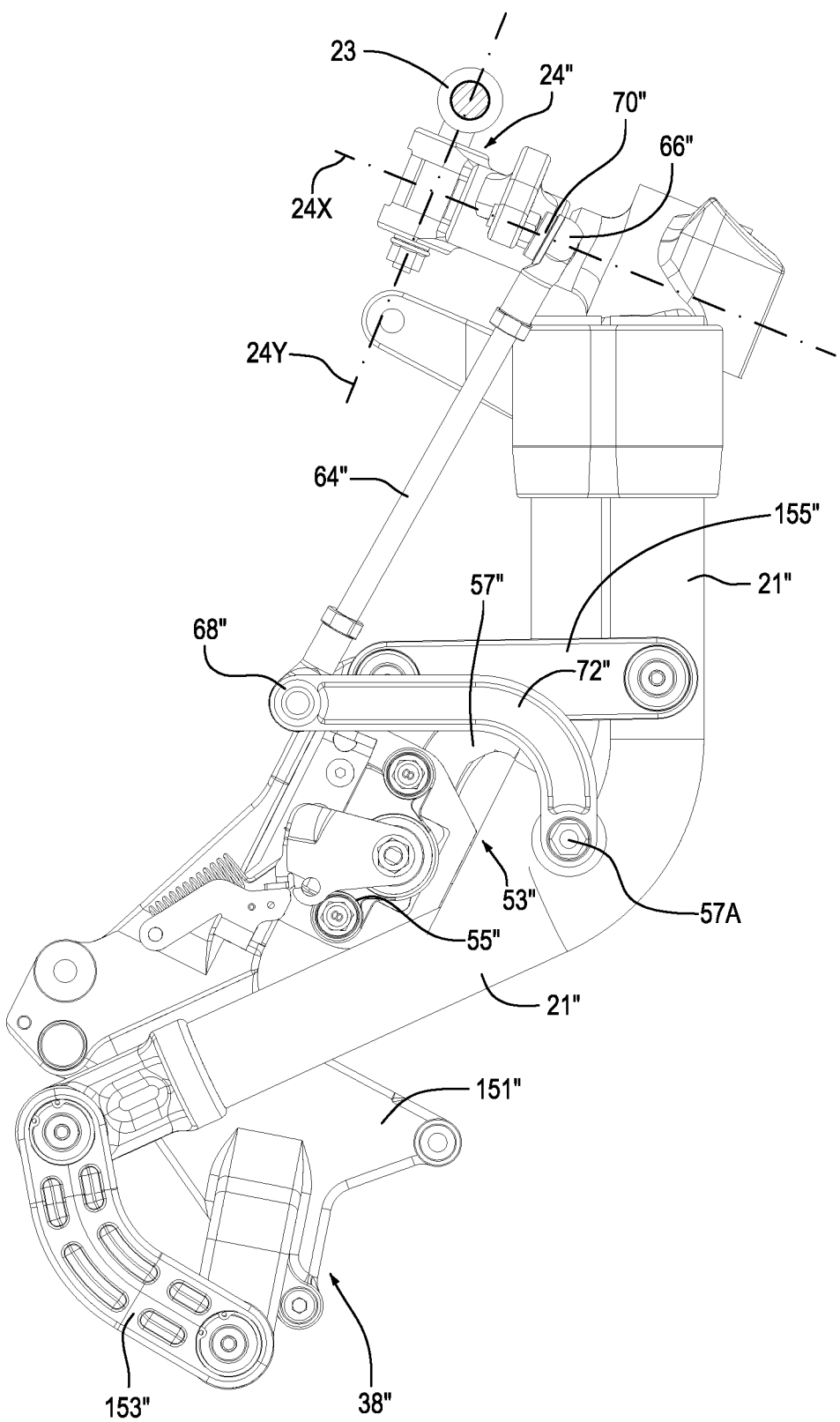
FIGS. 28 and 29 show a side view and an axonometric view of the support arm, wheel support and brake of the right steered wheel of the forecarriage of FIGS. 23 and 25.
Figure 29:
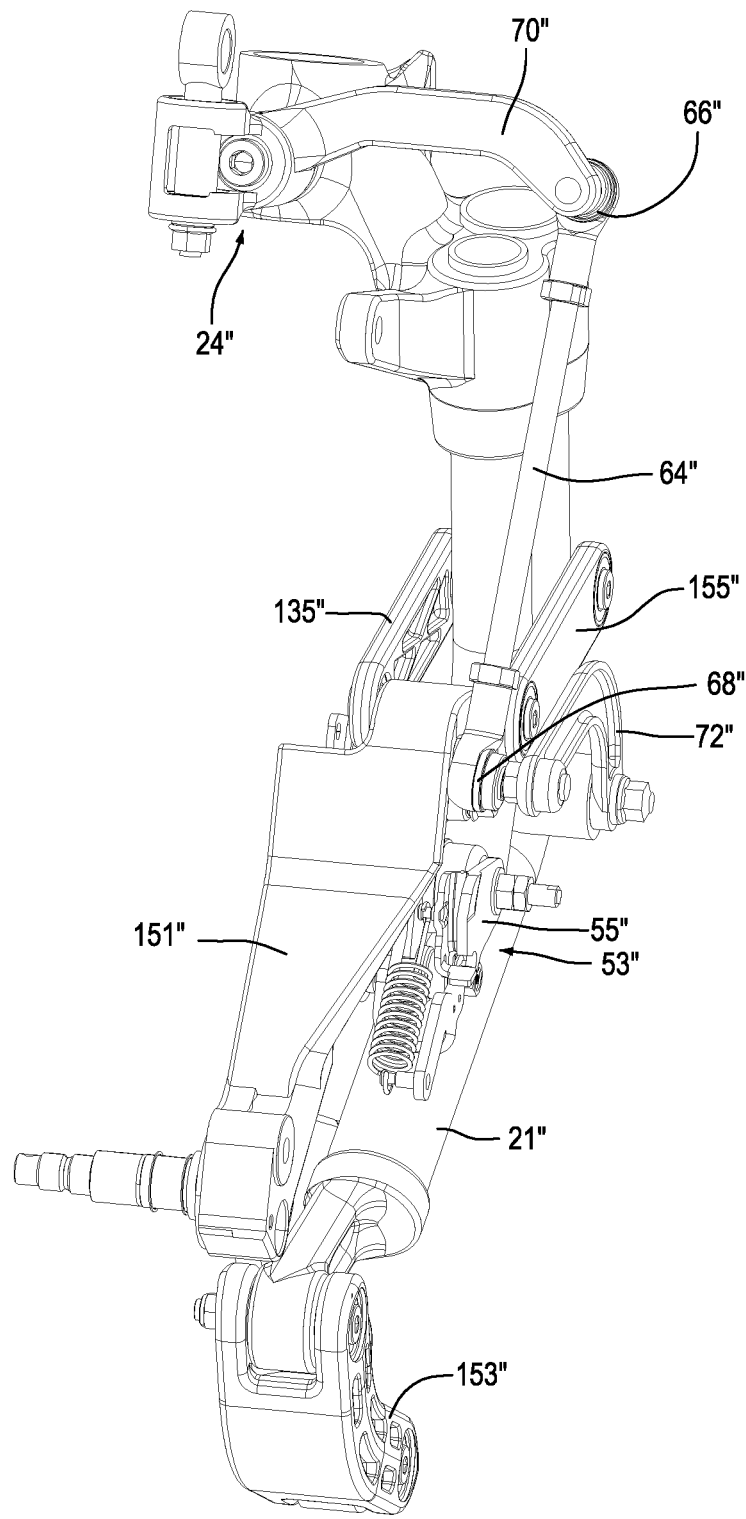
Figure 33:
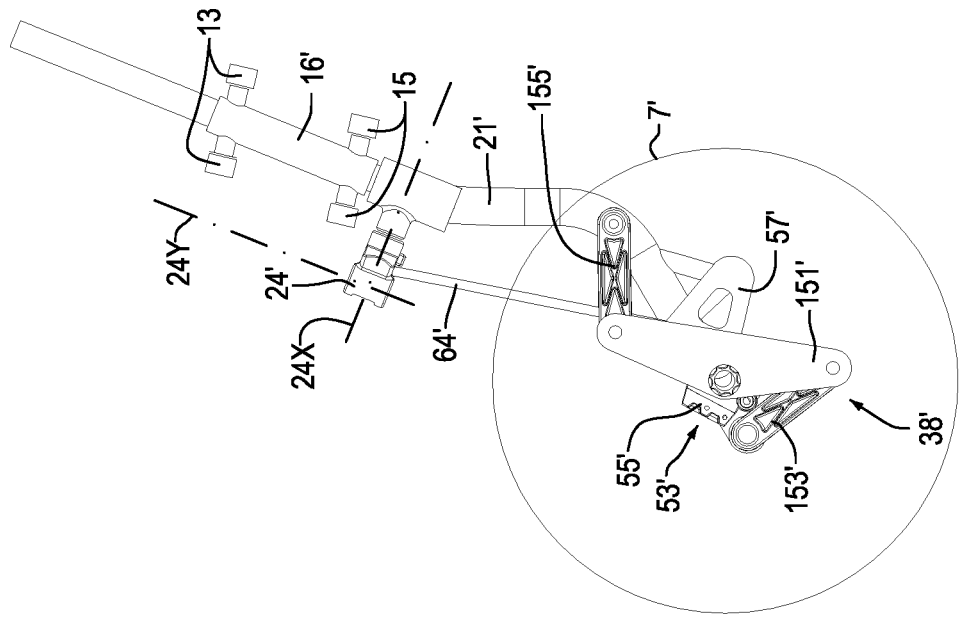
FIGS. 32 and 33 show schematic and simplified axonometric and side views similar to FIGS. 25 and 26.

In FIGS. 24, 25 the forecarriage 1A is shown in an axonometric and a side view, respectively. FIGS. 26 and 27 show only the right front steered wheel 7" and relevant parts of the forecarriage. FIGS. 28, 29, 30 and 31 show side views and axonometric views of parts of the right support arm and members of the respective brake of the tilting locking device. For an easier understanding of the structure of the tilting locking device in this embodiment, FIGS. 32 and 33 show an axonometric view and a side view of the vehicle forecarriage 1A in a schematic and simplified representation.

The motor vehicle comprises two front steered wheels, namely a left front steered wheel 7' and a right front steered wheel 7". The motor vehicle further comprises a tilting four bar linkage 11 extending in a transverse, i.e. right-left, direction. The tilting four bar linkage has two crosspieces, respectively upper and lower crosspieces 13 and 15, joined by two uprights, respectively right and left uprights 16' and 16". Right and left support arms 21" and 21' are provided, which respectively support the right front steered wheel 7" and the left front steered wheel 7' with the interposition of a respective suspension 33', 33". The support arms 21', 21" are associated with the uprights 16' and 16" and the upper parts thereof are housed in the uprights for rotation therein around the steering axes of the front steered wheels 7', 7". The two support arms 21', 21" are connected to one another by a transverse component 23, which may consist of a steering bar and which is constrained at the two ends thereof to the two support arms 21', 21" with respective joints 24', 24" that allow rotation around two axes, namely: a tilting axis 24X and an axis 24Y orthogonal to the tilting axis.

A brake, for instance a disc brake, is associate with at least one support arm 21', 21". In the embodiment of FIGS. 24 to 33 a left brake 53' and a right brake 53" are provided at the left end and right support arms 21' and 21", respectively. The two brakes are symmetrical to one another with respect to a median plane of the vehicle 1. Each brake comprises a first brake member 55', 55" and a second brake member 57', 57". The brake member 57', 57" is a sector of a disc and the brake member 55', 55" is or comprises a brake caliper co-acting with the disc sector.

The brake member 57', 57" is rotatably supported on the respective wheel support arm 21', 21", so as to rotate around a rotation axis 57X. The brake member 57', 57" rotates with respect to the support arm 21', 21" proportionally to the rotational movement of the transverse component 23 around the tilting axes 24X. The rotary motion of the transverse component 23 around the tilting axes 24X is transmitted to the brake member 57', 57" of each brake 53', 53" by means of a mechanical transmission.

Figure 30:
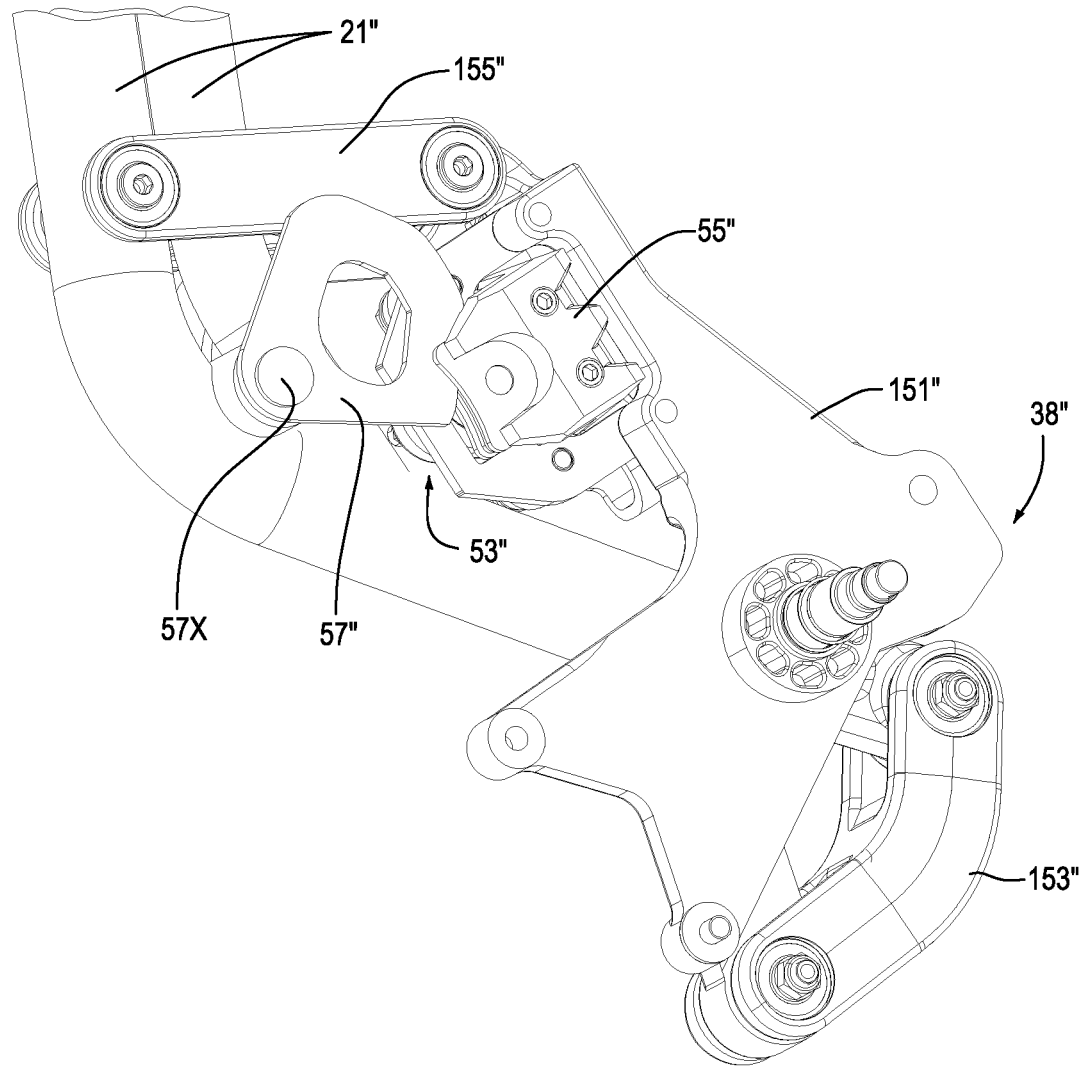
FIGS. 30 and 31 show further views of the support arm with parts removed.
Figure 31:
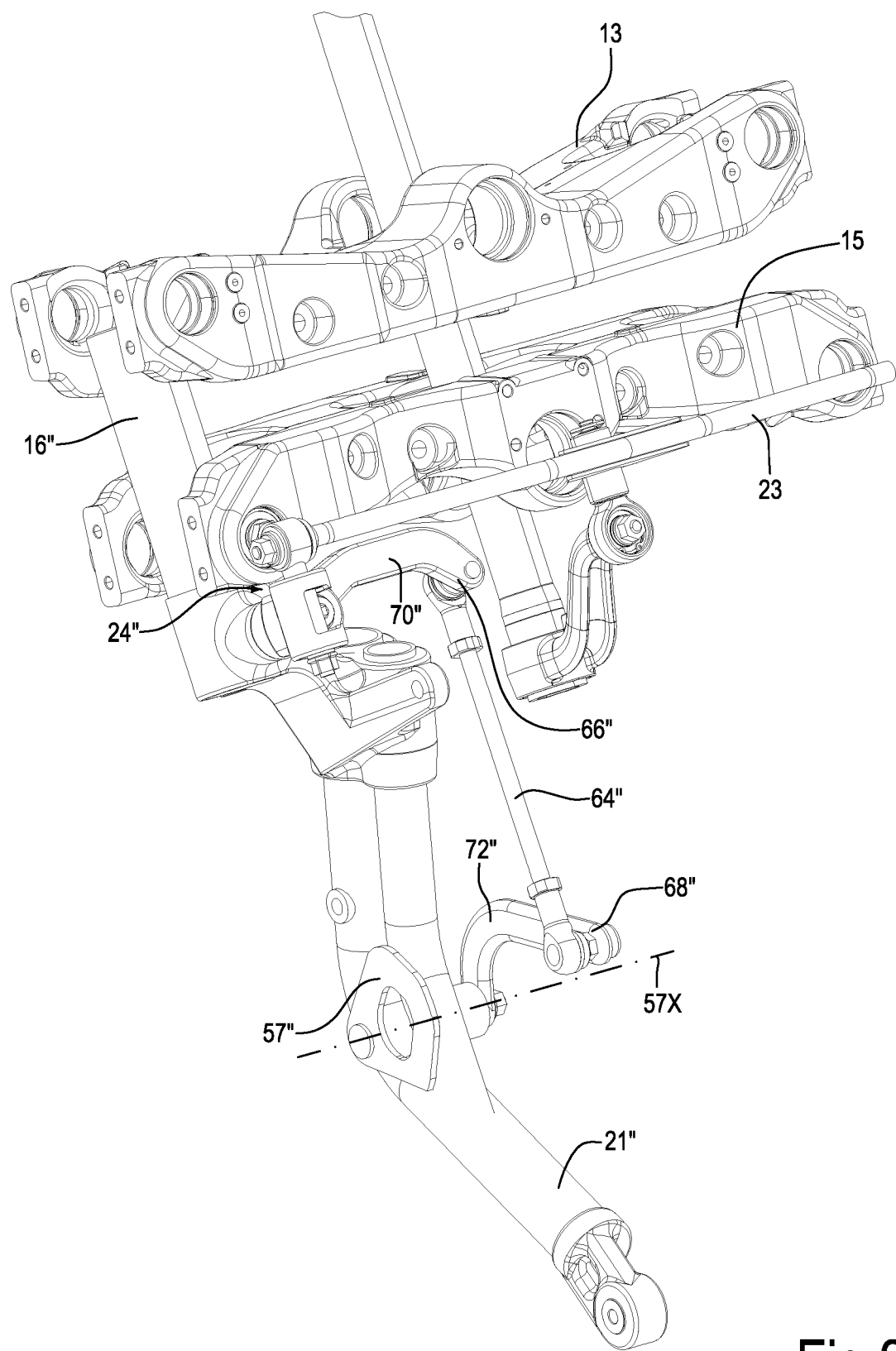
Figure 32:
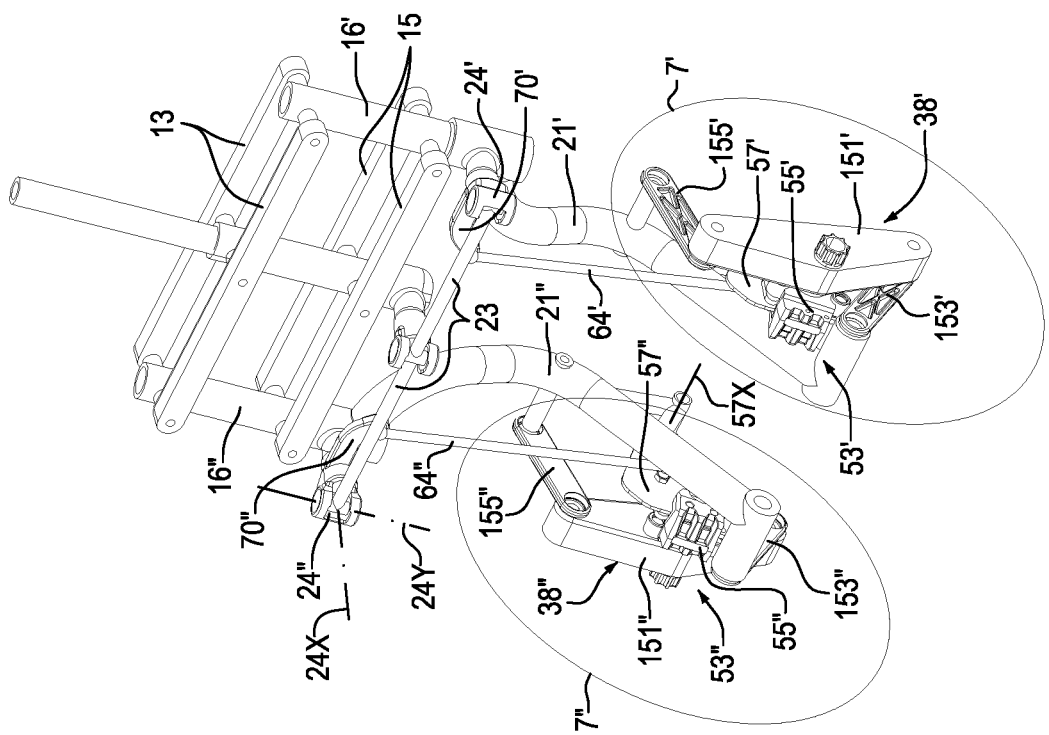

The components of an embodiment of said transmission are better shown in FIGS. 30 and 31, where surrounding parts have been removed for the sake of clarity. Each mechanical transmission can comprise a respective rod 64', 64" coupled at a first upper end with a first ball joint 66', 66" to a pivoting arm 70', 70". The pivoting arm 70', 70" is coupled to the joint 24', 24" such that it pivots rigidly with the transverse component 23 around axis 24X, performing an angular movement corresponding to the angular tilting movement of the transverse component 23 around said axis 24X. The opposite lower end of each rod 64', 64" is coupled by a further ball joint 68', 68" to a further pivoting arm 72',72". This latter is hinged at the respective support arm 21', 21" and is rigidly coupled to the respective brake member 57', 57". In embodiments, the brake member 57', 57" and the further pivoting arm 72', 72" are disposed on two opposite sides of the support arm 21', 21".

In summary, when the transverse component 23 pivots around axes 24X with respect to the support arms 21', 21", the brake member 57', 57" of each brake 53', 53" pivots proportionally around axis 57X.

Each brake member 57', 57" is adapted to co-act with the respective brake member 55', 55". In the embodiment of FIGS. 24 to 33 the brake member 55', 55" is rigidly mounted on a respective wheel support 151', 151" which forms part of a respective suspension mechanism 38', 38" of the suspension 33', 33" of each front steered wheel 7', 7". Each wheel support 151', 151" rotatably supports the axle of the respective wheel 7', 7".

Each wheel support 151', 151" is connected to the respective support arm 21', 21" by means of two rockers or cranks 153', 153" and 155', 155". The wheel support 151', 151", the two rockers 153', 153", 155', 155" and the support arm 21', 21" form a respective suspension four bar linkage for each wheel 7', 7". In the embodiment of FIGS. 24 to 33 the four bar linkage is a so-called Watt four bar linkage. The four bar linkage lies on a plane orthogonal to the rotation axis of the respective wheel 7', 7".

Each suspension mechanism 38', 38", mainly consisting of the suspension four bar linkage, forms along with a spring 35', 35" and a shock absorber 37', 37", the respective suspension 33', 33". Each assembly formed by spring 35', 35" and shock absorber 37', 37" is connected at one end to the wheel support 151', 151" and at the opposite end to the support arm 21', 21".

The Watt four bar linkage is designed such that during the springing motion of the suspension mechanism 38', 38" the axle of the respective front steered wheel 7', 7", and therefore the center of the wheel, moves along an approximately rectilinear trajectory.

In some embodiments, each brake member 55', 55" is rigidly mounted on the respective wheel support 151', 151" in a position such that the center of the calipers thereof are as near as possible to the axle of the respective front steered wheel 7', 7". In this way the active element (the caliper) of the brake 53' 53" moves along an approximately rectilinear trajectory during the springing movement of the respective wheel.

Conversely, the brake member 57', 57" pivots around the hinge, wherewith it is coupled to the respective support arm 21', 21" with a motion that is proportional to the tilting of the vehicle, i.e. to the rotation of the transverse component 23 around the tilting axes 24X.

As in the exemplary embodiments of FIGS. 1 to 8, for instance, each brake 53', 53" is therefore a disc brake, the disc whereof is formed by the brake member 57', 57" and the caliper whereof is arranged inside the brake member 55', 55" and not shown.

When the two brakes 53', 53" are activated, the suspension four bar linkage 38', 38" on each side of the vehicle becomes locked with respect to the support arm 21', 21", i.e. the rockers 153', 153" and 155', 155" cannot pivot around the hinge connecting them to the support arm 21', 21". The brake member 57', 57" is prevented from pivoting around axis 57A. Due to the connection between the brake member 57', 57" and the transverse component 23, formed by the respective pivoting arm 72', 72" and bar 64', 64", the rotation movement of the transverse component 23 around the tilting axes 24A is also prevented. As a result, tilting of the vehicle 1 and springing movement of the suspensions 33', 33" are prevented.

In summary, in this embodiment the tilting locking device blocks the springing motion of the suspensions and the tilting motion of the vehicle by constraining with respect to each other: (A) a first member represented by the wheel support 151', 151" of the respective suspension 33; 33", which performs a springing movement with respect to the support arm 21'; 21"; and (B) a second member represented by the brake member 57'; 57" that is mechanically connected with the transverse component, so as to perform a rotational movement proportional to the rotation of the transverse component 23 around the tilting axes 24X.

Figure 35:
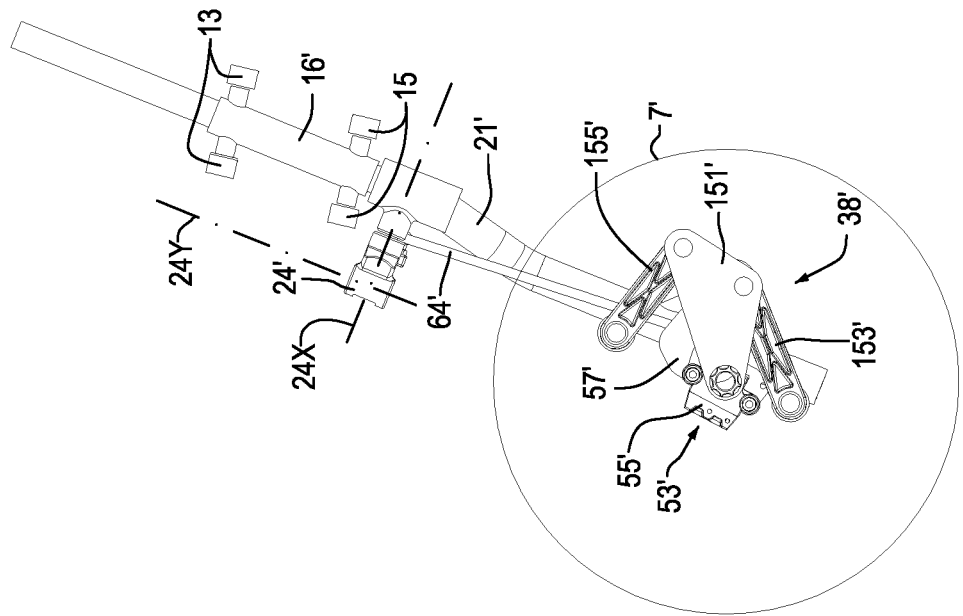
FIGS. 34 and 35 show schematic and simplified axonometric and side views similar to FIGS. 32 and 33 of an embodiment with a wheel suspension using a Roberts four bar linkage.
Figure 34:
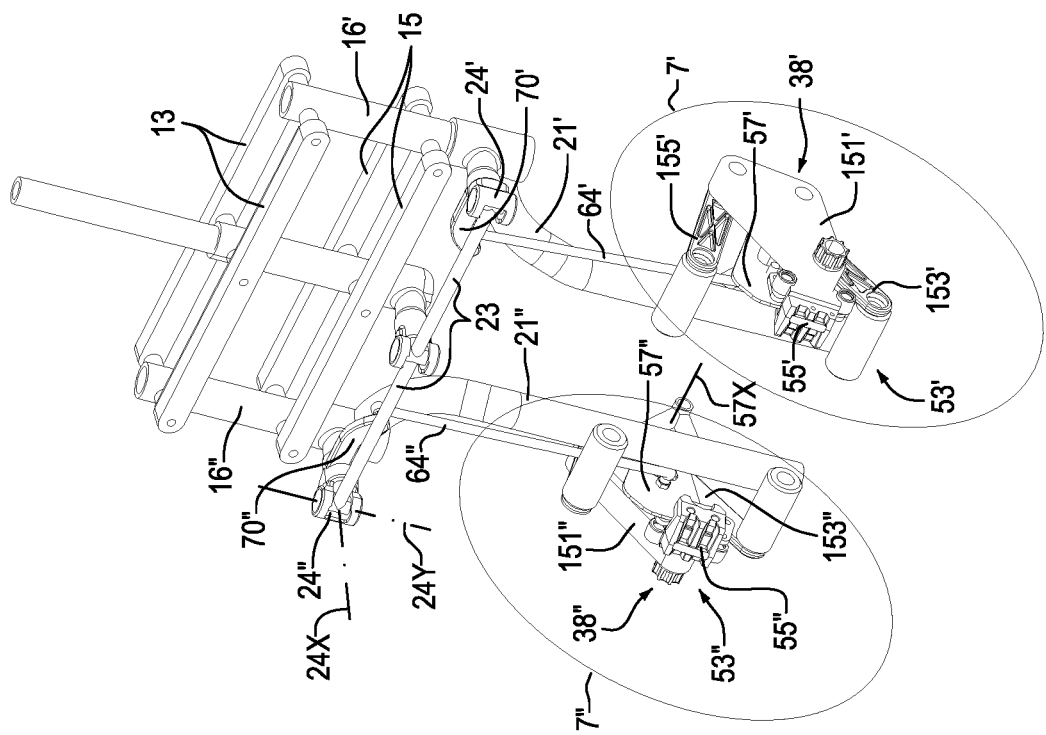

Embodiment of FIGS. 34 and 35

FIGS. 34 and 35 show an axonometric view and a side view of a forecarriage of a vehicle according to a further embodiment in a highly schematic and simplified manner, similar to FIGS. 32 and 33. The same reference numbers as in FIGS. 24 to 33 are used to indicate the same or equivalent parts or components, which will not be described again. As in FIGS. 32 and 33, some of the components of each suspension 33', 33" are omitted for clarity, such as in particular the springs and the shock absorbers.

The main difference between the embodiment of FIGS. 24 to 33 (and more specifically FIGS. 32, 33) and the embodiment of FIGS. 34 and 35 is the configuration of the suspension four bar linkage, i.e of the suspension mechanism 38', 38". In FIGS. 24 to 33 the suspension four bar linkage forming the suspension mechanism 38', 38" is a Watt four bar linkage. In the embodiment of FIGS. 34, 35 the suspension four bar linkage 38' 38" is a so-called Roberts four bar linkage. The elements forming the Roberts four bar linkage 38', 38" of FIGS. 34, 35 are labeled with the same reference numbers used in FIGS. 24-33 for designating functionally equivalent components of the suspension four bar linkage.

Figure 37:
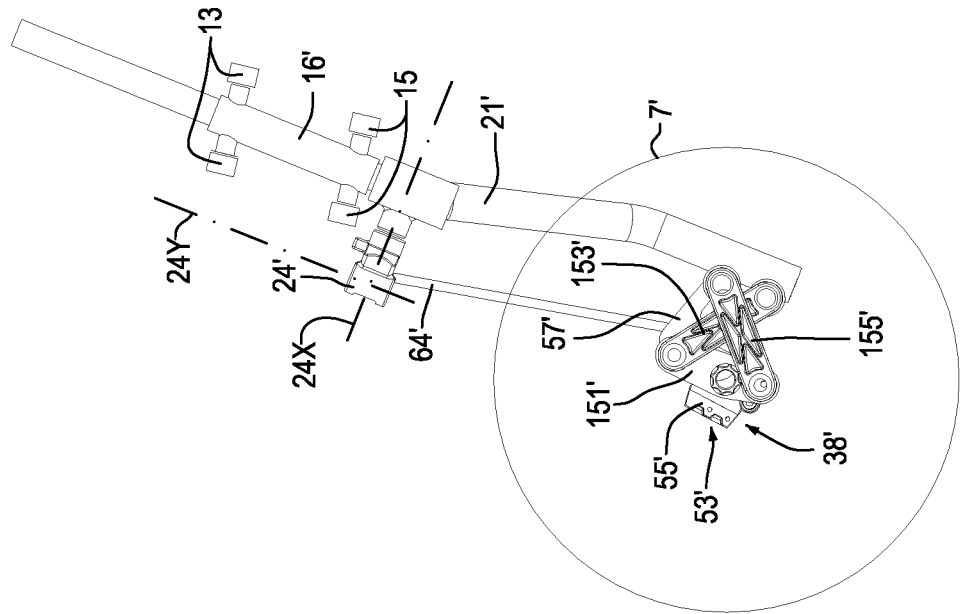
FIGS. 36 and 37 show schematic and simplified axonometric and side views similar to FIGS. 32 and 33 of an embodiment with a wheel suspension using a Tchebycheff four bar linkage.
Figure 36:
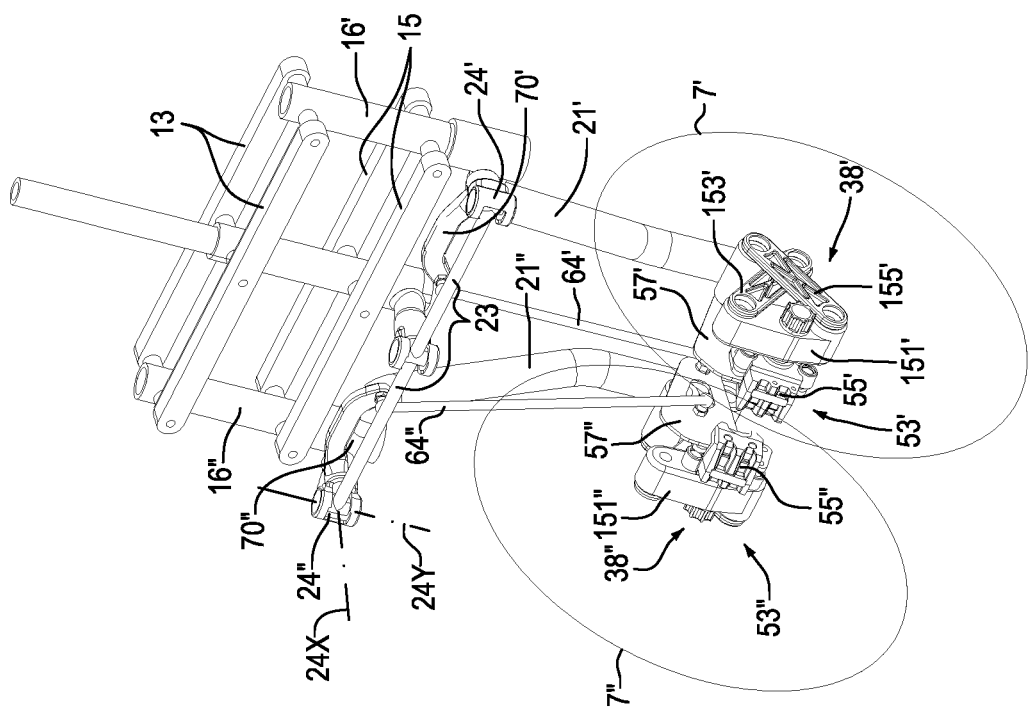
Figure 38:
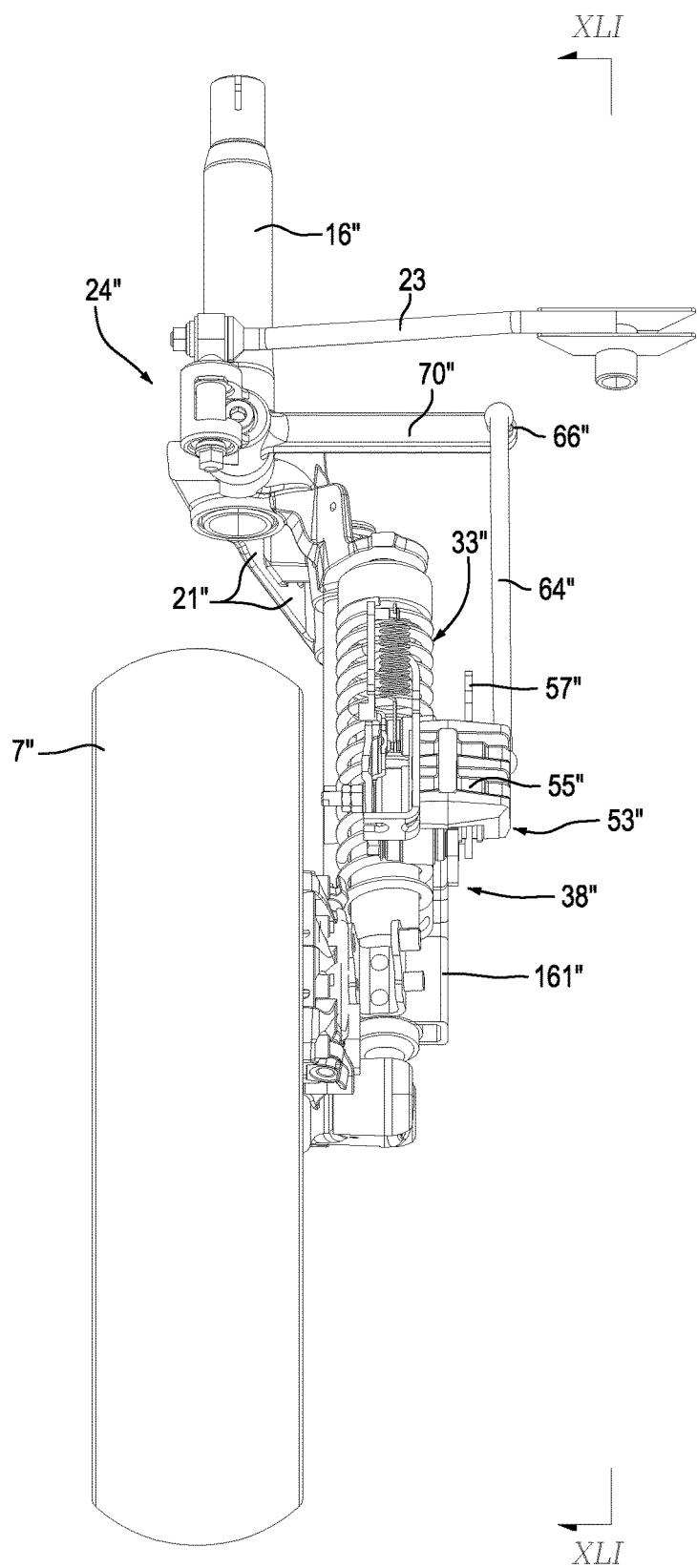
FIG. 38 shows a front view of a right front steered wheel of a three-wheeled vehicle with a further embodiment of the tilting locking device according to the present disclosure.
Figure 39:
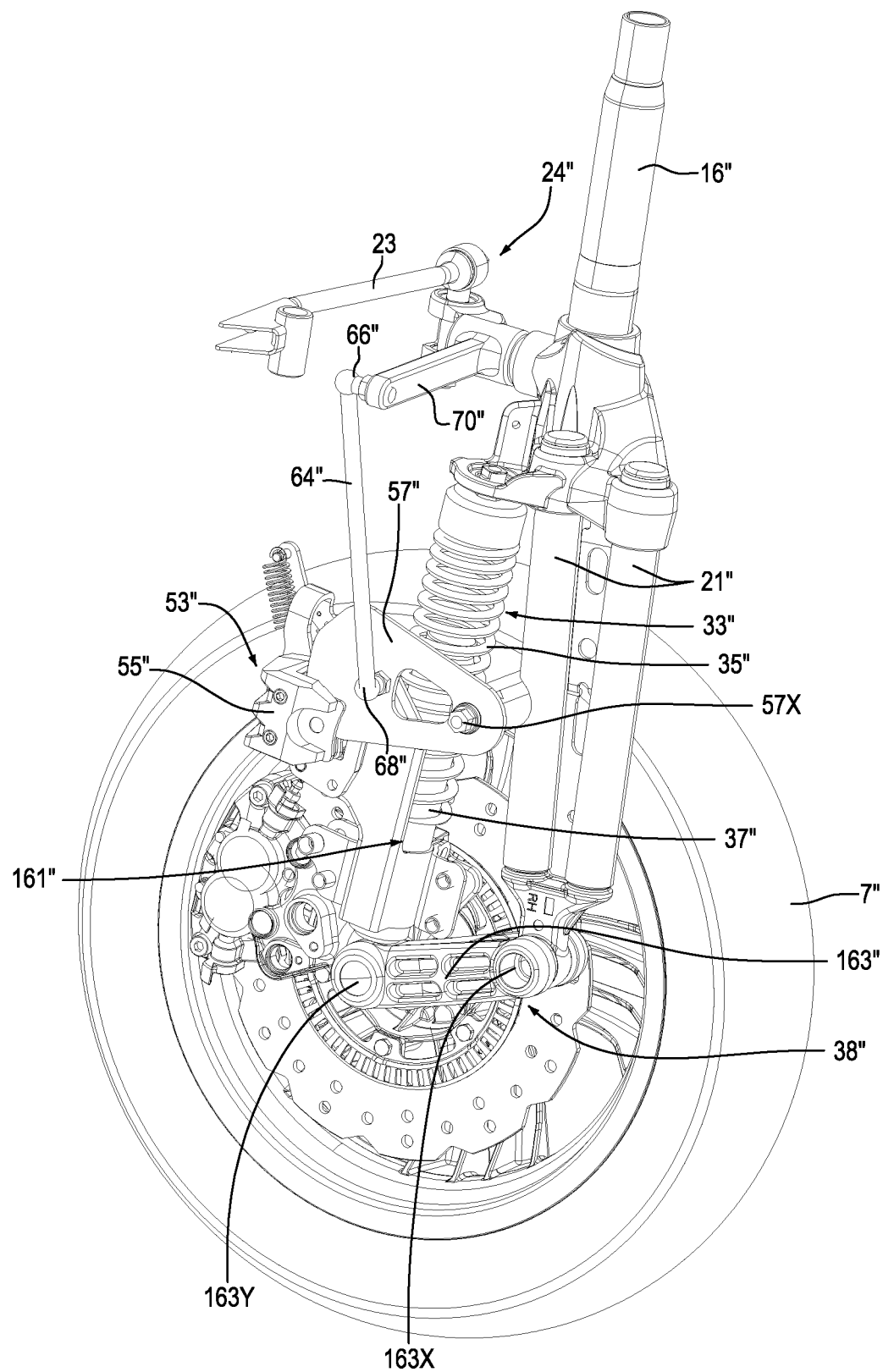
FIGS. 39 and 40 show two axonometric views of the device of FIG. 38.
Figure 40:
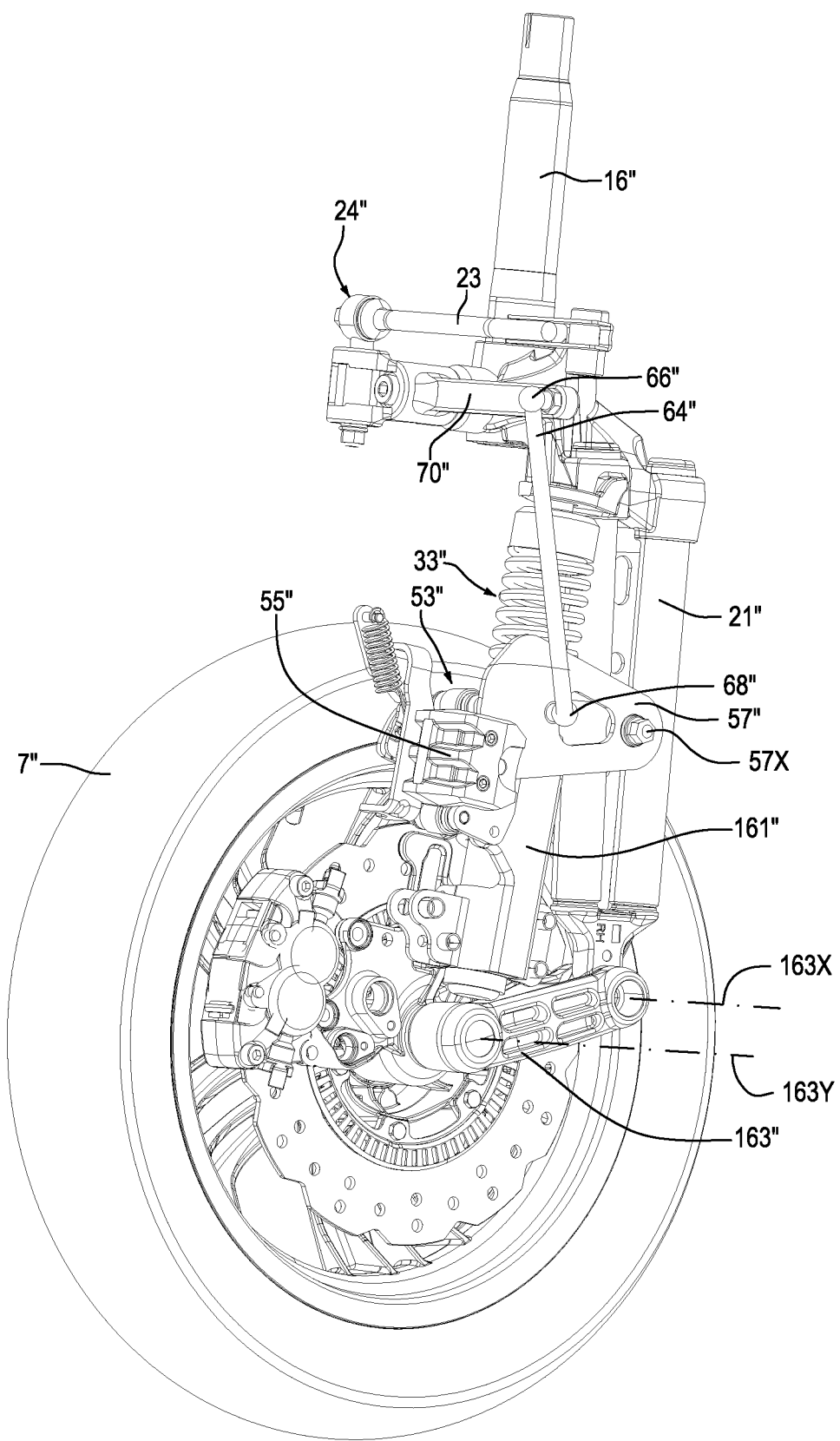

Embodiment of FIGS. 36 and 37

FIGS. 36 and 37 show an axonometric view and a side view of a forecarriage of a vehicle according to a further embodiment in a highly schematic and simplified manner, similar to FIGS. 32 and 33. The same reference numbers as in FIGS. 24 to 33 are used to indicate the same or equivalent parts or components, which will not be described again.

The main difference between the embodiment of FIGS. 24 to 33 (and more specifically FIGS. 32, 33) and the embodiment of FIGS. 36 and 37 is the configuration of the suspension four bar linkage 38', 38". In FIGS. 24 to 33 the suspension four bar linkage 38', 38" is a Watt four bar linkage. In the embodiment of FIGS. 36, 37 the suspension four bar linkage 38', 38" is a so-called Tchebycheff (also: Chebysheff) four bar linkage. The elements forming the Tchebicheff four bar linkage 38', 38" of FIGS. 36, 37 are labeled with the same reference numbers used in FIGS. 24-33 for functionally equivalent components.

Both the Roberts four bar linkage and the Tchebycheff four bar linkage are designed such that the point thereof where the respective front wheel axle is positioned moves along an approximately rectilinear trajectory.

Embodiment of FIGS. 38 to 41

A further embodiment of the tilting locking device will be disclosed herein below reference being made to FIGS. 38 to 41. In the figures, views of only the right section of the vehicle forecarriage are shown. The left portion of the forecarriage is symmetrical to the right portion of the forecarriage. The remaining parts of the vehicle, not shown in FIGS. 38 to 41, can be substantially the same as described above in connection with the previous embodiments. Specifically, the vehicle comprises a tilting four bar linkage comprised of upper and lower crossbars or crosspieces 13, 15, as well as left and right uprights 16', 16" connecting the upper and lower crosspieces. Each front steered wheel 7', 7" is supported by a respective support arm 21', 21" associated to a suspension 33', 33". This latter includes springs 35', 35" and shock absorbers 37', 37", as well as suspension mechanisms 38', 38".

Turning now specifically to FIGS. 38 to 41, a brake, for instance a disc brake, is associate with at least one support arm 21', 21". In the embodiment of FIGS. 38 to 41 the right brake 53" is shown and described here below, a symmetrical arrangement being provided on the left side of the vehicle, not shown. The brake 53" comprises a first brake member 55" including a brake caliper and a second brake member 57" including a brake disc sector.

Figure 41:
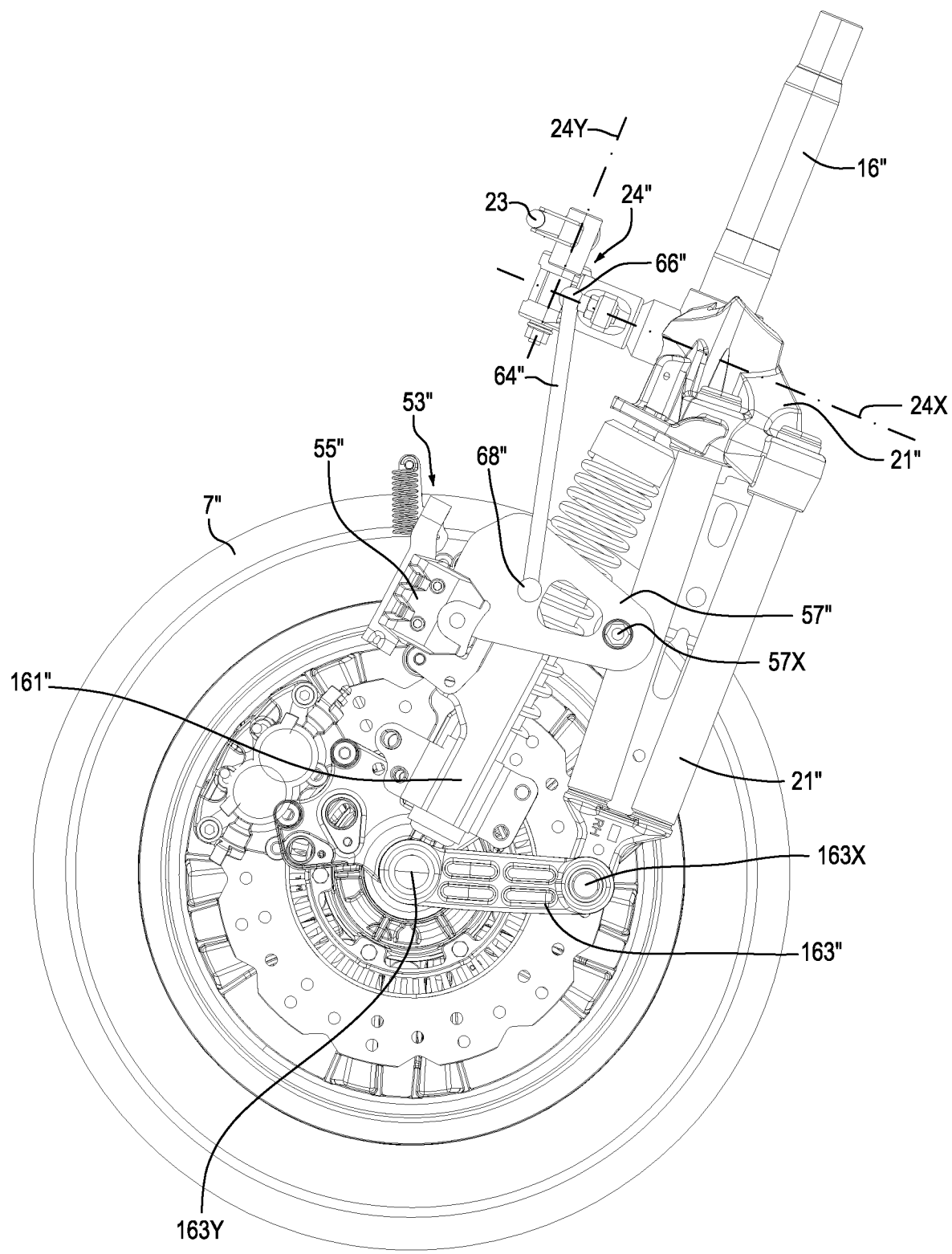
FIG. 41 shows a side view of the device of FIGS. 38 to 40.
Figure 42:
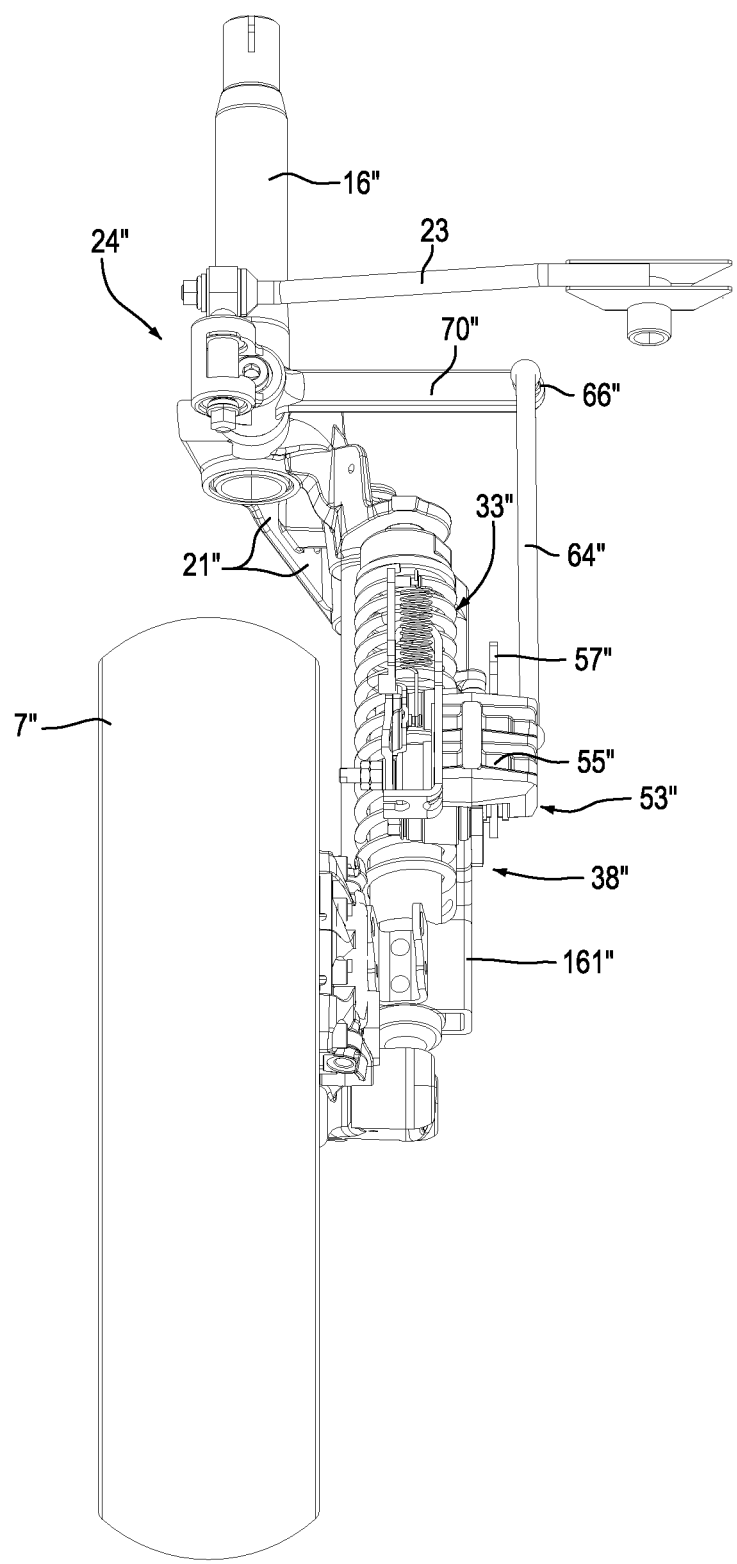
FIGS. 42, 43, 44 and 45 show views similar to FIGS. 38, 39, 40 and 41 in a yet further embodiment.
Figure 43:
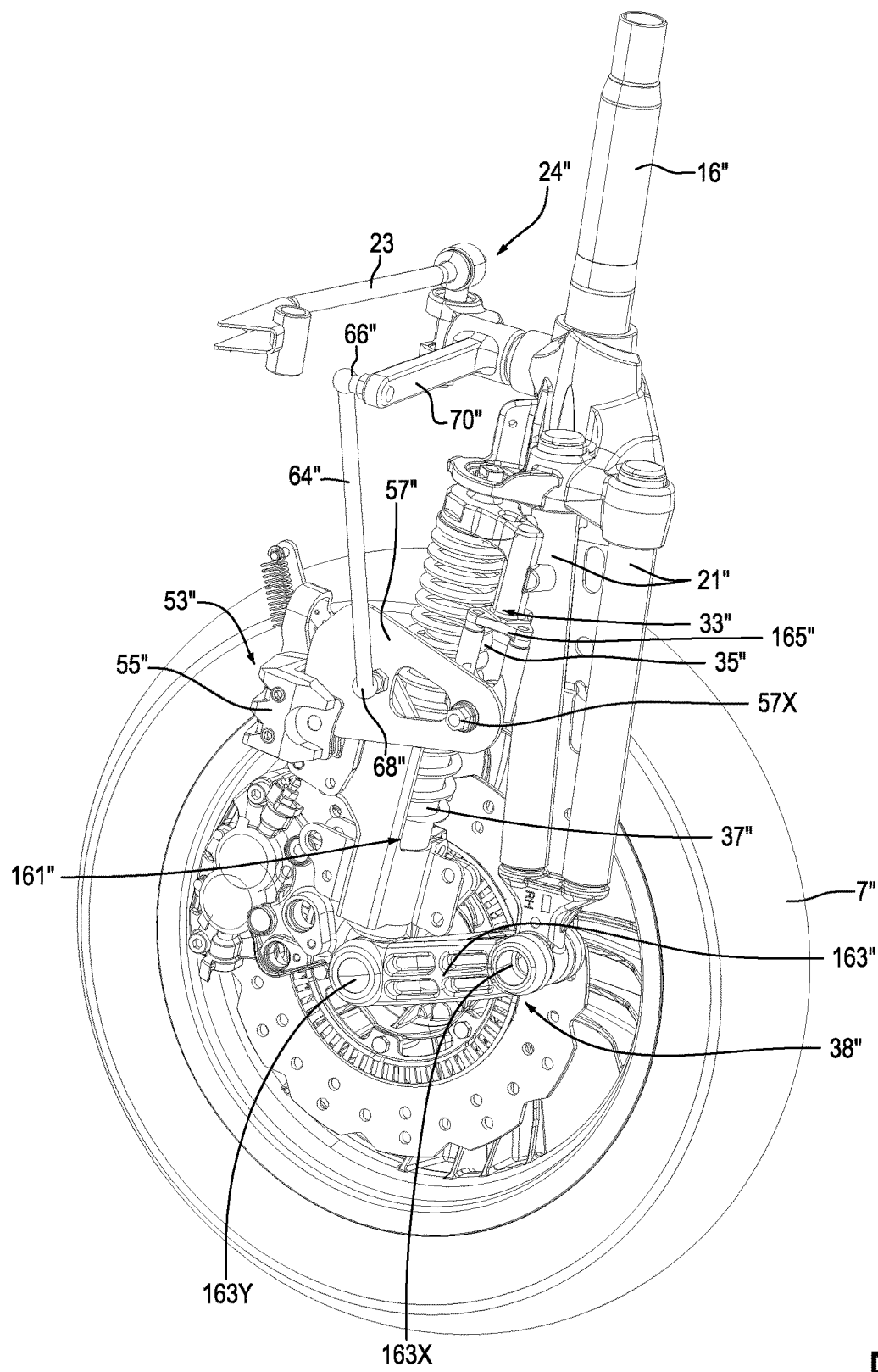
Figure 44:
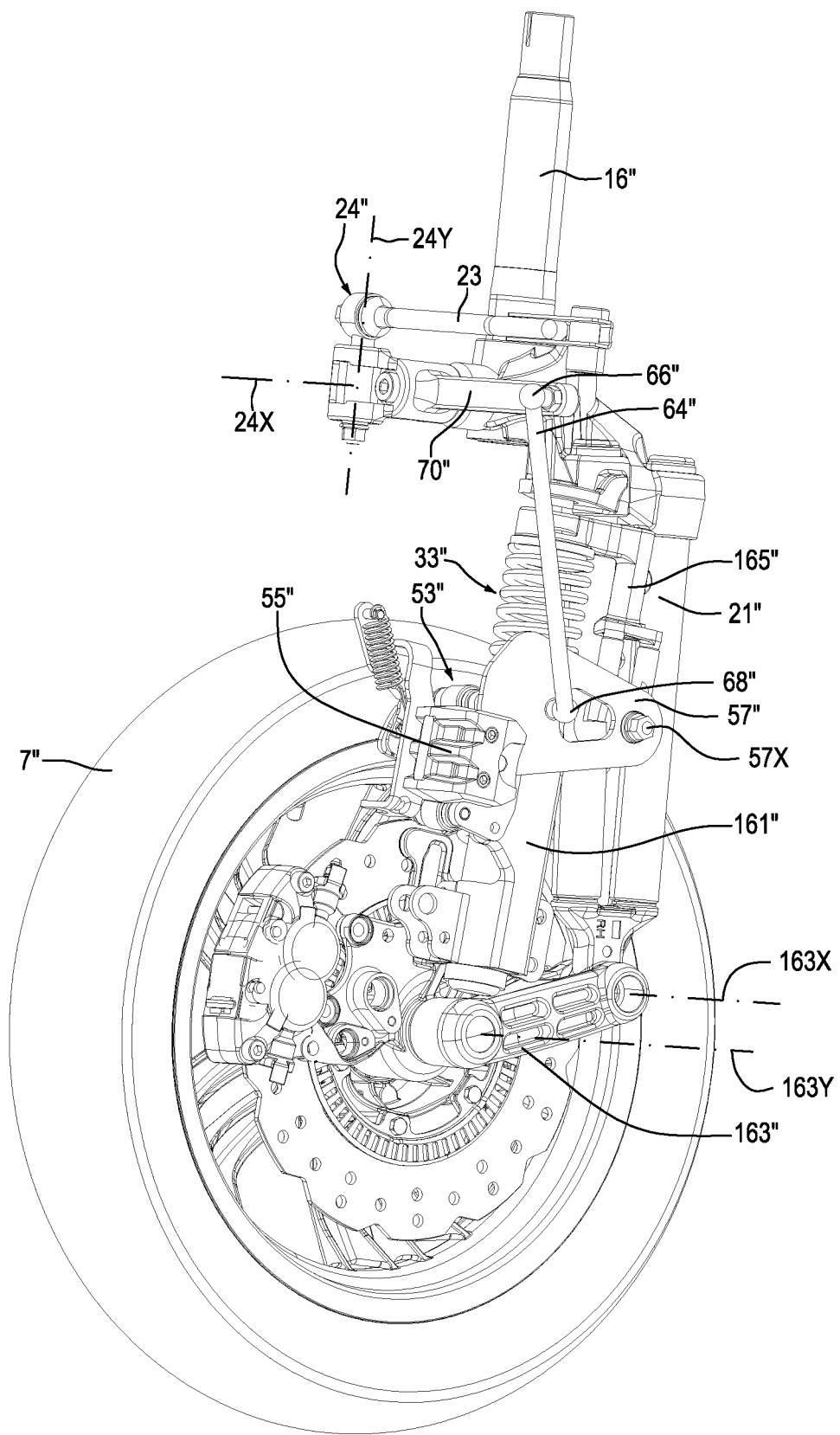
Figure 45:
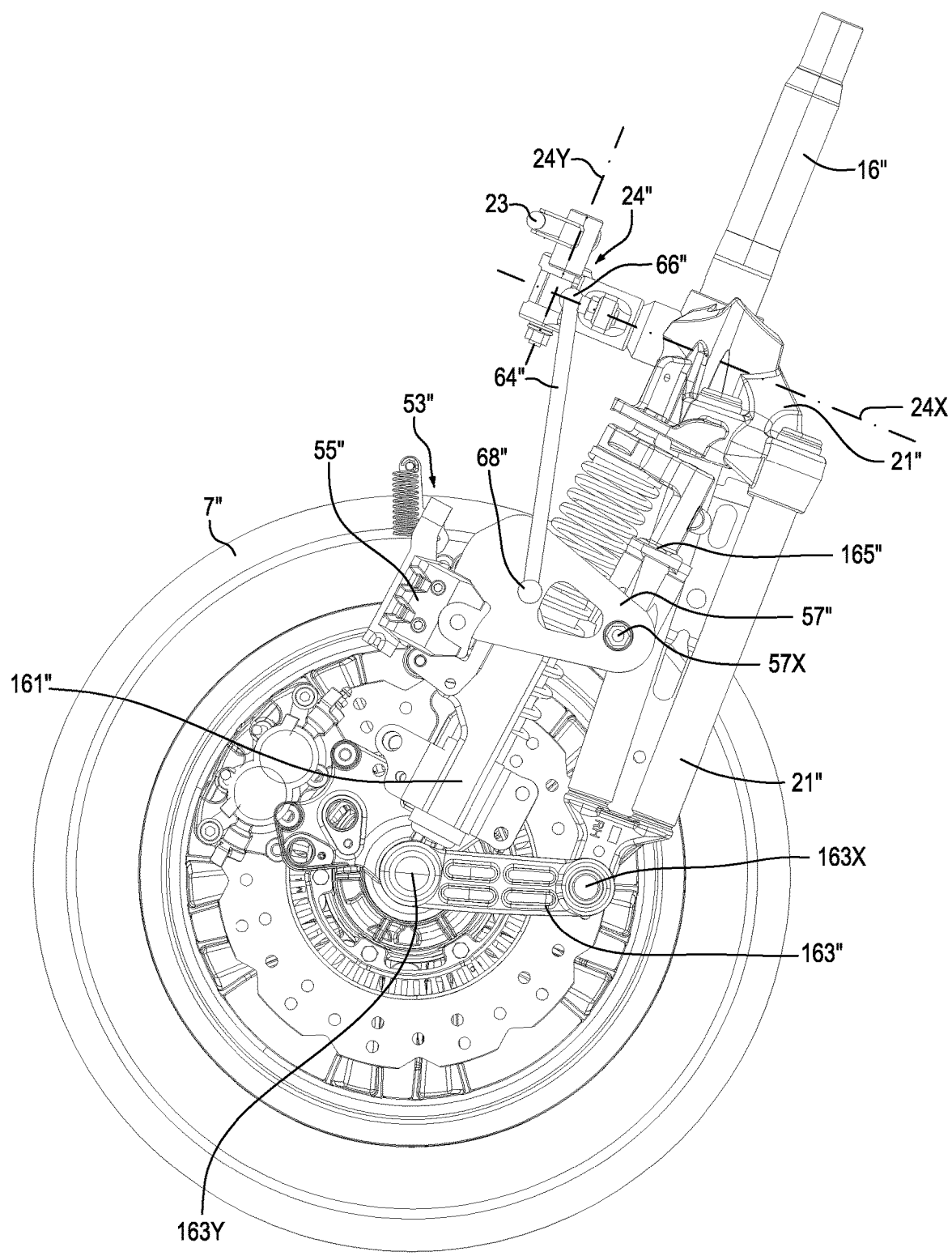

The brake member 57" is rotatably supported on the respective support arm 21", so as to rotate around a rotation axis 57X (FIG. 41). The brake member 57" rotates with respect to the support arm 21" proportionally to the rotational movement of the transverse component 23 around the tilting axes 24X.

The rotary motion of the transverse component 23 around the tilting axes 24X is transmitted to the brake member 57" of brake 53" by means of a mechanical transmission. In the embodiment of FIGS. 38 to 41, the mechanical transmission comprises a respective rod 64" coupled at a first upper end with a first ball joint 66" to a pivoting arm 70". The pivoting arm 70" is in turn coupled to the joint 24" such that it pivots around axis 24X, performing an angular movement corresponding to the angular tilting movement of the transverse component 23 around said axis 24X. The lower end of the rod 64" is coupled by a further ball joint 68" to the brake member 57".

In summary, when the transverse component 23 pivots around axes 24X with respect to the support arm 21", the brake member 57" pivots proportionally around axis 57X. A symmetrical arrangement is provided on the left side of the vehicle, not shown.

The brake member 57" is adapted to co-act with the brake member 55". In the embodiment of FIGS. 38 to 41 the brake member 55" is rigidly connected to the lower end of an assembly formed by spring 35" and shock absorber 37" of the suspension 33". Specifically, the brake member 55" is rigidly coupled through a bracket 161" to the lower end of the spring-shock absorber assembly. The upper end of the spring-shock absorber assembly is coupled to the support arm 21" through a joint, e.g. a spherical joint. The lower end of the spring-shock absorbent assembly is further coupled to the lower end of the support arm 21" by a pivoting arm 163". The pivoting arm 163" is hinged at 163X to the support arm 21" and at 163Y to bottom end of the spring-shock absorber assembly. The axis 163Y is coaxial with the rotation axis of the front steered wheel 7". The pivoting arm 163 forms a suspension mechanism 38" in the sense used herein and the suspension mechanism 38" in combination with the spring-shock absorber assembly form the respective suspension 33".

Under normal operating conditions, the brake 53" is inoperative. The vehicle can tilt around a horizontal axis. When the vehicle tilts the transverse component 23 rotates around axis 24X with respect to the support arm 21". The wheel 7" can perform springing movements involving contraction and extension of the spring-shock absorber assembly and pivoting movement of the suspension mechanism 38" (pivoting arm 167").

When the vehicle is stationary, e.g. parked, it shall be prevented from tilting and the springing movements of the suspension 33" shall be locked. The brake 53" is activated, such that the brake members 55" and 57" are constrained to one another. This locks the suspension 33" and prevents springing movements of the wheel 7". At the same time, by locking the brake 53", the transverse component 23 is prevented from rotating around axis 24X with respect to the support arm 21" by the mechanical transmission formed by rod 64" and pivoting arm 70" which connects the brake member 57" to the transverse component 23. Tilting movements are blocked.

A symmetric brake 53' on the left side of the vehicle locks the left suspension 33' (not shown). Activation of the two brakes 53', 53" locks the movement of the vehicle, preventing tilting and springing motions with only two brakes and a single actuation device, as in the previously described embodiments.

In summary, in this embodiment the tilting locking device blocks the spinning motion of the suspensions and the tilting motion of the vehicle by constraining with respect to each other: (A) a first member represented by the pivoting arm 163" of the respective suspension 33", which performs a springing movement with respect to the support arm 21"; and (B) a second member represented by the brake member 57" that is mechanically connected with the transverse component 23, so as to perform a rotational movement proportional to the rotation of the transverse component 23 around the tilting axes 24X.

Embodiment of FIGS. 42 to 45

The embodiment of FIGS. 42 to 45 is similar to the embodiment of FIGS. 38 to 41. The same reference numbers designate the same or equivalent parts and components, which are not described again. The FIGS. 42-45 show the same views as FIGS. 38-41 of this further embodiment.

The main difference between the embodiment of FIGS. 38-41 and the embodiment of FIGS. 42-45 is the pivoting point of the brake member 57". While in FIGS. 38-41 the brake member 57" is hinged to the support arm 21", in the embodiment of FIGS. 42-45 the brake member 57" is hinged around axis 57X to a bracket 166" rigidly coupled to the upper end of the assembly formed by the spring 35" and the shock absorber 37". The bracket 166" and the upper end of the spring and shock absorber assembly are coupled to the support arm 21" through a ball joint, as in the embodiment of FIGS. 38-41, which allows the springing movement of the wheel 7".

By coupling the brake member 57" and the brake member 55" to the upper end and to the lower end of the suspension of the spring and shock absorber assembly 35", 37" respectively, a perfectly linear movement is obtained between the two brake members 57", 55".

The operation of the tilting locking device of FIGS. 42-45 is the same as described above in connection with the embodiment of FIGS. 38-41 and will not be described again.

While the invention has been described in terms of various specific embodiments, it will be apparent to those skilled in the art that various modifications, changes and omissions are possible without departing from the spirit and scope of the claims.

The invention claimed is:

1. A tilting motor vehicle comprising:
   a frame;
   at least one rear driving wheel;
   a left front steered wheel and a right front steered wheel placed side by side in a right-left direction;
   a tilting four bar linkage comprising: an upper crosspiece extending transversely to a median plane of the motor vehicle, in a right-left direction; a lower crosspiece extending transversely to the median plane of the motor vehicle, in the right-left direction; a left upright, which connects the upper crosspiece and the lower crosspiece; a right upright, which connects the upper crosspiece and the lower crosspiece;
   a left support arm coupled to the left upright so as to rotate with respect thereto around a respective steering axis; wherein the left front steered wheel is connected to the left support arm with the interposition of a left suspension;

a right support arm coupled to the right upright so as to rotate with respect thereto around a respective steering axis; wherein the right front steered wheel is connected to the right support arm with the interposition of a right suspension; a transverse component extending in the right-left direction, pivoted at a first end to the left support arm and at a second end to the right support arm so as to follow the rotation movement of the left support arm and of the right support arm around the respective steering axes, and to rotate with respect to the left support arm and to the right support arm around respective tilting axes, when the motor vehicle performs a tilting movement;

a tilting locking device comprising:
for at least one of said left front steered wheel and right front steered wheel a first brake adapted to lock, with a single actuation, a springing movement of the respective suspension and the rotation movement of said transverse component around the tilting axes by constraining with respect to each other a first member of the respective suspension, which performs a springing movement with respect to the support arm, and a second member associated with the respective steered wheel and mechanically connected with the transverse component, so as to perform a rotational movement proportional to the rotation of the transverse component around the tilting axes; and for the other of said left front steered wheel and right steered wheel a second brake adapted to lock, with said single actuation, at least the springing movement of the respective suspension.

2. The motor vehicle of claim 1, wherein the second brake is further adapted to constrain with respect to each other a first member of the suspension of the other of said left front steered wheel and right front steered wheel and an additional second member associated with the respective steered wheel and which performs a rotational movement proportional to the rotation of the transverse component around the tilting axes.

3. The motor vehicle of claim 1, wherein each second member is supported for rotation on the respective support arm.

4. The motor vehicle of claim 1, wherein the transverse component is a steering bar connected by means of a steering column to a handlebar of the motor vehicle.

5. The motor vehicle of claim 1, wherein the tilting locking device comprises, for each of said left front steered wheel and right front steered wheel a further member supported on the support arm and mechanically connected to the first member of the respective suspension, so as to move, with respect to the support arm, with a movement proportional to the suspension springing movement, and wherein the brake is adapted to lock with respect each other said further member and said second member.

6. The motor vehicle of claim 5, wherein the further member is rotatably coupled to the support arm and is adapted to rotate with respect to the support arm proportionally to the springing movement of the respective suspension.

7. The motor vehicle of claim 5, wherein the second member is rotatably coupled to the support arm and is adapted to rotate with respect to the support arm proportionally to the rotational movement of the transverse component around the tilting axes.

8. The motor vehicle of claim 6, wherein the second member is rotatably coupled to the support arm and is adapted to rotate with respect to the support arm proportionally to the rotational movement of the transverse component around the tilting axes, and wherein the further member and the second member are arranged to rotate, with respect to the suspension arm, around respective substantially parallel and spaced apart axes.

9. The motor vehicle of claim 8, wherein each brake is a disc brake, comprising a caliper and a disc sector, wherein the caliper is part of the further member and the disc sector is part of the second member, or vice versa.

10. The motor vehicle of claim 6, wherein the second member is rotatably coupled to the support arm and is adapted to rotate with respect to the support arm proportionally to the rotational movement of the transverse component around the tilting axes, and wherein the further member and the second member are arranged to rotate around a common axis with respect to the suspension arm.

11. The motor vehicle of claim 10, wherein the brake is configured to angularly lock the further member and the second member with respect to one another.

12. The motor vehicle of claim 11, wherein said brake is a drum brake.

13. The motor vehicle of claim 5, wherein the further member is connected by means of a rod to the first member of the suspension.

14. The motor vehicle of claim 5, wherein the further member is rigidly connected to the first member of the suspension, and wherein the second member is constrained to the transverse component through a rod, which transmits the rotational motion of the transverse component around the tilting axes to the second member.

15. The motor vehicle of claim 13, wherein the first member of the suspension comprises an element of a suspension four bar linkage.

16. The motor vehicle of claim 13, wherein the first member of the suspension comprises an element provided with a linear movement.

17. The motor vehicle of claim 1, wherein each suspension comprises a suspension four bar linkage with a first crank rotatably coupled to the respective support arm and a second crank rotatably coupled to the respective support arm; wherein the tilting locking device comprises, for each of said left front steered wheel and right front steered wheel: a further member rotatably supported, around a rotation axis, on the first crank of the suspension four bar linkage; wherein the further member is coaxial to the second member rotatably supported around said rotation axis on the first crank; wherein the further member is mechanically connected to the second crank, so as to rotate around said rotation axis proportionally to the springing movement of the suspension; wherein the second member is mechanically connected to the transverse component so as to rotate, around said rotation axis proportionally to the rotation of the transverse component around the tilting axes; and wherein said brake is adapted to lock rotationally the further member and the second member with respect to each other.

18. The motor vehicle of claim 17, wherein said brakes are drum brakes.

19. The motor vehicle of claim 1, wherein each suspension comprises a suspension four bar linkage; wherein each suspension four bar linkage comprises a first crank rotatably coupled to the respective support arm, a second crank rotatably coupled to the respective support arm, and a wheel support connected to the support arm by said first crank and second crank; wherein each suspension four bar linkage moves on a plane orthogonal to the rotation axis of the respective wheel; wherein a respective first brake member of the first brake and of the second brake is rigidly connected to the wheel support of the left front steered wheel and right front steered wheel; wherein a respective second brake member of the first brake and second brake is pivotally coupled to the respective support arm and mechanically connected with the transverse component, so as to perform a rotational movement proportional to the rotation of the transverse component around the tilting axes.

20. The motor vehicle of claim 19, wherein the suspension four bar linkage is one of a Watt four bar linkage, a Roberts four bar linkage and a Tchebicheff four bar linkage.

21. The motor vehicle of claim 1, wherein each suspension comprises a suspension assembly including an elastic member (35', 35") and a shock absorber; each suspension assembly has an upper end coupled to the respective suspension arm and a lower end hinged to a pivoting arm, which mechanically connects the lower end of the suspension assembly to the respective support arm; wherein each first brake and second brake comprises a first brake member rigidly coupled to the lower end of the suspension assembly, and a second brake member hinged to one of the respective suspension arm and the upper end of the suspension assembly; and wherein the second brake member is mechanically connected with the transverse component, so as to perform a rotational movement proportional to the rotation of the transverse component around the tilting axes.

* * * * *